US012748915B2

(12) United States Patent
Dvorak et al.

(10) Patent No.: US 12,748,915 B2
(45) Date of Patent: *Sep. 29, 2026

(54) METHOD AND SYSTEM FOR REPEAT 2D ORDERING OF OUTPUT FROM SPREADSHEET ANALYTICAL FUNCTIONS

(71) Applicant: Adaptam Inc., Palo Alto, CA (US)

(72) Inventors: Robert E. Dvorak, Portola Valley, CA (US); Yuriy Garin, San Carlos, CA (US); Alexey Verkhovskiy, Calgary (CA)

(73) Assignee: Adaptam Inc., Palo Alto, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/586,370

(22) Filed: Feb. 23, 2024

(65) Prior Publication Data

US 2024/0193357 A1 Jun. 13, 2024

Related U.S. Application Data

(63) Continuation-in-part of application No. 17/903,934, filed on Sep. 6, 2022, now Pat. No. 12,050,859.

(60) Provisional application No. 63/240,828, filed on Sep. 3, 2021.

(51) Int. Cl.
*G06F 40/18* (2020.01)

(52) U.S. Cl.
CPC .................................... *G06F 40/18* (2020.01)

(58) Field of Classification Search
CPC ............................... G06F 40/18; G06F 40/183
See application file for complete search history.

(56) References Cited

U.S. PATENT DOCUMENTS

| | | | |
|---|---|---|---|
| 5,604,854 | A | 2/1997 | Glassey |
| 6,626,959 | B1 | 9/2003 | Moise et al. |
| 7,747,939 | B2 | 6/2010 | Thanu et al. |
| 8,161,372 | B2 | 4/2012 | Ellis et al. |

(Continued)

OTHER PUBLICATIONS

Efthimia Aivaloglou et al., A Grammar for Spreadsheet Formulas Evaluated on Two Large Datasets, Sep. 1, 2015, International Working Conference on Source Code Analysis and Manipulation, pp. 121-130 (Year: 2015).*

(Continued)

*Primary Examiner* — Tam T Tran
(74) *Attorney, Agent, or Firm* — HAYNES BEFFEL & WOLFELD LLP; Ernest J. Beffel, Jr.

(57) ABSTRACT

The disclosed technology creates three families of (predefined formula) spreadsheet functions which allows users to functional formulas that create multiple two-dimensional repetitions of range or array function formula calculations, non-range or non-array function algebraic formulas, or two-dimension fields with complementary vertical and horizontal headings in their regular spreadsheet cells. The data can be sourced from multiple cells within the spreadsheet or a broad spectrum of numeric, date and text data not stored in a spreadsheet, including data not discretely defined. The technology disclosed can use as inputs either cell ranges or Non-Spreadsheet Cell (NSC) data formulas. The capability allows users to specify standardized or highly custom calculations capable of executing millions of calculations through a (predefined formula) spreadsheet function.

27 Claims, 62 Drawing Sheets

(56) References Cited

U.S. PATENT DOCUMENTS

| | | | |
|---|---|---|---|
| 8,726,143 | B2 | 5/2014 | Simkhay et al. |
| 9,037,959 | B2 | 5/2015 | Rapp et al. |
| 9,037,961 | B1 | 5/2015 | Mansell |
| 9,430,469 | B2 | 8/2016 | Lam et al. |
| 9,817,876 | B2 | 11/2017 | Demonsant et al. |
| 10,114,812 | B1 | 10/2018 | Ghaddar |
| 10,140,280 | B2 | 11/2018 | Sobhy Deraz et al. |
| 10,466,867 | B2 | 11/2019 | Boucher et al. |
| 10,515,145 | B2 | 12/2019 | Canton et al. |
| 10,540,153 | B2 | 1/2020 | Stachura |
| 10,545,953 | B2 | 1/2020 | Becker et al. |
| 10,628,634 | B1 | 4/2020 | Ghaddar |
| 10,699,068 | B2 | 6/2020 | Gross et al. |
| 10,726,201 | B1 | 7/2020 | Gross et al. |
| 10,789,414 | B2 | 9/2020 | Schoedl |
| 10,877,633 | B2 | 12/2020 | Boucher et al. |
| 10,891,434 | B2 | 1/2021 | Peyton Jones et al. |
| 10,983,670 | B2 | 4/2021 | Boucher et al. |
| 11,222,171 | B2 | 1/2022 | Zhang et al. |
| 11,423,218 | B2 | 8/2022 | Keslin et al. |
| 11,461,544 | B2 | 10/2022 | Sarkar et al. |
| 12,039,258 | B2 | 7/2024 | Dayal |
| 2003/0056181 | A1 | 3/2003 | Marathe |
| 2006/0271841 | A1 | 11/2006 | Thanu et al. |
| 2007/0136652 | A1 | 6/2007 | Ellis et al. |
| 2009/0319880 | A1 | 12/2009 | Collie et al. |
| 2010/0269092 | A1 | 10/2010 | Dorman |
| 2013/0145244 | A1 | 6/2013 | Rothschiller et al. |
| 2013/0159832 | A1 | 6/2013 | Ingargiola et al. |
| 2015/0370433 | A1 | 12/2015 | Lam et al. |
| 2016/0378842 | A1 | 12/2016 | Demonsant et al. |
| 2017/0220543 | A1 | 8/2017 | Canton et al. |
| 2017/0315683 | A1 | 11/2017 | Boucher et al. |
| 2017/0315967 | A1 | 11/2017 | Boucher et al. |
| 2017/0315979 | A1 | 11/2017 | Boucher et al. |
| 2018/0150531 | A1 | 5/2018 | Demonsant et al. |
| 2018/0157468 | A1 | 6/2018 | Stachura |
| 2018/0239748 | A1 | 8/2018 | Zhang et al. |
| 2018/0260374 | A1 | 9/2018 | Sobhy Deraz et al. |
| 2019/0340219 | A1 | 11/2019 | Schoedl |
| 2020/0004799 | A1 | 1/2020 | Gross et al. |
| 2020/0004811 | A1 | 1/2020 | Gross et al. |
| 2020/0004812 | A1 | 1/2020 | Gross et al. |
| 2020/0081586 | A1 | 3/2020 | Boucher et al. |
| 2020/0167415 | A1 | 5/2020 | Peyton Jones et al. |
| 2020/0184147 | A1* | 6/2020 | Chen ........................ G06F 9/451 |
| 2020/0257852 | A1 | 8/2020 | Canton et al. |
| 2020/0285694 | A1* | 9/2020 | Nield .................. G06F 9/45504 |
| 2020/0302013 | A1 | 9/2020 | Stegmaier et al. |
| 2021/0081405 | A1 | 3/2021 | Zarras |
| 2021/0256205 | A1 | 8/2021 | Sarkar et al. |
| 2021/0286479 | A1 | 9/2021 | Boucher et al. |
| 2021/0311595 | A1 | 10/2021 | Boucher et al. |
| 2022/0188505 | A1 | 6/2022 | Keslin et al. |
| 2022/0229975 | A1 | 7/2022 | Murphy et al. |
| 2023/0177751 | A1* | 6/2023 | Dvorak ............... G06F 3/04842 715/215 |
| 2024/0070382 | A1 | 2/2024 | Dayal |
| 2024/0370644 | A1 | 11/2024 | Dayal |
| 2025/0094697 | A1 | 3/2025 | Mcdaid et al. |

OTHER PUBLICATIONS

Leo Antunes et al., Automatic Spreadsheet Generation from Conceptual Models, Sep. 1, 2015, Brazilian Symposium on Software Engineering, pp. 140-149 (Year: 2015).*

Collie et al., Power Pivot and Power BI: The Excel user's guide to DAX, Power Query, Power BI & Power Pivot in Excel 2010-2016. United States: Holy Macro! Books. ISBN: 978-1-61547-039-6 (Year:2016) (Year: 2016).

Yundt, What's the difference between array and range in Excel?, Quora, dated Dec. 2, 2019, 4 pages.

Sroka et al., Translating Relational Queries into Spreadsheets, IEEE, Transactions on Knowledge and Data Engineering, vol. 27, No. 8, Aug. 2015, 13 pages.

* cited by examiner

Retrieves all the data for the formulaic data fields (either NSC external data or spreadsheet cell data)

| donor | year | donation |
|---|---|---|
| Bill Michaels | 2021 | 4450 |
| Sally Jones | 2021 | 3750 |
| Judy Wade | 2021 | 2900 |
| Sally Jones | 2021 | 2050 |
| Bill Michaels | 2021 | 1650 |
| Judy Wade | 2021 | 200 |
| Bill Michaels | 2021 | 400 |
| Judy Wade | 2022 | 3000 |
| Sally Jones | 2022 | 4200 |
| Bill Michaels | 2022 | 350 |
| Sally Jones | 2022 | 225 |
| Judy Wade | 2022 | 2675 |
| Sally Jones | 2023 | 4050 |
| Bill Michaels | 2023 | 4250 |
| Judy Wade | 2023 | 1125 |
| Sally Jones | 2023 | 1650 |
| Bill Michaels | 2023 | 1000 |
| Judy Wade | 2023 | 3000 |
| Sally Jones | 2023 | 3600 |
| Sally Jones | 2023 | 280 |

1343

Sorts the data so it supports doing the different loop calculations

| donor | year | donation |
|---|---|---|
| Bill Michaels | 2021 | 4450 |
| Bill Michaels | 2021 | 1650 |
| Bill Michaels | 2021 | 400 |
| Bill Michaels | 2022 | 350 |
| Bill Michaels | 2023 | 4250 |
| Bill Michaels | 2023 | 1000 |
| Judy Wade | 2021 | 2900 |
| Judy Wade | 2021 | 200 |
| Judy Wade | 2022 | 3000 |
| Judy Wade | 2022 | 2675 |
| Judy Wade | 2022 | 1125 |
| Judy Wade | 2023 | 3000 |
| Sally Jones | 2021 | 3750 |
| Sally Jones | 2021 | 2050 |
| Sally Jones | 2022 | 4200 |
| Sally Jones | 2022 | 225 |
| Sally Jones | 2023 | 4050 |
| Sally Jones | 2023 | 1650 |
| Sally Jones | 2023 | 3600 |
| Sally Jones | 2023 | 280 |

1345

Creates the loop equivalents and does each of the two-dimensional SUM (calc1) and COUNT (calc2) loop calculations

| donor | year | donation | calc1 SUM( donation) | calc2 COUNT( donation) |
|---|---|---|---|---|
| Bill Michaels | 2021 | 4450 | 6500 | 3 |
| | | 1650 | | |
| | | 400 | | |
| Bill Michaels | 2022 | 350 | 350 | 1 |
| Bill Michaels | 2023 | 4250 | 5250 | 2 |
| | | 1000 | | |
| Judy Wade | 2021 | 2900 | 3100 | 2 |
| | | 200 | | |
| Judy Wade | 2022 | 3000 | 6800 | 3 |
| | | 2675 | | |
| | | 1125 | | |
| Judy Wade | 2023 | 3000 | 3000 | 1 |
| Sally Jones | 2021 | 3750 | 5800 | 2 |
| | | 2050 | | |
| Sally Jones | 2022 | 4200 | 4425 | 2 |
| | | 225 | | |
| Sally Jones | 2023 | 4050 | 9580 | 4 |
| | | 1650 | | |
| | | 3600 | | |
| | | 280 | | |

1348

FIG. 13

Retrieves all the data for the formulaic data fields (either NSC external data or spreadsheet cell data)

| donor | year | donation |
|---|---|---|
| Bill Michaels | 2021 | 4450 |
| Sally Jones | 2021 | 3750 |
| Judy Wade | 2021 | 2900 |
| Sally Jones | 2021 | 2050 |
| Bill Michaels | 2021 | 1650 |
| Judy Wade | 2021 | 200 |
| Bill Michaels | 2021 | 400 |
| Judy Wade | 2022 | 3000 |
| Sally Jones | 2022 | 4200 |
| Bill Michaels | 2022 | 350 |
| Sally Jones | 2022 | 225 |
| Judy Wade | 2022 | 2675 |
| Sally Jones | 2023 | 4050 |
| Bill Michaels | 2023 | 4250 |
| Judy Wade | 2023 | 1125 |
| Sally Jones | 2023 | 1650 |
| Bill Michaels | 2023 | 1000 |
| Judy Wade | 2023 | 3000 |
| Sally Jones | 2023 | 3600 |
| Sally Jones | 2023 | 280 |

1643

Sorts the data so it supports doing the different loop calculations and removes donations not <=1000

| donor | year | donation |
|---|---|---|
| Bill Michaels | 2021 | |
| Bill Michaels | 2021 | |
| Bill Michaels | 2021 | 400 |
| Bill Michaels | 2022 | 350 |
| Bill Michaels | 2023 | |
| Bill Michaels | 2023 | 1000 |
| Judy Wade | 2021 | |
| Judy Wade | 2021 | 200 |
| Judy Wade | 2022 | |
| Judy Wade | 2022 | |
| Judy Wade | 2022 | |
| Judy Wade | 2023 | |
| Sally Jones | 2021 | |
| Sally Jones | 2021 | |
| Sally Jones | 2022 | |
| Sally Jones | 2022 | 225 |
| Sally Jones | 2023 | |
| Sally Jones | 2023 | |
| Sally Jones | 2023 | |
| Sally Jones | 2023 | 280 |

1645

Creates the loop equivalents and does each of the two-dimensional SUM (calc1) and COUNT (calc2) loop calculations

| donor | year | donation | calc1 SUM( donation) | calc2 COUNT( donation) |
|---|---|---|---|---|
| Bill Michaels | 2021 | | 400 | 1 |
| | | | | |
| | | 400 | | |
| Bill Michaels | 2022 | 350 | 350 | 1 |
| Bill Michaels | 2023 | | 1000 | 1 |
| | | 1000 | | |
| Judy Wade | 2021 | | 200 | 1 |
| | | 200 | | |
| Judy Wade | 2022 | | | |
| | | | | |
| | | | | |
| Judy Wade | 2023 | | | |
| Sally Jones | 2021 | | | |
| | | | | |
| Sally Jones | 2022 | | 225 | 1 |
| | | 225 | | |
| Sally Jones | 2023 | | 280 | 1 |
| | | | | |
| | | | | |
| | | 280 | | |

1648

FIG. 16

Retrieves all the data for the formulaic data fields (either NSC external data or spreadsheet cell data)

| donor | year | donation | fee |
|---|---|---|---|
| Bill Michaels | 2021 | 4450 | 55.62 |
| Sally Jones | 2021 | 3750 | 65.62 |
| Judy Wade | 2021 | 2900 | 50.75 |
| Sally Jones | 2021 | 2050 | 44.07 |
| Bill Michaels | 2021 | 1650 | 35.47 |
| Judy Wade | 2021 | 200 | 4.5 |
| Bill Michaels | 2021 | 400 | 9 |
| Judy Wade | 2022 | 3000 | 52.5 |
| Sally Jones | 2022 | 4200 | 52.5 |
| Judy Wade | 2022 | 1125 | 24.18 |
| Bill Michaels | 2022 | 350 | 7.87 |
| Sally Jones | 2022 | 225 | 5.06 |
| Judy Wade | 2022 | 2675 | 46.81 |
| Sally Jones | 2023 | 4050 | 50.6 |
| Bill Michaels | 2023 | 4250 | 53.12 |
| Sally Jones | 2023 | 1650 | 35.4 |
| Bill Michaels | 2023 | 1000 | 22.5 |
| Judy Wade | 2023 | 3000 | 52.5 |
| Sally Jones | 2023 | 3600 | 63 |
| Sally Jones | 2023 | 280 | 6.3 |

Sorts the data using the default sorts

| donor | year | donation | fee |
|---|---|---|---|
| Bill Michaels | 2021 | 4450 | 55.6 |
| Bill Michaels | 2021 | 1650 | 35.5 |
| Bill Michaels | 2021 | 400 | 9 |
| Bill Michaels | 2022 | 350 | 7.87 |
| Bill Michaels | 2023 | 4250 | 53.1 |
| Bill Michaels | 2023 | 1000 | 22.5 |
| Judy Wade | 2021 | 2900 | 50.8 |
| Judy Wade | 2021 | 200 | 4.5 |
| Judy Wade | 2022 | 3000 | 52.5 |
| Judy Wade | 2022 | 1125 | 24.2 |
| Judy Wade | 2022 | 2675 | 46.8 |
| Judy Wade | 2023 | 3000 | 52.5 |
| Sally Jones | 2021 | 3750 | 65.6 |
| Sally Jones | 2021 | 2050 | 44.1 |
| Sally Jones | 2022 | 4200 | 52.5 |
| Sally Jones | 2022 | 225 | 5.06 |
| Sally Jones | 2023 | 4050 | 50.6 |
| Sally Jones | 2023 | 1650 | 35.4 |
| Sally Jones | 2023 | 3600 | 63 |
| Sally Jones | 2023 | 280 | 6.3 |

Do the calculations (calc1 and calc2)

| donor | year | donation - fee | (donation - fee)/ donation |
|---|---|---|---|
| Bill Michaels | 2021 | 4394.38 | 0.98750112 |
| Bill Michaels | 2021 | 1614.53 | 0.97850303 |
| Bill Michaels | 2021 | 391 | 0.9775 |
| Bill Michaels | 2022 | 342.13 | 0.97751429 |
| Bill Michaels | 2023 | 4196.88 | 0.98750118 |
| Bill Michaels | 2023 | 977.5 | 0.9775 |
| Judy Wade | 2021 | 2849.25 | 0.9825 |
| Judy Wade | 2021 | 195.5 | 0.9775 |
| Judy Wade | 2022 | 2947.5 | 0.9825 |
| Judy Wade | 2022 | 1100.82 | 0.97850667 |
| Judy Wade | 2022 | 2628.19 | 0.98250093 |
| Judy Wade | 2023 | 2947.5 | 0.9825 |
| Sally Jones | 2021 | 3684.38 | 0.98250133 |
| Sally Jones | 2021 | 2005.93 | 0.97850244 |
| Sally Jones | 2022 | 4147.5 | 0.9875 |
| Sally Jones | 2022 | 219.94 | 0.97751111 |
| Sally Jones | 2023 | 3999.4 | 0.98750617 |
| Sally Jones | 2023 | 1614.6 | 0.97854545 |
| Sally Jones | 2023 | 3537 | 0.9825 |
| Sally Jones | 2023 | 273.7 | 0.9775 |

2343 2345 2348

FIG. 23

| | A | B | C | D | E | F | G | H |
|---|---|---|---|---|---|---|---|---|
| 1 | Calc: | =donation-fee | | | =(donation-fee)/donation | | | |
| 2 | Year: | 2021 | 2022 | 2023 | 2021 | 2022 | 2023 | |
| 3 | Donor: | | | | | | | |
| 4 | Bill Michaels | 4394.38 | | | 98.75% | | | |
| 5 | Bill Michaels | 1614.53 | | | 97.85% | | | |
| 6 | Bill Michaels | 391 | | | 97.75% | | | |
| 7 | Bill Michaels | | 342.13 | | | 97.75% | | |
| 8 | Bill Michaels | | | 4196.88 | | | 98.75% | |
| 9 | Bill Michaels | | | 977.5 | | | 97.75% | |
| 10 | Judy Wade | 2849.25 | | | 98.25% | | | |
| 11 | Judy Wade | 195.5 | | | 97.75% | | | |
| 12 | Judy Wade | | 2947.5 | | | 98.25% | | |
| 13 | Judy Wade | | 1100.82 | | | 97.85% | | |
| 14 | Judy Wade | | 2628.19 | | | 98.25% | | |
| 15 | Judy Wade | | | 2947.5 | | | 98.25% | |
| 16 | Sally Jones | 3684.38 | | | 98.25% | | | |
| 17 | Sally Jones | 2005.93 | | | 97.85% | | | |
| 18 | Sally Jones | | 4147.5 | | | 98.75% | | |
| 19 | Sally Jones | | 219.94 | | | 97.75% | | |
| 20 | Sally Jones | | | 3999.4 | | | 98.75% | |
| 21 | Sally Jones | | | 1614.6 | | | 97.85% | |
| 22 | Sally Jones | | | 3537 | | | 98.25% | |
| 23 | Sally Jones | | | 273.7 | | | 97.75% | |
| 24 | | | | | | | | |

2D sorts the data/calcs into the horizontal repeating series of calcs (2021, 2022, and 2023)

| | 2021 | 2021 | 2022 | 2022 | 2023 | 2023 |
|---|---|---|---|---|---|---|
| Bill Michaels | 4394.38 | 0.9875 | | | | |
| Bill Michaels | 1614.53 | 0.9785 | | | | |
| Bill Michaels | 391 | 0.9775 | | | | |
| Bill Michaels | | | 342.13 | 0.977514 | | |
| Bill Michaels | | | | | 4196.88 | 0.987501 |
| Bill Michaels | | | | | 977.5 | 0.9775 |
| Judy Wade | 2849.25 | 0.9825 | | | | |
| Judy Wade | 195.5 | 0.9775 | | | | |
| Judy Wade | | | 2947.5 | 0.9825 | | |
| Judy Wade | | | 1100.82 | 0.978507 | | |
| Judy Wade | | | 2628.19 | 0.982501 | | |
| Judy Wade | | | | | 2947.5 | 0.9825 |
| Sally Jones | 3684.38 | 0.9825 | | | | |
| Sally Jones | 2005.93 | 0.9785 | | | | |
| Sally Jones | | | 4147.5 | 0.9875 | | |
| Sally Jones | | | 219.94 | 0.977511 | | |
| Sally Jones | | | | | 3999.4 | 0.987506 |
| Sally Jones | | | | | 1614.6 | 0.978545 |
| Sally Jones | | | | | 3537 | 0.9825 |
| Sally Jones | | | | | 273.7 | 0.9775 |

2748
2746
2745
2744
2724

2D sorts and collapses the data/calcs into the horizontal repeating series of calcs (by year groups - 2021, 2022, and 2023)

| | 2021 | 2021 | 2022 | 2022 | 2023 | 2023 |
|---|---|---|---|---|---|---|
| Bill Michaels | 4394.38 | 0.9875 | 342.13 | 0.977514 | 4196.88 | 0.987501 |
| Bill Michaels | 1614.53 | 0.9785 | | | 977.5 | 0.9775 |
| Bill Michaels | 391 | 0.9775 | | | | |
| Judy Wade | 2849.25 | 0.9825 | 2947.5 | 0.9825 | 2947.5 | 0.9825 |
| Judy Wade | 195.5 | 0.9775 | 1100.82 | 0.978507 | | |
| Judy Wade | | | 2628.19 | 0.982501 | | |
| Sally Jones | 3684.38 | 0.9825 | 4147.5 | 0.9875 | 3999.4 | 0.987506 |
| Sally Jones | 2005.93 | 0.9785 | 219.94 | 0.977511 | 1614.6 | 0.978545 |
| Sally Jones | | | | | 3537 | 0.9825 |
| Sally Jones | | | | | 273.7 | 0.9775 |

2786
2784
2788
2785

FIG. 27

| | A | B | C | D | E | F | G | H |
|---|---|---|---|---|---|---|---|---|
| 1 | Year: | 2021 | 2021 | 2022 | 2022 | 2023 | 2023 | |
| 2 | Calc: | Calc1 | Calc2 | Calc1 | Calc2 | Calc1 | Calc2 | |
| 3 | Donor: | | | | | | | |
| 4 | Bill Michaels | 4394.38 | 98.75% | 342.13 | 97.75% | 4196.88 | 98.75% | |
| 5 | Bill Michaels | 1614.53 | 97.85% | | | 977.5 | 97.75% | |
| 6 | Bill Michaels | 391 | 97.75% | | | | | |
| 7 | Judy Wade | 2849.25 | 98.25% | 2947.5 | 98.25% | 2947.5 | 98.25% | |
| 8 | Judy Wade | 195.5 | 97.75% | 1100.82 | 97.85% | | | |
| 9 | Judy Wade | | | 2628.19 | 98.25% | | | |
| 10 | Sally Jones | 3684.38 | 98.25% | 4147.5 | 98.75% | 3999.4 | 98.75% | |
| 11 | Sally Jones | 2005.93 | 97.85% | 219.94 | 97.75% | 1614.6 | 97.85% | |
| 12 | Sally Jones | | | | | 3537 | 98.25% | |
| 13 | Sally Jones | | | | | 273.7 | 97.75% | |
| 14 | | | | | | | | |

Retrieves all the data for the formulaic data fields (either NSC external data or spreadsheet cell data)

| donor | year | donation | fee |
|---|---|---|---|
| Bill Michaels | 2021 | 4450 | 55.62 |
| Sally Jones | 2021 | 3750 | 65.62 |
| Judy Wade | 2021 | 2900 | 50.75 |
| Sally Jones | 2021 | 2050 | 44.07 |
| Bill Michaels | 2021 | 1650 | 35.47 |
| Judy Wade | 2021 | 200 | 4.5 |
| Bill Michaels | 2021 | 400 | 9 |
| Judy Wade | 2022 | 3000 | 52.5 |
| Sally Jones | 2022 | 4200 | 52.5 |
| Judy Wade | 2022 | 1125 | 24.18 |
| Bill Michaels | 2022 | 350 | 7.87 |
| Sally Jones | 2022 | 225 | 5.06 |
| Judy Wade | 2022 | 2675 | 46.81 |
| Sally Jones | 2023 | 4050 | 50.6 |
| Bill Michaels | 2023 | 4250 | 53.12 |
| Sally Jones | 2023 | 1650 | 35.4 |
| Bill Michaels | 2023 | 1000 | 22.5 |
| Judy Wade | 2023 | 3000 | 52.5 |
| Sally Jones | 2023 | 3600 | 63 |
| Sally Jones | 2023 | 280 | 6.3 |

3544

Sorts the data using the default sorts

| donor | year | donation | fee |
|---|---|---|---|
| Bill Michaels | 2021 | 4450 | 55.6 |
| Bill Michaels | 2021 | 1650 | 35.5 |
| Bill Michaels | 2021 | 400 | 9 |
| Bill Michaels | 2022 | 350 | 7.87 |
| Bill Michaels | 2023 | 4250 | 53.1 |
| Bill Michaels | 2023 | 1000 | 22.5 |
| Judy Wade | 2021 | 2900 | 50.8 |
| Judy Wade | 2021 | 200 | 4.5 |
| Judy Wade | 2022 | 3000 | 52.5 |
| Judy Wade | 2022 | 1125 | 24.2 |
| Judy Wade | 2022 | 2675 | 46.8 |
| Judy Wade | 2023 | 3000 | 52.5 |
| Sally Jones | 2021 | 3750 | 65.6 |
| Sally Jones | 2021 | 2050 | 44.1 |
| Sally Jones | 2022 | 4200 | 52.5 |
| Sally Jones | 2022 | 225 | 5.06 |
| Sally Jones | 2023 | 4050 | 50.6 |
| Sally Jones | 2023 | 1650 | 35.4 |
| Sally Jones | 2023 | 3600 | 63 |
| Sally Jones | 2023 | 280 | 6.3 |

3546

FIG. 35

2D sorts the data/calcs into the horizontal repeating series of calcs (2021, 2022, and 2023)

| | 2021 | 2021 | 2022 | 2022 | 2023 | 2023 |
|---|---|---|---|---|---|---|
| Bill Michaels | 4450 | 55.62 | | | | |
| Bill Michaels | 1650 | 35.47 | | | | |
| Bill Michaels | 400 | 9 | | | | |
| Bill Michaels | | | 350 | 7.87 | | |
| Bill Michaels | | | | | 4250 | 53.12 |
| Bill Michaels | | | | | 1000 | 22.5 |
| Judy Wade | 2900 | 50.75 | | | | |
| Judy Wade | 200 | 4.5 | | | | |
| Judy Wade | | | 3000 | 52.5 | | |
| Judy Wade | | | 1125 | 24.18 | | |
| Judy Wade | | | 2675 | 46.81 | | |
| Judy Wade | | | | | 3000 | 52.5 |
| Sally Jones | 3750 | 65.62 | | | | |
| Sally Jones | 2050 | 44.07 | | | | |
| Sally Jones | | | 4200 | 52.5 | | |
| Sally Jones | | | 225 | 5.06 | | |
| Sally Jones | | | | | 4050 | 50.6 |
| Sally Jones | | | | | 1650 | 35.4 |
| Sally Jones | | | | | 3600 | 63 |
| Sally Jones | | | | | 280 | 6.3 |

3948
3946
3945
3944
3942

2D sorts and collapses the data/calcs into the horizontal repeating series of calcs (2021, 2022, and 2023)

| | 2021 | 2021 | 2022 | 2022 | 2023 | 2023 |
|---|---|---|---|---|---|---|
| Bill Michaels | 4450 | 55.62 | 350 | 7.87 | 4250 | 53.12 |
| Bill Michaels | 1650 | 35.47 | | | 1000 | 22.5 |
| Bill Michaels | 400 | 9 | | | | |
| Judy Wade | 2900 | 50.75 | 3000 | 52.5 | 3000 | 52.5 |
| Judy Wade | 200 | 4.5 | 1125 | 24.18 | | |
| Judy Wade | | | 2675 | 46.81 | | |
| Sally Jones | 3750 | 65.62 | 4200 | 52.5 | 4050 | 50.6 |
| Sally Jones | 2050 | 44.07 | 225 | 5.06 | 1650 | 35.4 |
| Sally Jones | | | | | 3600 | 63 |
| Sally Jones | | | | | 280 | 6.3 |

3986
3984
3988
3985

FIG. 39

| Calc: | | SUM(donation)-SUM(fee) | | | | | | COUNT(donation) | | | | | | MAX(donation) | | | | | |
|---|---|---|---|---|---|---|---|---|---|---|---|---|---|---|---|---|---|---|---|
| Region: | | East | | | West | | | East | | | West | | | East | | | West | | |
| Sponsor | Donor | 2021 | 2022 | 2023 | 2021 | 2022 | 2023 | 2021 | 2022 | 2023 | 2021 | 2022 | 2023 | 2021 | 2022 | 2023 | 2021 | 2022 | 2023 |
| Cathy | Bill Michaels | 6399.91 | 342.13 | 977.5 | | | | 3 | 1 | 1 | | | | 4450 | 350 | 1000 | | | |
| | Sally Jones | 2005.93 | 4147.5 | | | 219.94 | 915 | 1 | 1 | | | 1 | 3 | 2050 | 4200 | | | 225 | 4050 |
| Hannah | Judy Wade | | | | 3044.75 | 6676.51 | | | | | 2 | 3 | | | | | 2900 | 3000 | |
| | Sally Jones | | | | 3684.38 | | | | | | 1 | | | 3750 | | | | | |
| James M. | Bill Michaels | | | 4196.88 | | | | | | 1 | | | | | | 4250 | | | |
| | Judy Wade | | | | | | 2947.5 | | | | | | 1 | | | | | | 3000 |
| | Sally Jones | | | | | | 273.7 | | | | | | 1 | | | | | | 280 |

Retrieves all the data for the formulaic data fields (either NSC external data or spreadsheet cell data)

| sponsor | donor | region | year | donation | fee |
|---|---|---|---|---|---|
| Cathy | Bill Michaels | East | 2021 | 4450 | 55.62 |
| Hannah | Sally Jones | East | 2021 | 3750 | 65.62 |
| Hannah | Judy Wade | West | 2021 | 2900 | 50.75 |
| Cathy | Sally Jones | East | 2021 | 2050 | 44.07 |
| Cathy | Bill Michaels | East | 2021 | 1650 | 35.47 |
| Hannah | Judy Wade | West | 2021 | 200 | 4.5 |
| Cathy | Bill Michaels | East | 2021 | 400 | 9 |
| Hannah | Judy Wade | West | 2022 | 3000 | 52.5 |
| Cathy | Sally Jones | East | 2022 | 4200 | 52.5 |
| Hannah | Judy Wade | West | 2022 | 1125 | 24.18 |
| Cathy | Bill Michaels | East | 2022 | 350 | 7.87 |
| Cathy | Sally Jones | West | 2022 | 225 | 5.06 |
| Hannah | Judy Wade | West | 2022 | 2675 | 46.81 |
| Cathy | Sally Jones | West | 2023 | 4050 | 50.6 |
| James M. | Bill Michaels | East | 2023 | 4250 | 53.12 |
| Cathy | Sally Jones | West | 2023 | 1650 | 35.4 |
| Cathy | Bill Michaels | East | 2023 | 1000 | 22.5 |
| James M. | Judy Wade | West | 2023 | 3000 | 52.5 |
| Cathy | Sally Jones | West | 2023 | 3600 | 63 |
| James M. | Sally Jones | West | 2023 | 280 | 6.3 |

4543

Sorts the data so it supports doing the different loop calculations

| sponsor | donor | region | year | donation | fee |
|---|---|---|---|---|---|
| Cathy | Bill Michaels | East | 2021 | 4450 | 55.62 |
| Cathy | Bill Michaels | East | 2021 | 1650 | 35.47 |
| Cathy | Bill Michaels | East | 2021 | 400 | 9 |
| Cathy | Bill Michaels | East | 2022 | 350 | 7.87 |
| Cathy | Bill Michaels | East | 2023 | 1000 | 22.5 |
| Cathy | Sally Jones | East | 2021 | 2050 | 44.07 |
| Cathy | Sally Jones | East | 2022 | 4200 | 52.5 |
| Cathy | Sally Jones | West | 2022 | 225 | 5.06 |
| Cathy | Sally Jones | West | 2023 | 4050 | 50.6 |
| Cathy | Sally Jones | West | 2023 | 1650 | 35.4 |
| Cathy | Sally Jones | West | 2023 | 3600 | 63 |
| Hannah | Judy Wade | West | 2021 | 2900 | 50.75 |
| Hannah | Judy Wade | West | 2021 | 200 | 4.5 |
| Hannah | Judy Wade | West | 2022 | 3000 | 52.5 |
| Hannah | Judy Wade | West | 2022 | 1125 | 24.18 |
| Hannah | Judy Wade | West | 2022 | 2675 | 46.81 |
| Hannah | Sally Jones | East | 2021 | 3750 | 65.62 |
| James M. | Bill Michaels | East | 2023 | 4250 | 53.12 |
| James M. | Judy Wade | West | 2023 | 3000 | 52.5 |
| James M. | Sally Jones | West | 2023 | 280 | 6.3 |

4547

FIG. 45

Creates the loop equivalents and does each of the two-dimensional calc1 (SUM-SUM), calc2 (COUNT) and calc3 (MAX) loop calculations

| sponsor | donor | region | year | donation | fee | calc1 SUM( donation)- SUM( fee) | calc2 COUNT( donation) | calc3 MAX( donation) |
|---|---|---|---|---|---|---|---|---|
| Cathy | Bill Michaels | East | 2021 | 4450 | 55.62 | 6399.91 | 3 | 4450 |
| | | | | 1650 | 35.47 | | | |
| | | | | 400 | 9 | | | |
| Cathy | Bill Michaels | East | 2022 | 350 | 7.87 | 342.13 | 1 | 350 |
| Cathy | Bill Michaels | East | 2023 | 1000 | 22.5 | 977.5 | 1 | 1000 |
| Cathy | Sally Jones | East | 2021 | 2050 | 44.07 | 2005.93 | 1 | 2050 |
| Cathy | Sally Jones | East | 2022 | 4200 | 52.5 | 4147.5 | 1 | 4200 |
| Cathy | Sally Jones | West | 2022 | 225 | 5.06 | 219.94 | 1 | 225 |
| Cathy | Sally Jones | West | 2023 | 4050 | 50.6 | 9151 | 3 | 4050 |
| | | | | 1650 | 35.4 | | | |
| | | | | 3600 | 63 | | | |
| Hannah | Judy Wade | West | 2021 | 2900 | 50.75 | 3044.75 | 2 | 2900 |
| | | | | 200 | 4.5 | | | |
| Hannah | Judy Wade | West | 2022 | 3000 | 52.5 | 6676.51 | 3 | 3000 |
| | | | | 1125 | 24.18 | | | |
| | | | | 2675 | 46.81 | | | |
| Hannah | Sally Jones | East | 2021 | 3750 | 65.62 | 3684.38 | 1 | 3750 |
| James M. | Bill Michaels | East | 2023 | 4250 | 53.12 | 4196.88 | 1 | 4250 |
| James M. | Judy Wade | West | 2023 | 3000 | 52.5 | 2947.5 | 1 | 3000 |
| James M. | Sally Jones | West | 2023 | 280 | 6.3 | 273.7 | 1 | 280 |

4657

FIG. 46

FIG. 47A 2D sorts the data/calcs into the horizontal repeating groups of calcs (calc1 group then calc2 group and then calc3 group)

| | | calc1 East 2021 | calc1 East 2022 | calc1 East 2023 | calc1 West 2021 | calc1 West 2022 | calc1 West 2023 | calc2 East 2021 | calc2 East 2022 | calc2 East 2023 | calc2 West 2021 | calc2 West 2022 | calc2 West 2023 | calc3 East 2021 | calc3 East 2022 | calc3 East 2023 | calc3 West 2021 | calc3 West 2022 | calc3 West 2023 |
|---|---|---|---|---|---|---|---|---|---|---|---|---|---|---|---|---|---|---|---|
| Cathy | Bill Michaels | 6399.91 | 342.13 | 977.5 | | | | 3 | 1 | 1 | | | | 4450 | 350 | 1000 | | | |
| Cathy | Sally Jones | 2005.93 | 4147.5 | | | 219.94 | 9151 | 1 | 1 | | | 1 | 3 | 2050 | 4200 | | | 225 | 4050 |
| Hannah | Judy Wade | | | | 3044.75 | 6676.51 | | | | | 2 | 3 | | | | | 2900 | 3000 | |
| Hannah | Sally Jones | | | | 3684.38 | | | | | | 1 | | | 3750 | | | | | |
| James M. | Bill Michaels | | | 4196.88 | | | | | | 1 | | | | | | 4250 | | | |
| James M. | Judy Wade | | | | | | 2948 | | | | | | 1 | | | | | | 3000 |
| James M. | Sally Jones | | | | | | 273.7 | | | | | | 1 | | | | | | 280 |

Adds the titles, the default calc headings, the formatting, and sends to cells A1 through T11

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | | Calc: | SUM(donation)-SUM(fee) | | | | | | COUNT(donation) | | | | | | MAX(donation) | | | | | |
| 2 | | Region: | East | | | West | | | East | | | West | | | East | | | West | | |
| 3 | | Year: | 2021 | 2022 | 2023 | 2021 | 2022 | 2023 | 2021 | 2022 | 2023 | 2021 | 2022 | 2023 | 2021 | 2022 | 2023 | 2021 | 2022 | 2023 |
| 4 | Sponsor: | Donor: | | | | | | | | | | | | | | | | | | |
| 5 | Cathy | Bill Michaels | 6399.91 | 342.13 | 977.5 | | | | 3 | 1 | 1 | | | | 4450 | 350 | 1000 | | | |
| 6 | | Sally Jones | 2005.93 | 4147.5 | | | 219.94 | 9151 | 1 | 1 | | | 1 | 3 | 2050 | 4200 | | | 225 | 4050 |
| 7 | Hannah | Judy Wade | | | | 3044.75 | 6676.51 | | | | | 2 | 3 | | | | | 2900 | 3000 | |
| 8 | | Sally Jones | | | | 3684.38 | | | | | | 1 | | | 3750 | | | | | |
| 9 | James M. | Bill Michaels | | | 4196.88 | | | | | | 1 | | | | | | 4250 | | | |
| 10 | | Judy Wade | | | | | | 2947.5 | | | | | | 1 | | | | | | 3000 |
| 11 | | Sally Jones | | | | | | 273.7 | | | | | | 1 | | | | | | 280 |
| 12 | | | | | | | | | | | | | | | | | | | | |

FIG. 47B

Creates the loop equivalents and does each of the two-dimensional calc1 (SUM-SUM), and calc2 (MAX) loop calculations

| sponsor | donor | region | year | donation | fee | calc1 SUM( donation)- SUM( fee) | calc2 MAX( donation) |
|---|---|---|---|---|---|---|---|
| Cathy | Bill Michaels | East | 2021 | 4450 | 55.62 | 6399.91 | 4450 |
| | | | | 1650 | 35.47 | | |
| | | | | 400 | 9 | | |
| Cathy | Bill Michaels | East | 2022 | 350 | 7.87 | 342.13 | 350 |
| Cathy | Bill Michaels | East | 2023 | 1000 | 22.5 | 977.5 | 1000 |
| Cathy | Sally Jones | East | 2021 | 2050 | 44.07 | 2005.93 | 2050 |
| Cathy | Sally Jones | East | 2022 | 4200 | 52.5 | 4147.5 | 4200 |
| Cathy | Sally Jones | West | 2022 | 225 | 5.06 | 219.94 | 225 |
| Cathy | Sally Jones | West | 2023 | 4050 | 50.6 | 9151 | 4050 |
| | | | | 1650 | 35.4 | | |
| | | | | 3600 | 63 | | |
| Hannah | Judy Wade | West | 2021 | 2900 | 50.75 | 3044.75 | 2900 |
| | | | | 200 | 4.5 | | |
| Hannah | Judy Wade | West | 2022 | 3000 | 52.5 | 6676.51 | 3000 |
| | | | | 1125 | 24.18 | | |
| | | | | 2675 | 46.81 | | |
| Hannah | Sally Jones | East | 2021 | 3750 | 65.62 | 3684.38 | 3750 |
| James M. | Bill Michaels | East | 2023 | 4250 | 53.12 | 4196.88 | 4250 |
| James M. | Judy Wade | West | 2023 | 3000 | 52.5 | 2947.5 | 3000 |
| James M. | Sally Jones | West | 2023 | 280 | 6.3 | 273.7 | 280 |

FIG. 48

FIG. 49A 2D sorts the data/calcs into the horizontal repeating groups of calcs (calc1 group and then calc2 group) and does the total and subtotals calculations

| | | calc1 | calc1 | calc1 | calc1 | calc1 | calc1 | calc1 | calc1 | calc1 | calc2 | calc2 | calc2 | calc2 | calc2 | calc2 | calc2 | calc2 | calc2 |
|---|---|---|---|---|---|---|---|---|---|---|---|---|---|---|---|---|---|---|---|
| | | East | East | East | East | West | West | West | West | Total | East | East | East | East | West | West | West | West | Total |
| | | 2021 | 2022 | 2023 | subtotal | 2021 | 2022 | 2023 | subtotal | Total | 2021 | 2022 | 2023 | subtotal | 2021 | 2022 | 2023 | subtotal | Total |
| Cathy | Bill Michaels | 6399.91 | 342.13 | 977.5 | 7719.54 | | | | | 7719.5 | 4450 | 350 | 1000 | 4450 | | | | | 4450 |
| Cathy | Sally Jones | 2005.93 | 4147.5 | | 6153.43 | | 219.94 | 9151 | 9370.9 | 15524 | 2050 | 4200 | | 4200 | | 225 | 4050 | 4050 | 4200 |
| Cathy | subtotal | 8405.84 | 4489.63 | 977.5 | 13873 | | 219.94 | 9151 | 9370.9 | 23244 | 4450 | 4200 | 1000 | 4450 | | | | | 4450 |
| Hannah | Judy Wade | | | | | 3044.75 | 6676.51 | | 9721.3 | 9721.3 | | | | | 2900 | 3000 | | 3000 | 3000 |
| Hannah | Sally Jones | | | | | 3684.38 | | | 3684.4 | 3684.4 | 3750 | | | 3750 | | | | | 3750 |
| Hannah | subtotal | | | | | 6729.13 | 6676.51 | | 13406 | 13406 | 3750 | | | 3750 | 2900 | 3000 | | 3000 | 3750 |
| James M. | Bill Michaels | | | 4196.88 | 4196.88 | | | | | 4196.9 | | | 4250 | 4250 | | | | | 4250 |
| James M. | Judy Wade | | | | | | | 2947.5 | 2947.5 | 2947.5 | | | | | | | 3000 | 3000 | 3000 |
| James M. | Sally Jones | | | | | | | 273.7 | 273.7 | 273.7 | | | | | | | 280 | 280 | 280 |
| James M. | subtotal | | | 4196.88 | 4196.88 | | | 3221.2 | 3221.2 | 7418.1 | | | | | | | 3000 | 3000 | 3000 |
| Total | Total | 8405.84 | 4489.63 | 5174.38 | 18069.9 | 6729.13 | 6896.45 | 12372 | 25998 | 44068 | 4450 | 4200 | 1000 | 4450 | 2900 | 3000 | 3000 | 3000 | 4450 |

Adds the titles, the default calc headings, the formatting, and sends to cells A1 through T15

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | | Calc: | SUM(donation)-SUM(fee) | | | | | | | | | MAX(donation) | | | | | | | | |
| 2 | | Region: | East | | | | West | | | | Total | East | | | | West | | | | Total |
| 3 | | Year: | 2021 | 2022 | 2023 | subtotal | 2021 | 2022 | 2023 | subtotal | | 2021 | 2022 | 2023 | subtotal | 2021 | 2022 | 2023 | subtotal | |
| 4 | Sponsor: | Donor: | | | | | | | | | | | | | | | | | | |
| 5 | Cathy | Bill Michaels | 6399.91 | 342.13 | 977.5 | 7719.54 | | | | | 7719.5 | 4450 | 350 | 1000 | 4450 | | | | | 4450 |
| 6 | | Sally Jones | 2005.93 | 4147.5 | | 6153.43 | | 219.94 | 9151 | 9370.9 | 15524 | 2050 | 4200 | | 4200 | | 225 | 4050 | 4050 | 4200 |
| 7 | | subtotal | 8405.84 | 4489.63 | 977.5 | 13873 | | 219.94 | 9151 | 9370.9 | 23244 | 4450 | 4200 | 1000 | 4450 | | | | | 4450 |
| 8 | Hannah | Judy Wade | | | | | 3044.75 | 6676.51 | | 9721.3 | 9721.3 | | | | | 2900 | 3000 | | 3000 | 3000 |
| 9 | | Sally Jones | | | | | 3684.38 | | | 3684.4 | 3684.4 | 3750 | | | 3750 | | | | | 3750 |
| 10 | | subtotal | | | | | 6729.13 | 6676.51 | | 13406 | 13406 | 3750 | | | 3750 | 2900 | 3000 | | 3000 | 3750 |
| 11 | James M. | Bill Michaels | | | 4196.88 | 4196.88 | | | | | 4196.9 | | | 4250 | 4250 | | | | | 4250 |
| 12 | | Judy Wade | | | | | | | 2947.5 | 2947.5 | 2947.5 | | | | | | | 3000 | 3000 | 3000 |
| 13 | | Sally Jones | | | | | | | 273.7 | 273.7 | 273.7 | | | | | | | 280 | 280 | 280 |
| 14 | | subtotal | | | 4196.88 | 4196.88 | | | 3221.2 | 3221.2 | 7418.1 | | | | | | | 3000 | 3000 | 3000 |
| 15 | Total | | 8405.84 | 4489.63 | 5174.38 | 18069.9 | 6729.13 | 6896.45 | 12372 | 25998 | 44068 | 4450 | 4200 | 1000 | 4450 | 2900 | 3000 | 3000 | 3000 | 4450 |

FIG. 49B

Retrieves all the data for the formulaic data fields (either NSC external data or spreadsheet cell data)

| donor | year | donation | fee |
|---|---|---|---|
| Bill Michaels | 2021 | 4450 | 55.62 |
| Sally Jones | 2021 | 3750 | 65.62 |
| Judy Wade | 2021 | 2900 | 50.75 |
| Sally Jones | 2021 | 2050 | 44.07 |
| Bill Michaels | 2021 | 1650 | 35.47 |
| Judy Wade | 2021 | 200 | 4.5 |
| Bill Michaels | 2021 | 400 | 9 |
| Judy Wade | 2022 | 3000 | 52.5 |
| Sally Jones | 2022 | 4200 | 52.5 |
| Judy Wade | 2022 | 1125 | 24.18 |
| Bill Michaels | 2022 | 350 | 7.87 |
| Sally Jones | 2022 | 225 | 5.06 |
| Judy Wade | 2022 | 2675 | 46.81 |
| Sally Jones | 2023 | 4050 | 50.6 |
| Bill Michaels | 2023 | 4250 | 53.12 |
| Sally Jones | 2023 | 1650 | 35.4 |
| Bill Michaels | 2023 | 1000 | 22.5 |
| Judy Wade | 2023 | 3000 | 52.5 |
| Sally Jones | 2023 | 3600 | 63 |
| Sally Jones | 2023 | 280 | 6.3 |

Sorts the data using the default sorts

| donor | year | donation | fee |
|---|---|---|---|
| Bill Michaels | 2021 | 4450 | 55.6 |
| Bill Michaels | 2021 | 1650 | 35.5 |
| Bill Michaels | 2021 | 400 | 9 |
| Bill Michaels | 2022 | 350 | 7.87 |
| Bill Michaels | 2023 | 4250 | 53.1 |
| Bill Michaels | 2023 | 1000 | 22.5 |
| Judy Wade | 2021 | 2900 | 50.8 |
| Judy Wade | 2021 | 200 | 4.5 |
| Judy Wade | 2022 | 3000 | 52.5 |
| Judy Wade | 2022 | 1125 | 24.2 |
| Judy Wade | 2022 | 2675 | 46.8 |
| Judy Wade | 2023 | 3000 | 52.5 |
| Sally Jones | 2021 | 3750 | 65.6 |
| Sally Jones | 2021 | 2050 | 44.1 |
| Sally Jones | 2022 | 4200 | 52.5 |
| Sally Jones | 2022 | 225 | 5.06 |
| Sally Jones | 2023 | 4050 | 50.6 |
| Sally Jones | 2023 | 1650 | 35.4 |
| Sally Jones | 2023 | 3600 | 63 |
| Sally Jones | 2023 | 280 | 6.3 |

Do the calculations (calc1 and calc2)

| donor | year | calc1 donation - fee | calc2 fee/ donation |
|---|---|---|---|
| Bill Michaels | 2021 | 4394.38 | 0.01249888 |
| Bill Michaels | 2021 | 1614.53 | 0.02149697 |
| Bill Michaels | 2021 | 391 | 0.0225 |
| Bill Michaels | 2022 | 342.13 | 0.02248571 |
| Bill Michaels | 2023 | 4196.88 | 0.01249882 |
| Bill Michaels | 2023 | 977.5 | 0.0225 |
| Judy Wade | 2021 | 2849.25 | 0.0175 |
| Judy Wade | 2021 | 195.5 | 0.0225 |
| Judy Wade | 2022 | 2947.5 | 0.0175 |
| Judy Wade | 2022 | 1100.82 | 0.02149333 |
| Judy Wade | 2022 | 2628.19 | 0.01749907 |
| Judy Wade | 2023 | 2947.5 | 0.0175 |
| Sally Jones | 2021 | 3684.38 | 0.01749867 |
| Sally Jones | 2021 | 2005.93 | 0.02149756 |
| Sally Jones | 2022 | 4147.5 | 0.0125 |
| Sally Jones | 2022 | 219.94 | 0.02248889 |
| Sally Jones | 2023 | 3999.4 | 0.01249383 |
| Sally Jones | 2023 | 1614.6 | 0.02145455 |
| Sally Jones | 2023 | 3537 | 0.0175 |
| Sally Jones | 2023 | 273.7 | 0.0225 |

5343 5345 5348

FIG. 53

2D sorts the data/calcs into the horizontal repeating groups of calcs (calc1 group then calc2 group)

| | calc1 | calc1 | calc1 | calc2 | calc2 | calc2 |
|---|---|---|---|---|---|---|
| | 2021 | 2022 | 2023 | 2021 | 2022 | 2023 |
| Bill Michaels | 4394.38 | | | 1.25% | | |
| Bill Michaels | 1614.53 | | | 2.15% | | |
| Bill Michaels | 391 | | | 2.25% | | |
| Bill Michaels | | 342.13 | | | 2.25% | |
| Bill Michaels | | | 4196.88 | | | 1.25% |
| Bill Michaels | | | 977.5 | | | 2.25% |
| Judy Wade | 2849.25 | | | 1.75% | | |
| Judy Wade | 195.5 | | | 2.25% | | |
| Judy Wade | | 2947.5 | | | 1.75% | |
| Judy Wade | | 1100.82 | | | 2.15% | |
| Judy Wade | | 2628.19 | | | 1.75% | |
| Judy Wade | | | 2947.5 | | | 1.75% |
| Sally Jones | 3684.38 | | | 1.75% | | |
| Sally Jones | 2005.93 | | | 2.15% | | |
| Sally Jones | | 4147.5 | | | 1.25% | |
| Sally Jones | | 219.94 | | | 2.25% | |
| Sally Jones | | | 3999.4 | | | 1.25% |
| Sally Jones | | | 1614.6 | | | 2.15% |
| Sally Jones | | | 3537 | | | 1.75% |
| Sally Jones | | | 273.7 | | | 2.25% |

5426

5424 5444 5447

FIG. 54

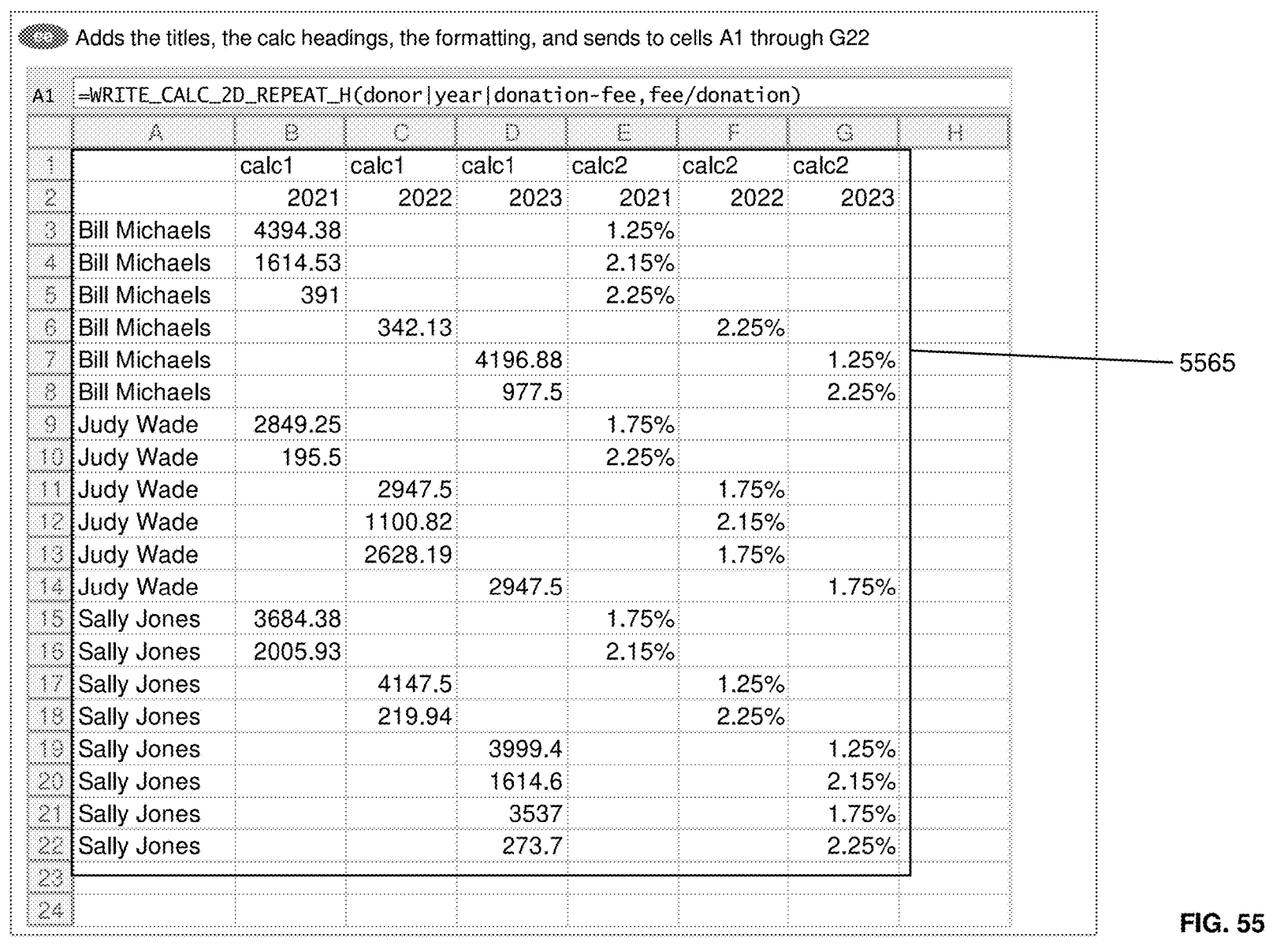

Adds the titles, the calc headings, the formatting, and sends to cells A1 through G22

A1 =WRITE_CALC_2D_REPEAT_H(donor|year|donation-fee,fee/donation)

| | A | B | C | D | E | F | G | H |
|---|---|---|---|---|---|---|---|---|
| 1 | | calc1 | calc1 | calc1 | calc2 | calc2 | calc2 | |
| 2 | | 2021 | 2022 | 2023 | 2021 | 2022 | 2023 | |
| 3 | Bill Michaels | 4394.38 | | | 1.25% | | | |
| 4 | Bill Michaels | 1614.53 | | | 2.15% | | | |
| 5 | Bill Michaels | 391 | | | 2.25% | | | |
| 6 | Bill Michaels | | 342.13 | | | 2.25% | | |
| 7 | Bill Michaels | | | 4196.88 | | | 1.25% | |
| 8 | Bill Michaels | | | 977.5 | | | 2.25% | |
| 9 | Judy Wade | 2849.25 | | | 1.75% | | | |
| 10 | Judy Wade | 195.5 | | | 2.25% | | | |
| 11 | Judy Wade | | 2947.5 | | | 1.75% | | |
| 12 | Judy Wade | | 1100.82 | | | 2.15% | | |
| 13 | Judy Wade | | 2628.19 | | | 1.75% | | |
| 14 | Judy Wade | | | 2947.5 | | | 1.75% | |
| 15 | Sally Jones | 3684.38 | | | 1.75% | | | |
| 16 | Sally Jones | 2005.93 | | | 2.15% | | | |
| 17 | Sally Jones | | 4147.5 | | | 1.25% | | |
| 18 | Sally Jones | | 219.94 | | | 2.25% | | |
| 19 | Sally Jones | | | 3999.4 | | | 1.25% | |
| 20 | Sally Jones | | | 1614.6 | | | 2.15% | |
| 21 | Sally Jones | | | 3537 | | | 1.75% | |
| 22 | Sally Jones | | | 273.7 | | | 2.25% | |
| 23 | | | | | | | | |
| 24 | | | | | | | | |

5565

FIG. 55

Adds the titles, the calc headings, the formatting, and sends to cells A1 through G22

A1 =WRITE_CALC_2D_REPEAT_H(donor|year|donation,-,fee,fee,/,donation)

| | A | B | C | D | E | F | G | H |
|---|---|---|---|---|---|---|---|---|
| 1 | | calc1 | calc1 | calc1 | calc2 | calc2 | calc2 | |
| 2 | | 2021 | 2022 | 2023 | 2021 | 2022 | 2023 | |
| 3 | Bill Michaels | 4394.38 | | | 1.25% | | | |
| 4 | Bill Michaels | 1614.53 | | | 2.15% | | | |
| 5 | Bill Michaels | 391 | | | 2.25% | | | |
| 6 | Bill Michaels | | 342.13 | | | 2.25% | | |
| 7 | Bill Michaels | | | 4196.88 | | | 1.25% | |
| 8 | Bill Michaels | | | 977.5 | | | 2.25% | |
| 9 | Judy Wade | 2849.25 | | | 1.75% | | | |
| 10 | Judy Wade | 195.5 | | | 2.25% | | | |
| 11 | Judy Wade | | 2947.5 | | | 1.75% | | |
| 12 | Judy Wade | | 1100.82 | | | 2.15% | | |
| 13 | Judy Wade | | 2628.19 | | | 1.75% | | |
| 14 | Judy Wade | | | 2947.5 | | | 1.75% | |
| 15 | Sally Jones | 3684.38 | | | 1.75% | | | |
| 16 | Sally Jones | 2005.93 | | | 2.15% | | | |
| 17 | Sally Jones | | 4147.5 | | | 1.25% | | |
| 18 | Sally Jones | | 219.94 | | | 2.25% | | |
| 19 | Sally Jones | | | 3999.4 | | | 1.25% | |
| 20 | Sally Jones | | | 1614.6 | | | 2.15% | |
| 21 | Sally Jones | | | 3537 | | | 1.75% | |
| 22 | Sally Jones | | | 273.7 | | | 2.25% | |
| 23 | | | | | | | | |
| 24 | | | | | | | | |

5965

FIG. 59

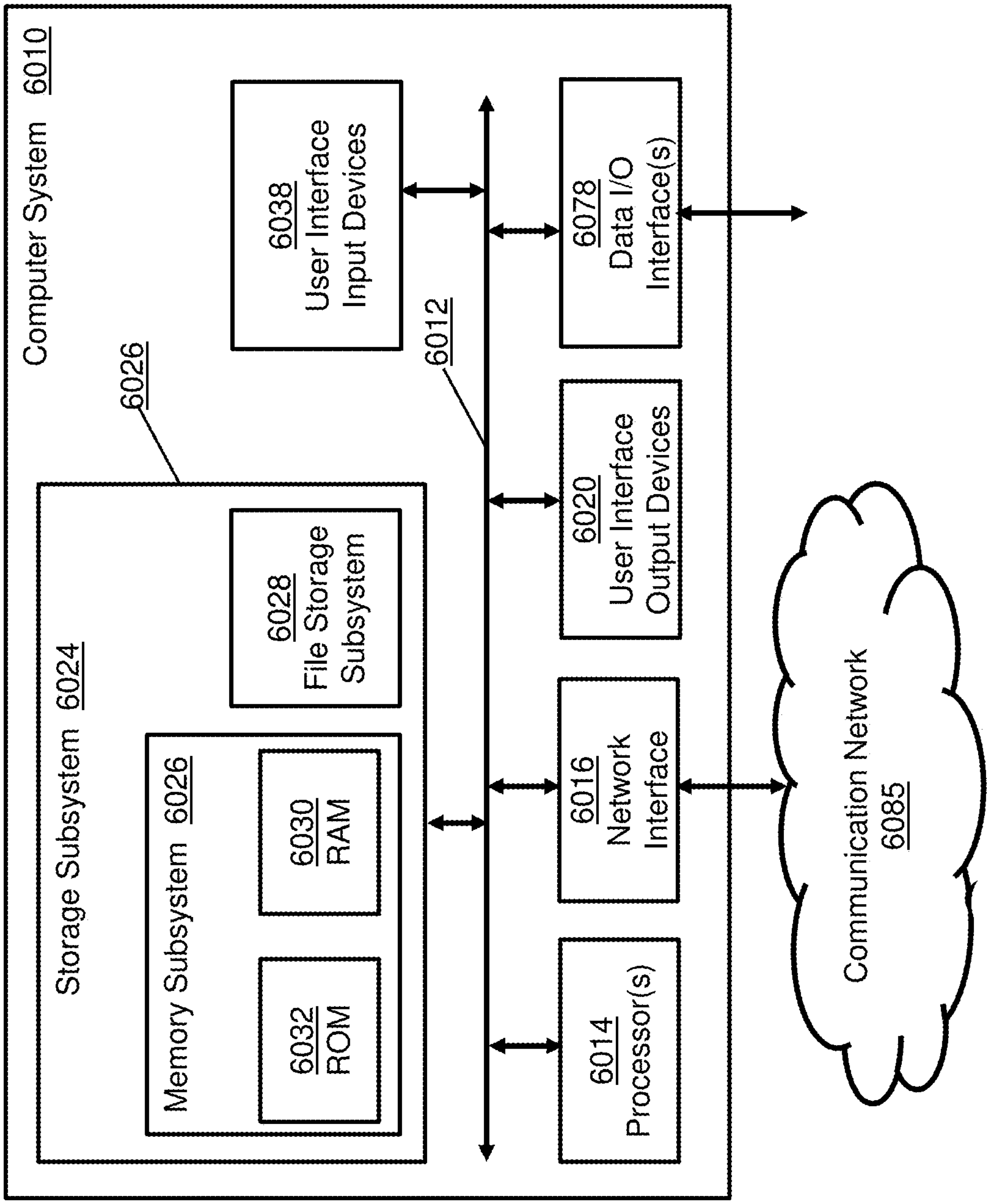
Fig. 60 Computer System

METHOD AND SYSTEM FOR REPEAT 2D ORDERING OF OUTPUT FROM SPREADSHEET ANALYTICAL FUNCTIONS

PRIORITY APPLICATION

This application is a continuation-in-part of U.S. application Ser. No. 17/903,934 titled "Method and System for Improved 2d Ordering of Output from Spreadsheet Analytical Functions," filed 6 Sep. 2022 which claims the benefit of U.S. Provisional Patent Application No. 63/240,828, filed 3 Sep. 2021. The priority applications are incorporated reference herein in their entirety.

RELATED APPLICATIONS

This application is related to and incorporates by reference the following applications:

U.S. Application Ser. No. 16/31,339 titled "Methods and Systems for Providing Selective Multi-Way Replication and Atomization of Cell Blocks and Other Elements in Spreadsheets and Presentations," filed 10 Jul. 2018, now U.S. Pat. No. 11,182,548, issued 23 Nov. 2021, which claims the benefit of U.S. Provisional Application No. 62/530,835, filed 10 Jul. 2017.

U.S. Application Ser. No. 16/31,379 titled "Methods and Systems for Connecting a Spreadsheet to External Data Sources with Formulaic Specification of Data Retrieval," filed 10 Jul. 2018, now U.S. Pat. No. 11,354,494, issued 7 Jun. 2022, which claims the benefit of U.S. Provisional Application No. 62/530,786, filed 10 Jul. 2017.

U.S. Application Ser. No. 16/31,759 titled, "Methods and Systems for Connecting a Spreadsheet to External Data Sources with Temporal Replication of Cell Blocks," filed 10 Jul. 2018, now U.S. pat. No. 11,17,165, issued 25 May 2021, which claims the benefit of U.S. Provisional Patent Application No. 62/530,794, filed 10 Jul. 2017.

U.S. application Ser. No. 16/191,402 titled, "Methods and Systems for Connecting a Spreadsheet to External Data Sources with Ordered Formulaic Specification of Data Retrieved," filed 14 Nov. 2018, now U.S. pat. No. 11,36,929, issued 15 Jun. 2021, which claims the benefit of U.S. Provisional Patent Application No. 62/586,719, filed on Nov. 15, 2017.

U.S. application Ser. No. 17/359,430 titled, "Methods and Systems for Constructing a Complex Formula in a Spreadsheet Cell," filed 25 Jun. 2021, which claims the benefit of U.S. Provisional Patent Application No. 63/044,990, filed 26 Jun. 2020.

U.S. application Ser. No. 17/359,418 titled "Methods and Systems for Presenting Drop-Down, Pop-Up or Other Presentation of a Multi-Value Data Set in a Spreadsheet Cell," filed 25 Jun. 2021, now U.S. Pat. No. 11,657,217, issued 25 May 2023, which claims the benefit of U.S. Provisional Patent Application No. 63/044,989, filed 26 Jun. 2020.

U.S. application Ser. No. 17/384,404 titled "Method and System for Improved Spreadsheet Charts," filed 23 Jul. 2021, which claims the benefit of U.S. Provisional Patent Application No. 63/055,581, filed 23 Jul. 2020.

U.S. application Ser. No. 17/374,898 titled "Method and System for Improved Spreadsheet Analytical Functioning," filed 13 Jul. 2021, now U.S. Pat. No. 11,694,23, issued 4 Jul. 2023, which claims the benefit of U.S. Provisional Patent Application No. 63/051,280, filed 13 Jul. 2020.

U.S. application Ser. No. 17/374,901 titled "Method and System for Improved Ordering of Output from Spreadsheet Analytical Functions," filed 13 Jul. 2021, which claims the benefit of U.S. Provisional Patent Application No. 63/051, 283, filed 13 Jul. 2020.

U.S. application Ser. No. 17/752,814 titled "Method and System for Spreadsheet Error Identification and Avoidance," filed 24 May 2022 which claims the benefit of U.S. Provisional Patent Application No. 63/192,475, filed 24 May 2021.

U.S. application Ser. No. 17/988,641 titled "Methods and Systems for Sorting Spreadsheet Cells with Formulas," filed 16 Nov. 2022 which claims the benefit of U.S. Provisional Patent Application No. 63/280,590, filed 17 Nov. 2021.

U.S. application Ser. No. 18/074,301 titled "Method and System for Improved Visualization of Charts in Spreadsheets," filed 2 Dec. 2022 which claims the benefit of U.S. Provisional Patent Application No. 63/25,945, filed 3 Dec. 2021.

U.S. application Ser. No. 18/142,560 titled "Methods and Systems for Spreadsheet Function and Flex Copy-Paste Control of Formatting and Use of Selection List Panels," filed 2 May 2022 which claims the benefit of U.S. Provisional Application No. 63/337,576, filed 2 May 2022.

U.S. application Ser. No. 18/142,557 titled "Methods and Systems for Bucketing Values in Spreadsheet Functions," filed 2 May 2023 which claims the benefit of U.S. Provisional Application No. 63/337,572, filed 2 May 2022.

U.S. Provisional Application No. 63/433,408, titled "Methods and Systems for Flexibly Linking Spreadsheet Cell Movements and Formulas," filed 16 Dec. 2022.

U.S. Provisional Application No. 63/525,138, titled "Methods and Systems for Specifying and Using in Spreadsheet Cell Formulas Joins Between Data Sets," filed 5 Jul. 2023.

U.S. Provisional Application No. 63/529,135, titled "Methods and Systems for Specifying And Using Joins Between Data Sets In A Spreadsheet Data Visualizer," filed 5 Jul. 2023.

U.S. Provisional Application No. 63/622,515, titled "Methods and Systems for a Family of Dual Entry Spreadsheet Functions, Improved Spreadsheet Validations, and Partial Locking of Spreadsheet Functions and Cell Capabilities," filed 18 Jan. 2024.

BACKGROUND

Our previously described prebuilt spreadsheet function technology makes it incredibly easy to solve two-dimensional spreadsheet problems requiring repetitive evaluations (i.e., programming loops) and tailored presentation of the outcomes. It is outstanding for problems with results involving ordering of outcomes (e.g., largest to smallest, first to last) as part of answering user questions and solves problems employing a much broader set of functions and algebraic formulas than conventional spreadsheet Pivot Tables. However, neither it nor Pivot Tables allow users to solve a broad set of different multiple two-dimensional sets of problems employing shared headings and sorting. Additionally, our previously described prebuilt function technology makes it incredibly easy to two-dimensionally filter and sort data, sourced from spreadsheet cells or external data sets. However, that technology does not support filtering and sorting multiple sets of two-dimensional data employing shared headings and ordering, so the user sees multiple sets of identically ordered data.

Accordingly, an opportunity arises for prebuilt spreadsheet functions to organize two-dimensional sets of calculations sharing calculational headings for one dimension (axis) and repeating calculation headings per calculation for the other dimension (axis) to create repeated sets of calculations. An opportunity also arises for prebuilt spreadsheet functions to organize two-dimensional sets of calculations sharing calculational headings for both dimensions although for one of the complementary dimensions and headings creating repeating sets of different calculations. Where these repeating sets of calculations can share ordering (sorting) of the sets of repeated calculated outcomes and be used for a broad set of functional and algebraic calculations. Where these sets of headings and calculations are sourced from in spreadsheet cell data or non-spreadsheet cell data from external data.

Additionally, an opportunity arises for prebuilt spreadsheet functions to organize multiple two-dimensional sets of related data fields sharing headings for one dimension and repeating the same headings per multiple data field for the other complementary dimension to create repeated sets of related two-dimensional data results. An opportunity also arises for prebuilt spreadsheet functions to organize two-dimensional sets of related data fields sharing headings for both dimensions although for one of the dimensions and headings creating repeating sets of the related data fields. Where these repeating sets of related fields share ordering (sorting) and where the related data fields are sourced from in spreadsheet cell data or non-spreadsheet cell data from external data.

SUMMARY

The disclosed technology creates a family of (predefined formula) prebuilt spreadsheet functions which allows users to create multiple sets of programming loop equivalents in their regular spreadsheet cells employing familiar range functions (e.g., SUM, COUNT, MIN, MAX, etc.) and/or algebraic operations with data filtering and output ordering/sorting for related sets of two-dimensional problems. Other embodiments allow users to create multiple two-dimensional sets of different algebraic formulas in their regular spreadsheet cells with or without non-range or non-array functions with data filtering and output ordering/sorting for related sets of two-dimensional problems. The technology allows users to specify standardized or highly customized sets of calculations capable of executing millions of loops through a (predefined formula) spreadsheet function.

Other embodiments of the disclosed technology creates a family of (predefined formula) prebuilt spreadsheet functions which allows users to create, in their regular spreadsheet cells, multiple two-dimensional sets of identically organized different related data fields.

For all of our embodiments the data can be sourced from multiple cells within the spreadsheet or a broad spectrum of numeric, date, Boolean, and text data not stored in a spreadsheet, including data not discretely defined. The technology disclosed can use as inputs either cell ranges or Non-Spreadsheet Cell (NSC) data formulas.

All the embodiments of the disclosed technology supports single and multivariable compound (nested) loop equivalents or organization on both output dimensions (e.g., complementary rows and columns) for the sets of data fields or calculations. Those loop equivalents or data organization can orient (display) the data vertically or horizontally. In the applicable situations those loops of our technology can spread or collapse the multiple sets of calculation results or two-dimensional data. The disclosed functions allow users to easily add constraints (filters) that alter the data presented to meet their needs. It allows many alternatives on ordering/sorting the output including calculation result rankings which override the headings loop equivalent or values order. The disclosed technology allows users to highly customize what gets displayed in the cells from the two-dimensional loop equivalents or organizations and their calculations. And all of these families of functions support a broad spectrum of syntax/argument structures for the functional formulas.

Particular aspects of the technology disclosed are described in the claims, specification, and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 13, 14, 15, 16, 17, and 18 example automatically done steps by our functional formulas in FIGS. 3, 4, 5, 6, 7, 8, 9, 10, 11, and 12.

FIGS. 23, 24, 25, 26, 27, 28, and 29 example automatically done steps by our functional formulas in FIGS. 19, 20, 21, and 22.

FIGS. 35, 36, 37, 38, 39, 40, 41, and 42 example automatically done steps by our functional formulas in FIGS. 30, 31, 32, 33, 34, and 56.

FIGS. 45, 46, 47A, 47B, 48, 49A, and 49B example automatically done steps by our functional formulas in FIGS. 43, and 44.

FIGS. 53, 54, and 55 example automatically done steps by our functional formulas in FIGS. 52 and 58.

FIG. 59 examples an automatically done step by our functional formula in FIG. 58.

FIG. 60 depicts an example computer system that can be used to implement aspects of the technology disclosed.

DETAILED DESCRIPTION

Figure 1A:
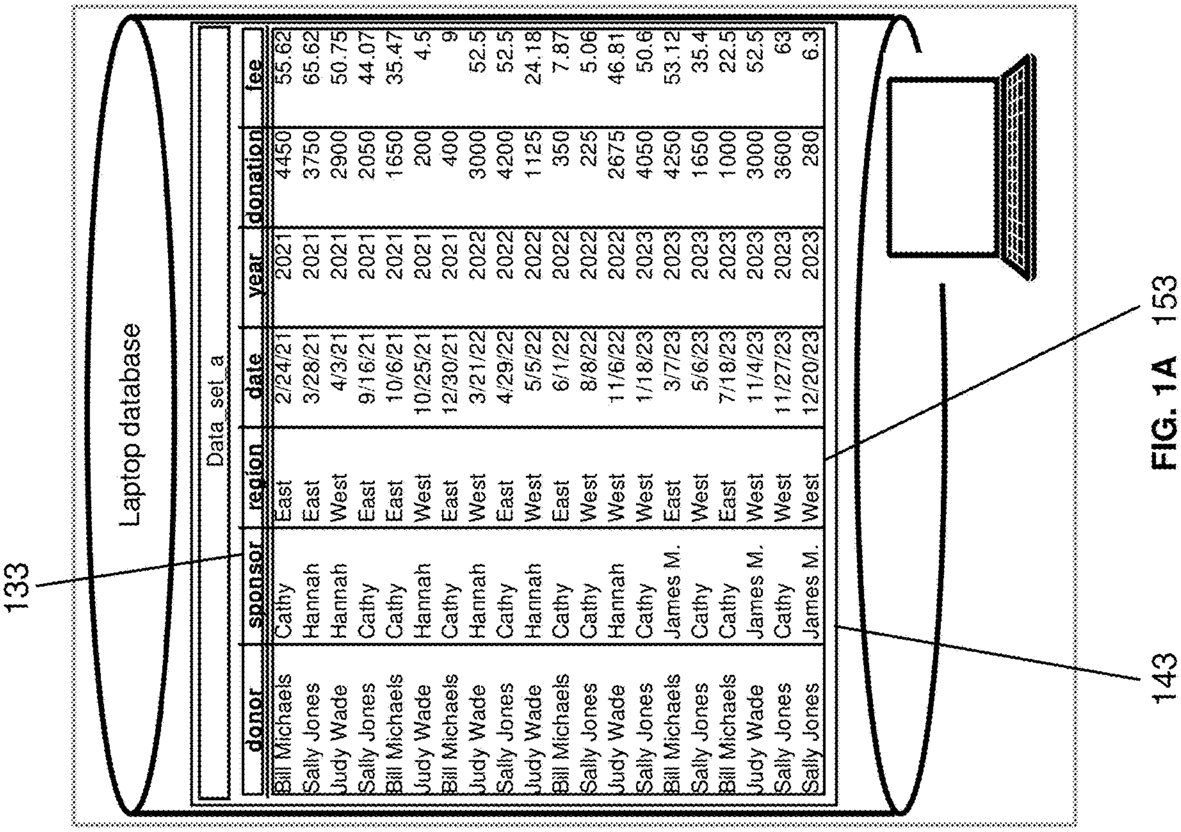
FIGS. 1A and 1B example two of many different variants of non-spreadsheet cell (NSC) external data sets which can be employed by our spreadsheet predefined functions.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers, and others have dramatically increased the breadth of capabilities and usefulness of spreadsheets. Spreadsheet applications now access data across a wide variety of sources including relational, structured, and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With their added capabilities, spreadsheet applications have become substantially more complicated. The data manipulation and embedded programming language capabilities can be very powerful but are complicated to learn and therefore they are used by a very small fraction of the spreadsheet application user base. There are other advanced capabilities including Pivot Tables, Power Pivot and Power Query that allow users to manipulate data in spreadsheet overlays and processes from which formulas and cells can be extracted by further capabilities such as Cube Functions (e.g., for Pivot Tables). These capabilities require users to learn very different interfaces, and operations that operate very separately from their regular cell activities. As such only a fraction of users knows these capabilities which require learning and remembering very different operations. All this complexity has led to over a hundred books and thousands of online videos that have been published to help users understand the capabilities of Microsoft Excel alone.

Spreadsheet providers like Microsoft Excel and Google Sheets cater to the specialized needs of users through many mechanisms including vast numbers of spreadsheet functions (e.g., built in predefined formulas including SUM, COUNT and MIN). Microsoft Excel and Google Sheets includes more than four hundred built-in (prebuilt—delivered with the spreadsheet) functions. These built-in functions make operations desired by users dramatically simpler and are used by virtually every user.

The formulaically defined Non-Spreadsheet Cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to create one prebuilt function formula that accomplishes multiple sets of related analyses which are then similarly ordered (sorted) for easy comparison across the sets of analyses. These analyses produce two or more sets of our analyses in U.S. application Ser. No. 17/903,934 titled "Method and System for Improved 2d Ordering of Output from Spreadsheet Analytical Functions," filed 6 Sep. 2022 with shared headings and the ability to synchronize sorting and collapsing of the multiple sets of results which would not be otherwise possible from our previous technology. Our new technology makes it as easy as adding one argument to a functional formula to create an additional set of synchronized analyses. Those analyses can range from organizing related sets of data, doing different sets of algebraic calculations, doing sets of single range or array function calculations, to doing sets of multiple range and array function algebraic calculations. For case of identification of our three families of new predefined two-dimensional functions (functions delivered with the software), we will label the first one doing sets of range or array functions calculations "range or array functions", the second doing sets of algebraic calculations without range or array functions "non range or array functions", and the third arranging sets of related data "no calculation functions".

PRIOR ART

Figure 61:
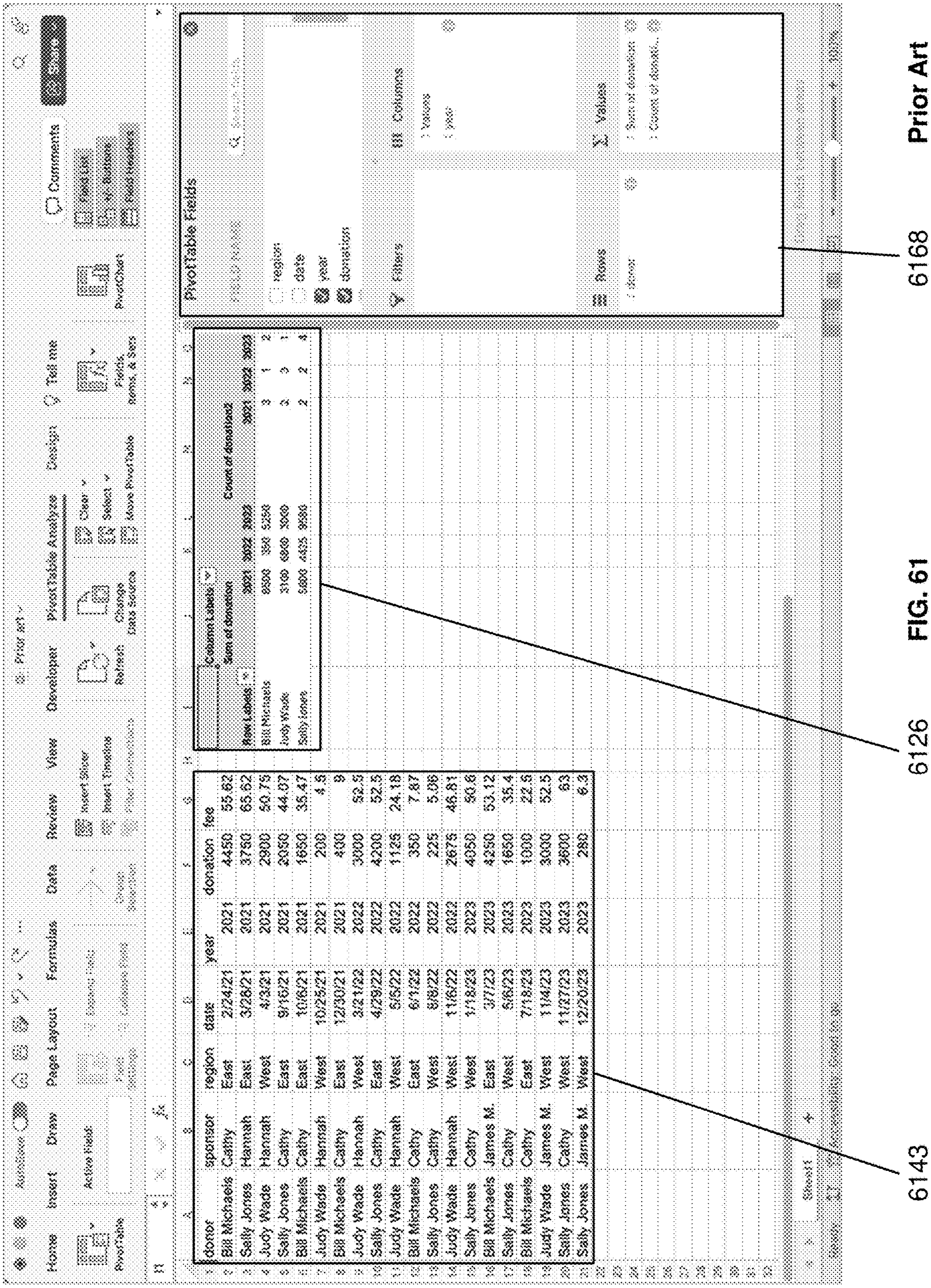
FIG. 61 Prior Art
FIGS. 61 and 62 example the Microsoft Excel PivotTable multiple GROUP repetition prior art for range or array function PivotTable assessments.

Existing spreadsheets do not have any prebuilt functions that create repetitions like any of the three families of our functions we are about to discuss. The only existing spreadsheet capability close is the PivotTable capability to do multiple range function calculations as exampled in FIG. 61 and FIG. 62. Recognizing that PivotTables are not spreadsheet functions for all of the reasons previously described in our U.S. application Ser. No. 17/374,901 titled "Method and System for Improved Ordering of Output from Spreadsheet Analytical Functions," filed 13 Jul. 2021 and U.S. application Ser. No. 17/903,934 titled "Method and System for Improved 2d Ordering of Output from Spreadsheet Analytical Functions," filed 6 Sep. 2022. They are not formula generated but instead use a very different setup interface exampled in FIG. 61 6168 and FIG. 62 6268 for Microsoft Excel (with somewhat similar interfaces in the other spreadsheets). As we will example later our technology supports three different families of functions, each of which has a 'SERIES' and 'GROUP' output ordering variant. The current spreadsheet PivotTables can only do its non-function version of our "Range or array function family" GROUP Horizontal variants. It cannot create any output similar to our "range or array function family" GROUP vertical variants, our "range or array function family" SERIES variants, any variant of our "non-range or non-array function family", or any of our "no calculation function family".

Figure 62:
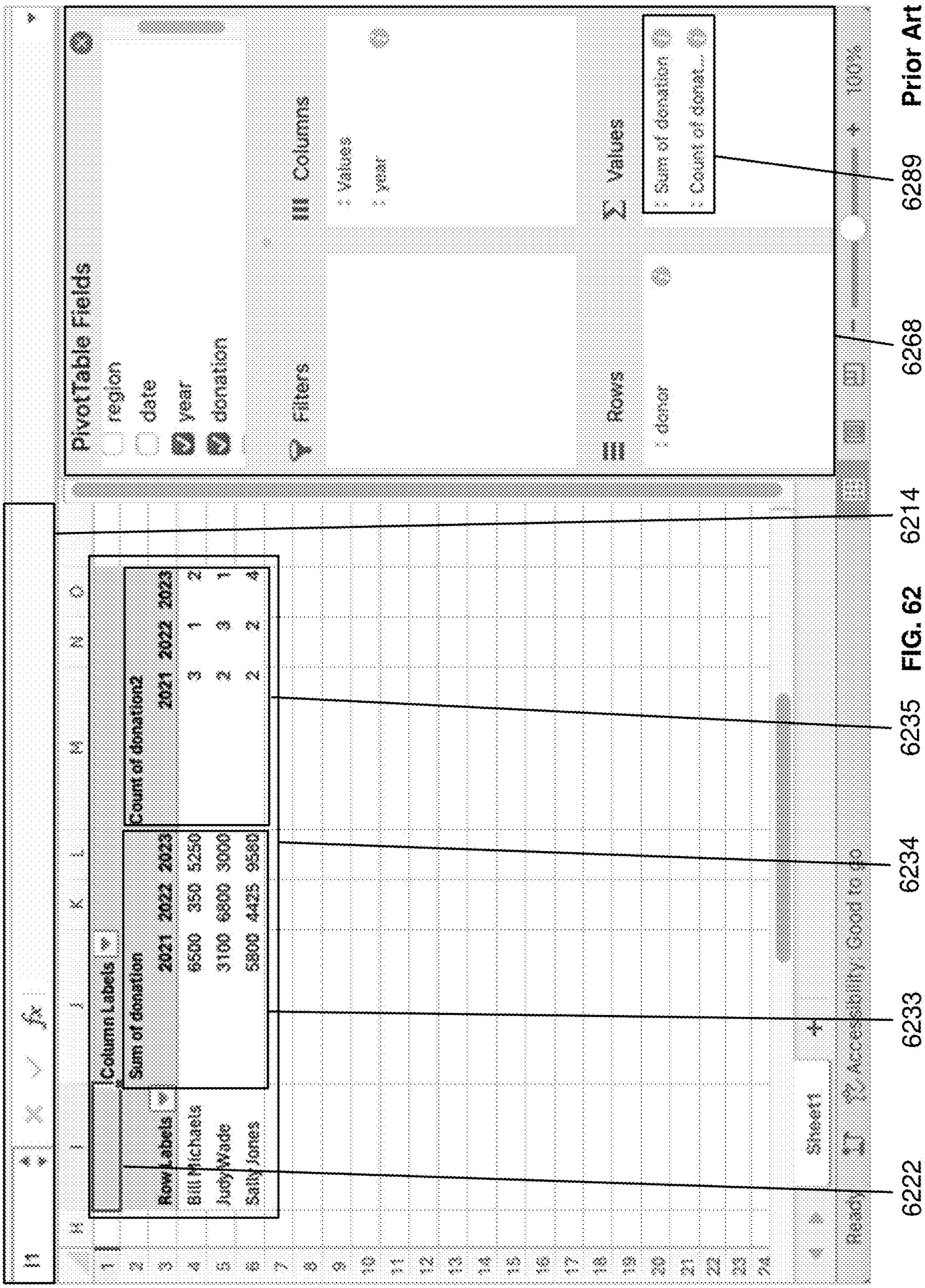
FIG. 62 Prior Art

Creating the PivotTable is not done via a formula but uses a very different set of interfaces and very different set of steps as exampled in our previous U.S. application Ser. No. 17/374,901 titled "Method and System for Improved Ordering of Output from Spreadsheet Analytical Functions," filed 13 Jul. 2021 and U.S. application Ser. No. 17/903,934 titled "Method and System for Improved 2d Ordering of Output from Spreadsheet Analytical Functions," filed 6 Sep. 2022. It involves numerous ribbon and other UI selection steps to get to the setup exampled by 6168 in FIG. 61 and by 6268 in FIG. 62 that generates the PivotTable outputs 6126 in FIGS. 61 and 6234 in FIG. 62 from the data 6143 in FIG. 61. This example generates two GROUP repetition outputs 6233 and 6235 in FIG. 62. The output 6126 in FIGS. 61 and 6234 in FIG. 62 is similar to our prebuilt function formula output 677 in FIG. 6 while how it was delivered and the spectrum of different range or array calculations supported by our technology is entirely different as we will example next.

Families of Our New Functions

The first family of our two-dimensional repetitive table generator predefined functions generates two or more two dimensional repetitions of different loop equivalent calculations each employing one or more range or array functions (e.g., SUM, MIN, MAX, or COUNT). As we will example, our technology supports functions employing different syntaxes/argument structures. It supports calculations from simple one range or array function evaluations to complicated range and array combination algebraic formulas including loop equivalent and non-loop equivalent data fields. Some variants support constraints/filters of the fields employed in the calculations and their accompanying loop equivalent heading fields. Some variants support different options for sorting, titling, and other modes of altering the functional output. For brevity's sake, we will example some of these features in this family of functions and some in our other family of functions, rather than exampling every mix and match combination.

Cell and Non-Cell Data Sets Supported

As described in our related applications, our technology supports in most situations the interchangeable use of spreadsheet cell data sets and non-spreadsheet cell (NSC) external data sets through what we call formulaic data. Where rows or columns of the data within the data set can be formulaically related to other rows or columns of the data employing data set identifiers, typically data column heading names or their proxies or sometimes cell ranges—for data stored in spreadsheet cells.

Figure 1B:
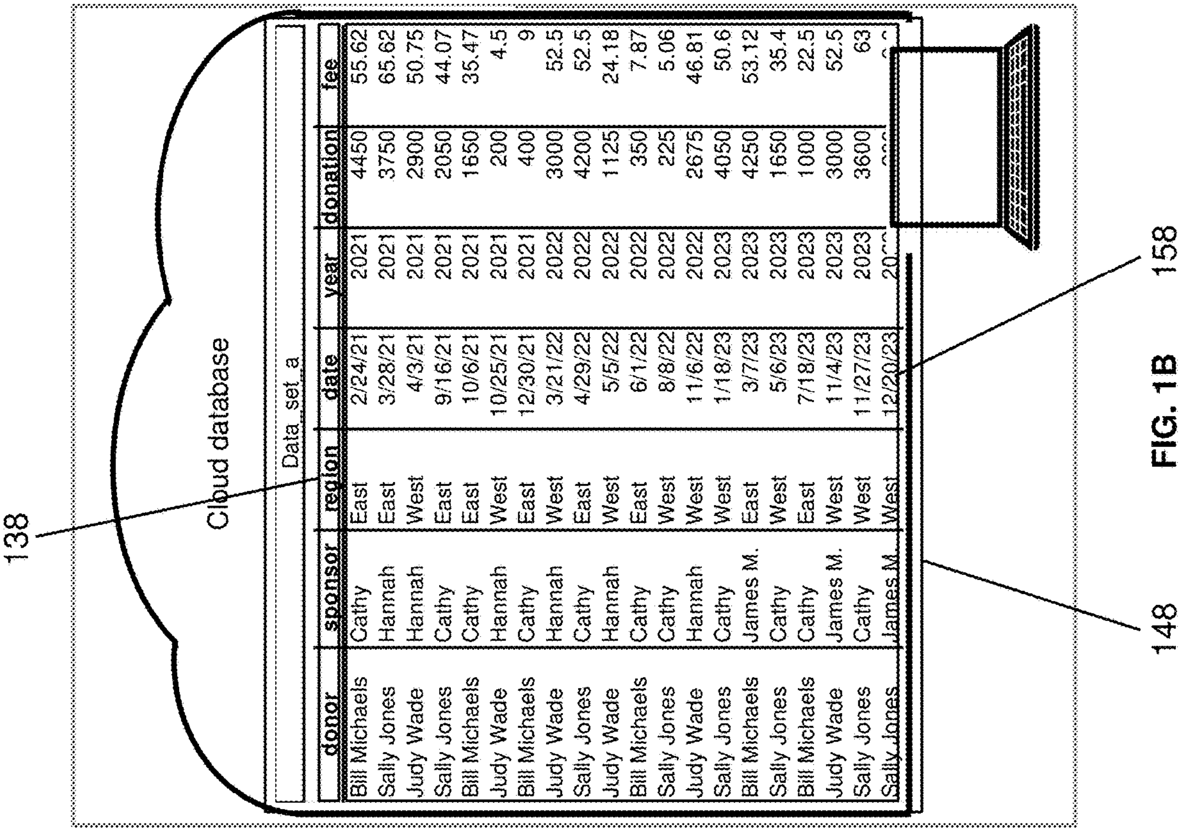

FIG. 1A and FIG. 1B example two of many different variants of non-spreadsheet cell (NSC) external data sets which can be employed by our spreadsheet predefined functions. FIG. 1A examples a data set named 'Data_set_a' 143 which is resident on the user's computer (e.g. laptop) and connected by our technology directly to the cell functional formulas employing our non-spreadsheet cell (NSC) formulaic data. FIG. 1B examples the same data set also named 'Data set a' 148 which is resident in the cloud and connected by our technology directly to the spreadsheet cell functional formulas employing our non-spreadsheet cell (NSC) formulaic data. In these examples the data is in seven columns, 153 in FIG. 1A and 158 in FIG. 1B, using the column headings, 133 in FIG. 1A and 138 in FIG. 1B, as the formulaic data description terms (names). Those column headings work as long as they are unique and where not unique are made unique by changing them or in multi data set situations adding some table identifier (e.g., table name or table identifier) to make them unique.

Figure 2B:
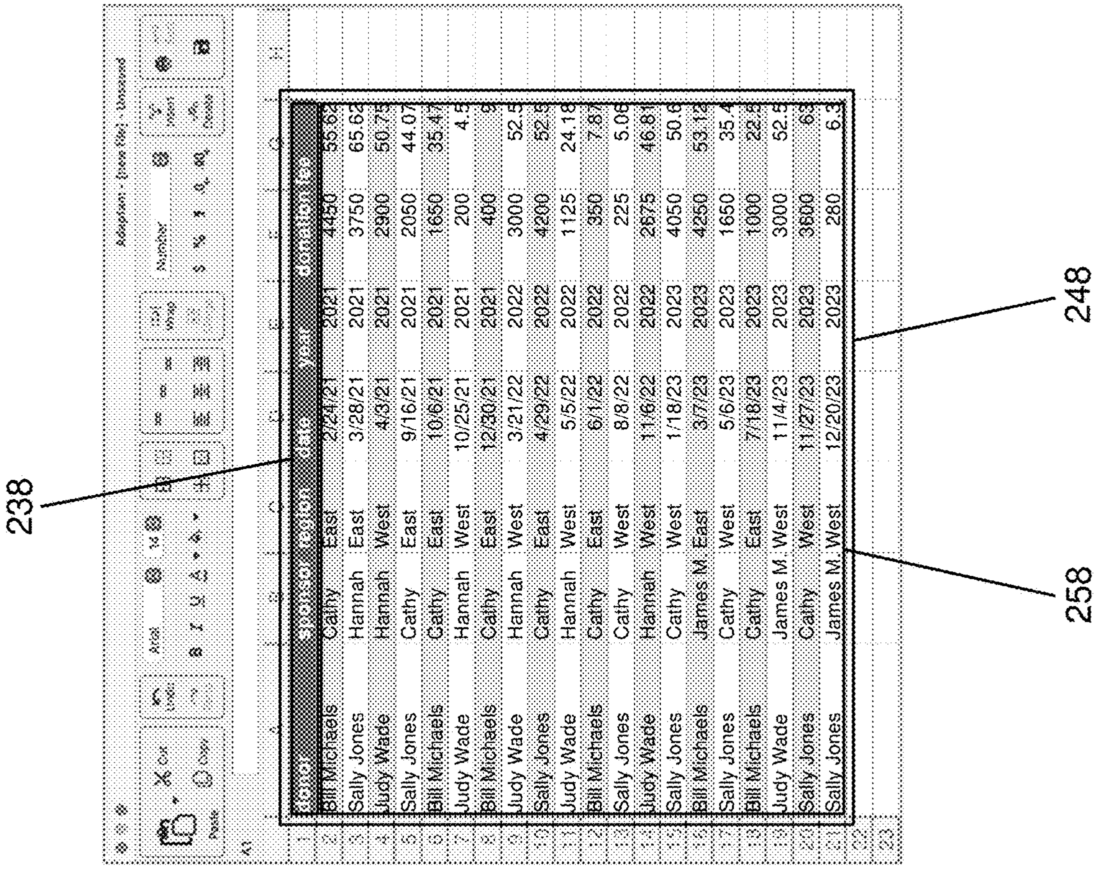
FIGS. 2A and 2B example two of many different variants of spreadsheet cell data sets which can be employed by our spreadsheet predefined functions.
Figure 2A:
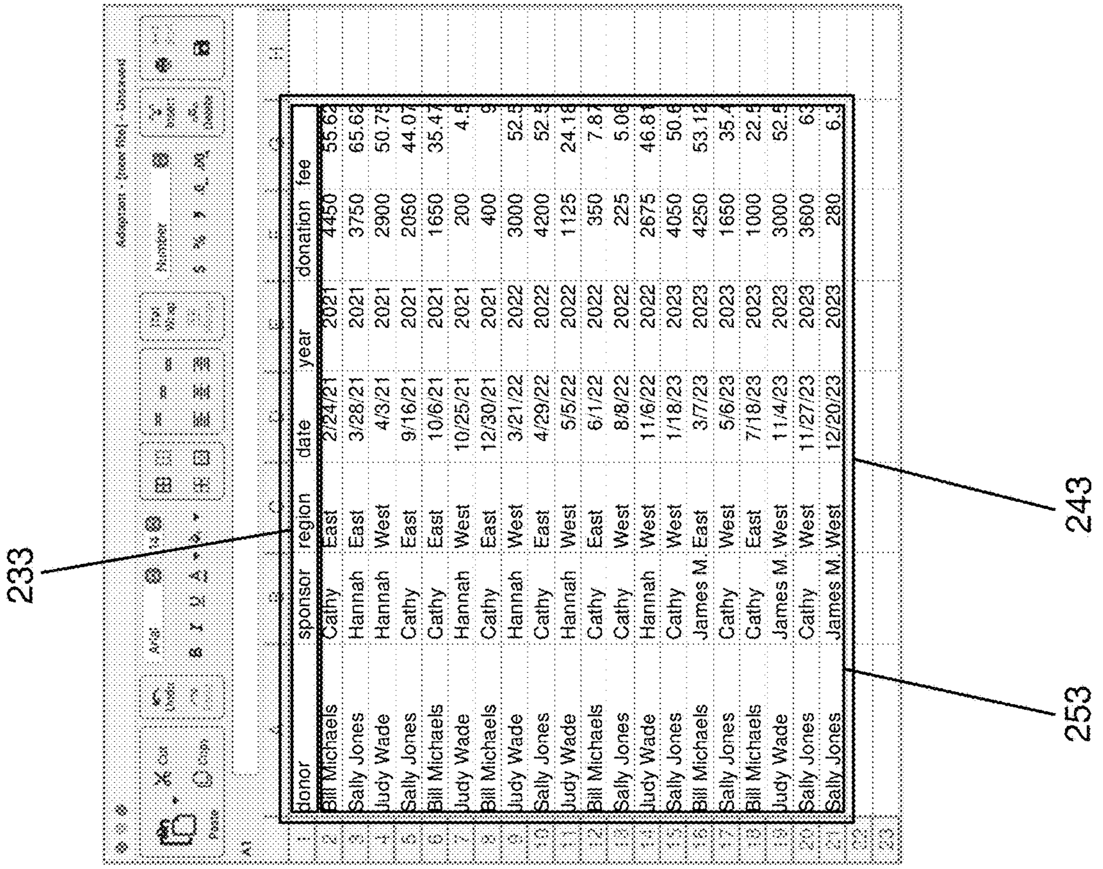

FIG. 2A and FIG. 2B example two of many different variants of spreadsheet cell data sets which can be employed by our spreadsheet predefined functions. They example data sets in columns, 253 in FIG. 2A and 258 in FIG. 2B, using column headings, 233 in FIG. 2A and 238 in FIG. 2B, as the formulaic data description terms for the data sets 243 in FIG. 2A and 248 in FIG. 2B. FIG. 2A 243 examples the data in regular cells with adjacent columns headings while FIG. 2B 248 examples the data in cells which have been transformed into a spreadsheet table with headings. Those column or table headings work as long as they are unique and where not unique are made unique by changing them or in multi data set situations adding some table or data range identifier (e.g., table name or table identifier) to make them unique. Because the formulaic data descriptive terms are all the same for exactly the same data in FIG. 1A through FIG. 2B all of the examples that follow could be supplied data by any one of these or any other data sets employing the same field names. Thereby exampling the interchangeability of the different data sources in our technology.

FIG. 2A and FIG. 2B also examples a variant where if the data, 253 in FIG. 2A and 258 in FIG. 2B, is used without the headings (233 in FIG. 2A) or table headings (238 in FIG. 2B) the cell ranges become the formulaic data descriptive terms (formulaic data field names) but otherwise our new functions work the same way. Use of the cell ranges as the formulaic data descriptive terms (formulaic data field names) works as exampled in our U.S. application Ser. No. 17/903,934 titled "Method and System for Improved 2d Ordering of Output from Spreadsheet Analytical Functions," filed 6 Sep. 2022.

Range or Array Function Family—Required Only Arguments

Figure 3:
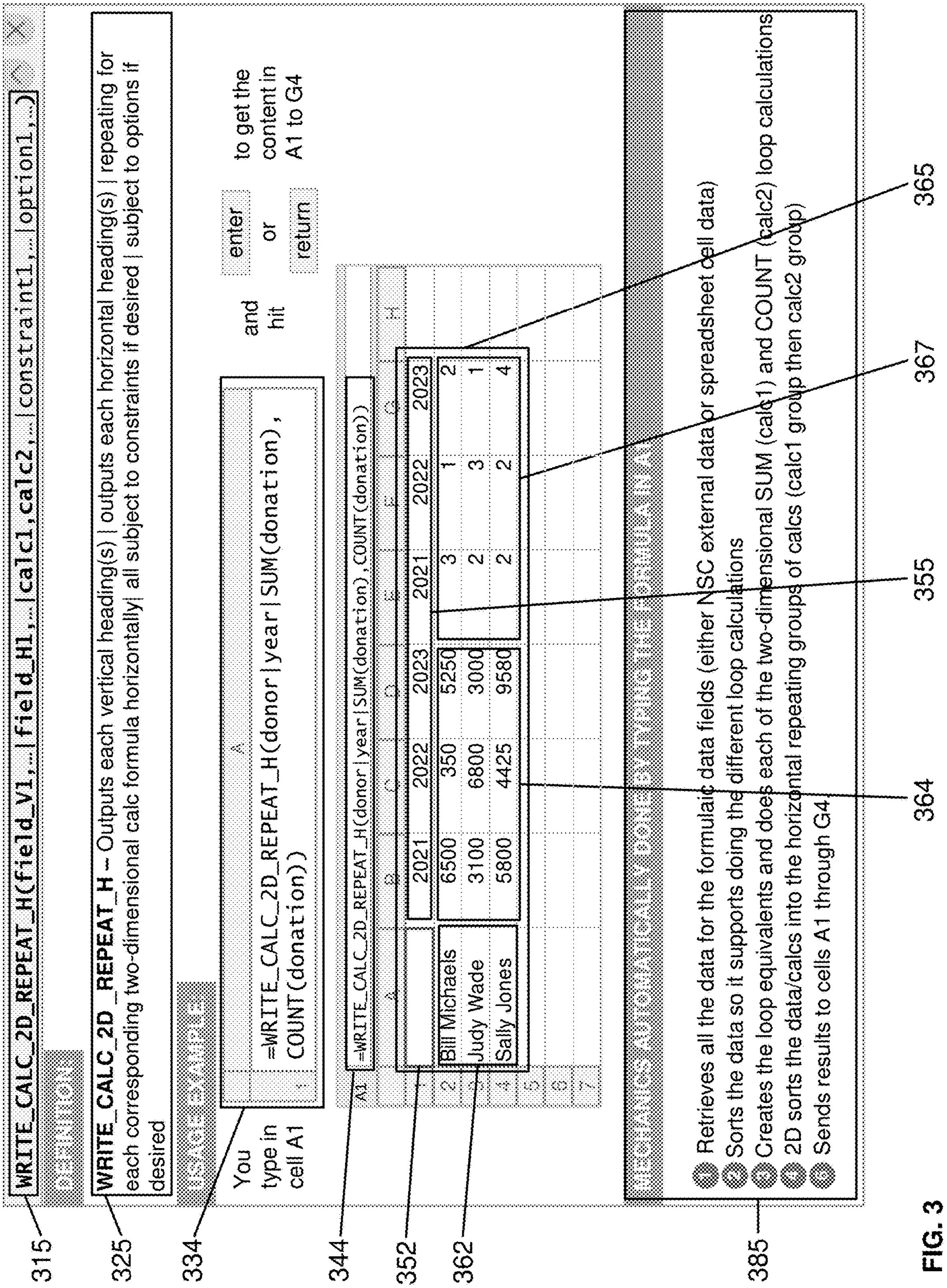
FIG. 3 examples an embodiment of our range or array family of repeat calculation prebuilt functions which populates the repetitions horizontally without calculation headings employing an argument group syntax/argument structure for a formula with only the required arguments.

FIG. 3 examples one syntax/argument structure of our range or array family of repeat calculation prebuilt functions. It is a very simple example of our spreadsheet function technology doing two-dimensional group (loop) calculations exampling the use of only the required arguments. The syntax/arguments 315 of the function in this embodiment are:

WRITE_CALC_2D_REPEAT_H(field_V1, . . . |field_H1, . . . |calc1, calc2, . . . |constraint1, . . . |option1, . . . )

with the required arguments bolded. The name of the function 'WRITE_CALC_2D_REPEAT_H could be any name, ideally not already used in typical spreadsheets. We use this name because it is descriptive in that the 'WRITE' tells the user it instantiates many different cells, the 'CALC' tells the user it does calculations (in this situation range or array function calculations), the '2D' tells the user it employs two dimensional equivalent loop headings, the 'REPEAT' tells the user it does more than one two-dimensional set, and the 'H' tells the user that those different sets are displayed horizontally. How the syntax/argument structure works is briefly explained in 325. This syntax/argument structure 315 employs two argument delimiters, i.e., commas and vertical bars. The advantage of this approach is that there is an application specified argument group structure containing required and optional arguments laid out for the user as shown in 315. It has greater flexibility than the more typical spreadsheet single delimiter (e.g., commas) approach to have flexible numbers of arguments within the argument groups while still providing the user with the prebuilt function specified structure of argument groups (e.g., separated by the vertical bars) and defined structure of the required and optional arguments (e.g., separated by commas) within the argument groups. This syntax/argument structure also has one additional flexibility benefit in that the calcs are specified like spreadsheet formulas, e.g., 'SUM (donation)' or 'SUM(fee)/SUM(donation)', rather than in their separate arguments specifying fields, functions and any algebraic operators separately (something we call single specifiers). These compound specifiers, supported by our technology, allow users to write the formula of their choice containing functions, fields, and algebraic operators into a single argument. This affords much greater breadth of calcs from a single function syntax/argument structure.

In the syntax in 315 the first two argument groups, 'field_V1, . . . |field_H1, . . . |' each contain one required argument, the 'field_V1' and the 'field_H1' which at a minimum ensure there are complementary vertical and horizontal headings for the two-dimensional calculations. The ' . . . ' in each of the argument groups lets the user know they can add as many nested additional fields to each of the vertical and horizontal headings. For example, they could add a 'field_V2,field_V3' and therefore have three nested field values populating the vertical headings.

We are exampling our technology with the very small data set shown in either FIG. 1A, FIG. 1B, FIG. 2A, and FIG. 2B to make more visible what our technology is doing without the complexity of typically large data sets. As we have mentioned, our examples could be using any one of those data sources or any variants. We will illustrate for explanation purposes steps of what our technology is doing (summarized in 385 and exampled in more detail in FIG. 13 and FIG. 14), recognizing this is for understanding of what it is doing and not an exact depiction of how our application code is doing it. FIG. 3 starts with a charity worker looking to analyze and then present the total donations (first 2D group of calculations) and the count of donations (second 2D group of calculations) by donor by year. To do that in our technology the user inputs the formula 334:

'=WRITE_CALC_2D_REPEAT_H(donor|year|SUM (donation), COUNT(donation))' where 'donor' is the formulaic data field input 'field_V1' that provides the vertical table headings, 'year' is the field input 'field_H1' that provides the horizontal table headings, and together they create the unique combination values loop equivalents. Because this function is the horizontal repeat version, as designated by the '_H' in the function name, the repeated calculations will be done horizontally sharing the vertical table headings ('donor') and replicating the complementary horizontal table headings ('year). The calc1 argument 'SUM (donate)' does the two-dimensional group (loop equivalent) calculations applying the range function SUM to the formulaic data field 'donation' for each 'donor' and 'year' loop equivalent. The calc2 argument 'COUNT(donate)' does the two-dimensional group (loop equivalent) calculations applying the range function COUNT to the formulaic data field 'donation' for each loop equivalent. The data retrieval is done in step one 1343 in FIG. 13 and could source the data from either in cell (e.g., FIG. 2A or FIG. 2B) or non-spreadsheet cell (e.g., FIG. 1A or FIG. 1B) data sets. Step two 1345 in FIG. 13 sorts the data for the two-dimensional loops and step three 1348 does the two sets (calc1 and calc2) of loop calculations. Step four 1424 in FIG. 14 two-dimensionally sorts the vertical and horizontal heading field values with ascending values (the defaults) and their related two sets of (loop) calculations replicating the horizontal headings for 'calc2' to generate the two calc repetitions 1425 and 1428 complete with the replicated headings. The next step, labelled step six 1485, then cell formats the results and sends them and the formula to cells 'A1' to 'G4' 365 in FIG. 3 giving the charity worker two sets of identically sorted organized sets of analyses for easy review. Those results are the vertical table headings 362 in FIG. 3 from the formulaic data input 'donor'. The horizontal table headings 355 from the formulaic data input 'year' are repeated twice, first for the calc1loop equivalent results 364 and second for the calc2 loop equivalent results 367 to give the total results 365 from the formula 344 in cell 'A1' 352.

This gives the user a highly scalable analytical and data presentation tool where multiple calculation formulas can work through very large sets of data doing repeated looped two-dimensional calculations. Because those results are sorted identically, they are easily compared giving users a powerful analytical tool as simple as a functional formula. We will now example many variants of our technology before exampling different function syntax/argument structures.

Range or Array Function Family—Titles

Figure 4:
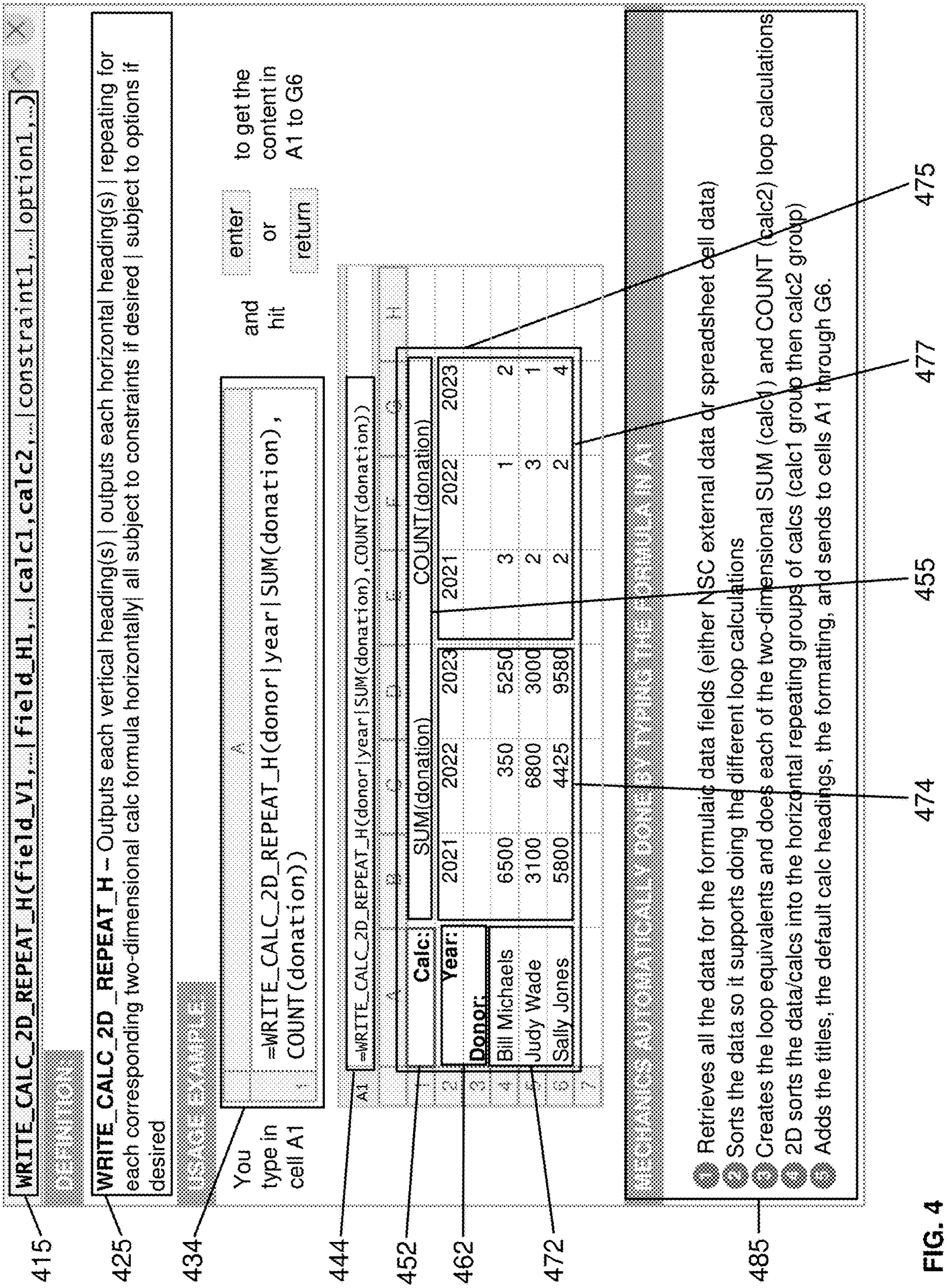
FIG. 4 examples an embodiment of our range or array family of repeat calculation prebuilt functions which populates the repetitions horizontally with merged calculation formula headings and titles for the all the headings employing an argument group syntax/argument structure for a formula with only the required arguments.

In FIG. 4 the user is doing the same analysis as in FIG. 3, but our technology has an embodiment with a different default title setting. This embodiment has the same syntax/argument structure 415 and description 425 as in the previous example in FIG. 3 with a difference in the defaults. The formula 434/444 is the same as 334/344 in FIG. 3 however the difference in the embodiment is that our technology automatically default adds titles delivering titles initial capitalizing the vertical and horizontal heading field names followed by a colon ('Donor:', and 'Year:') 462, adding 'Calc:' 452, and the calc and calc2 auto generated headings 455 of their respective formulas 'SUM(donation)' and COUNT(donation)' in merged cells centered above the two calculation result repetitions (474 and 477) with their horizontal headings and their complementary vertical headings 472. The steps 485 automatically executed by our technology are the same as in FIG. 3 until step five 1485 in FIG. 14 replaces step six. Step five 1455 adds the titles 1443 and the calc headings 1445, and 1448, which in this embodiment is done by a default setting. Therefore, in this embodiment having no titles is an option (e.g., with an option argument TITLES[no]) as well as adding custom titles is an option (which we will example later). In the previous embodiment in FIG. 3 triggering the automatic addition of the titles shown in FIG. 4 could be an option (e.g., with an option argument TITLES[yes]), as well as adding custom titles could be an option.

Range or Array Function Family—Vertical Repetitions

Figure 5:
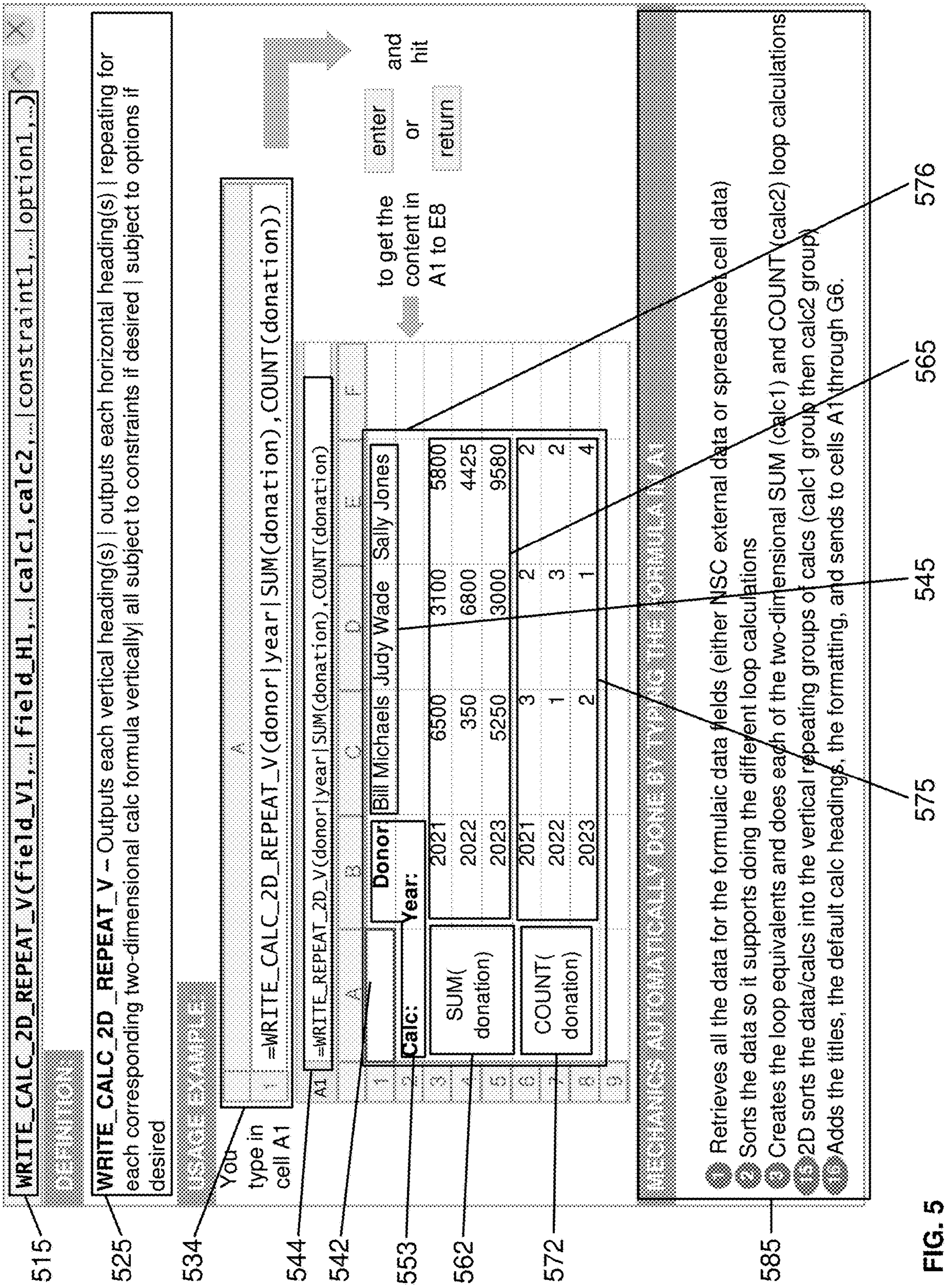
FIG. 5 examples an embodiment of our range or array family of repeat calculation prebuilt functions which populates the repetitions vertically with merged calculation formula headings and titles for the all the headings employing an argument group syntax/argument structure for a formula with only the required arguments.
Figure 18:
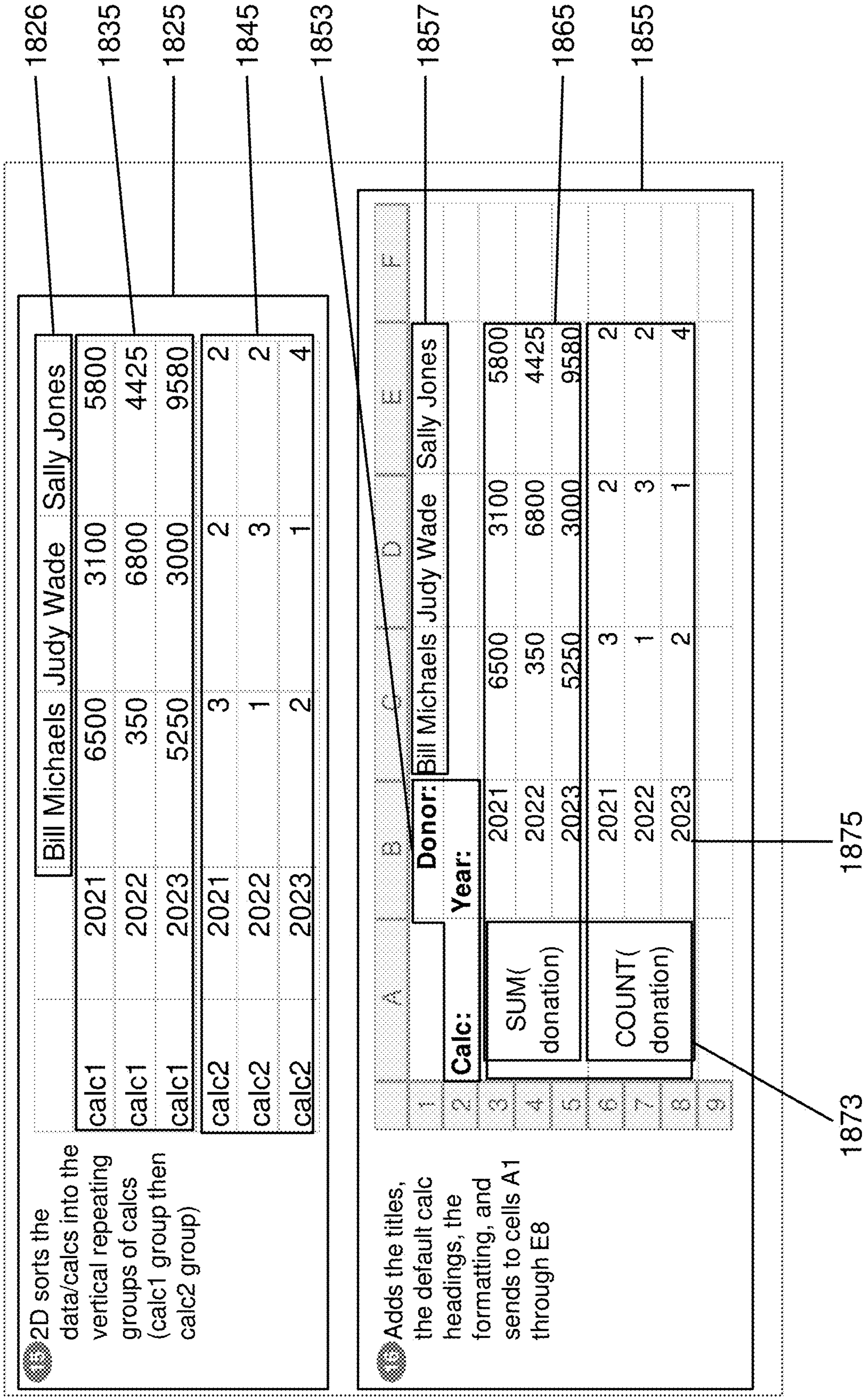

FIG. 5 examples a vertical repetition variant of the embodiment in FIG. 4. Other than the ' V' in the function name 'WRITE_CALC_2D_V' (replacing the '_H') the syntax/argument structure 515 is the same as 315 in FIGS. 3 and 415 in FIG. 4 with some differences in the defaults. The description 525 is very similar to the descriptions 325 in FIGS. 3 and 425 in FIG. 4 other than the repetitions being vertical instead of horizontal, thus exampling how our technology supports different variants with little added complexity for the user. The formula 534, other than the '_V' in the function name 'WRITE_CALC_2D_V' (replacing the '_H'), is the same as the formulas 334/344 in FIGS. 3 and 434/444 in FIG. 4 giving vertically oriented repetitions of calc 1 562/565 (1835/1865 in FIG. 18) and calc2 572/575 (1845/1875 in FIG. 18). This embodiment, like the one in FIG. 4, default populates the titles 553 (1853 in FIG. 18) and the calc headings 562/572 (1873 in FIG. 18). The formula 544 in cell 'A1' 542 populates all the content in cells 'A1' through 'E8' 576 as exampled in the steps one, two, three, fifteen, sixteen summarized in 585 and exampled in more detail in FIG. 13 (steps one, two, and three) and FIG. 18 (steps fifteen and sixteen). Steps one, two, and three are the same as previously described. Steps fifteen 1825 and sixteen 1855 (in FIG. 18) are similar to steps four and five (in FIG. 14) except that the two-dimensional replication is vertically oriented in step fifteen 1825 in FIG. 18 to generate the two calc repetitions 1835 and 1845 complete with the replicated headings. The next step, labelled step sixteen 1855, then adds the titles 1853 and the calc headings 1873, cell formats the results and sends them and the formula to cells 'A1' to 'E8' 576 in FIG. 5 giving the charity worker two sets of identically sorted vertically organized sets of analyses for easy review.

Range or Array Function Family—Alternative Syntaxes

Figure 6:
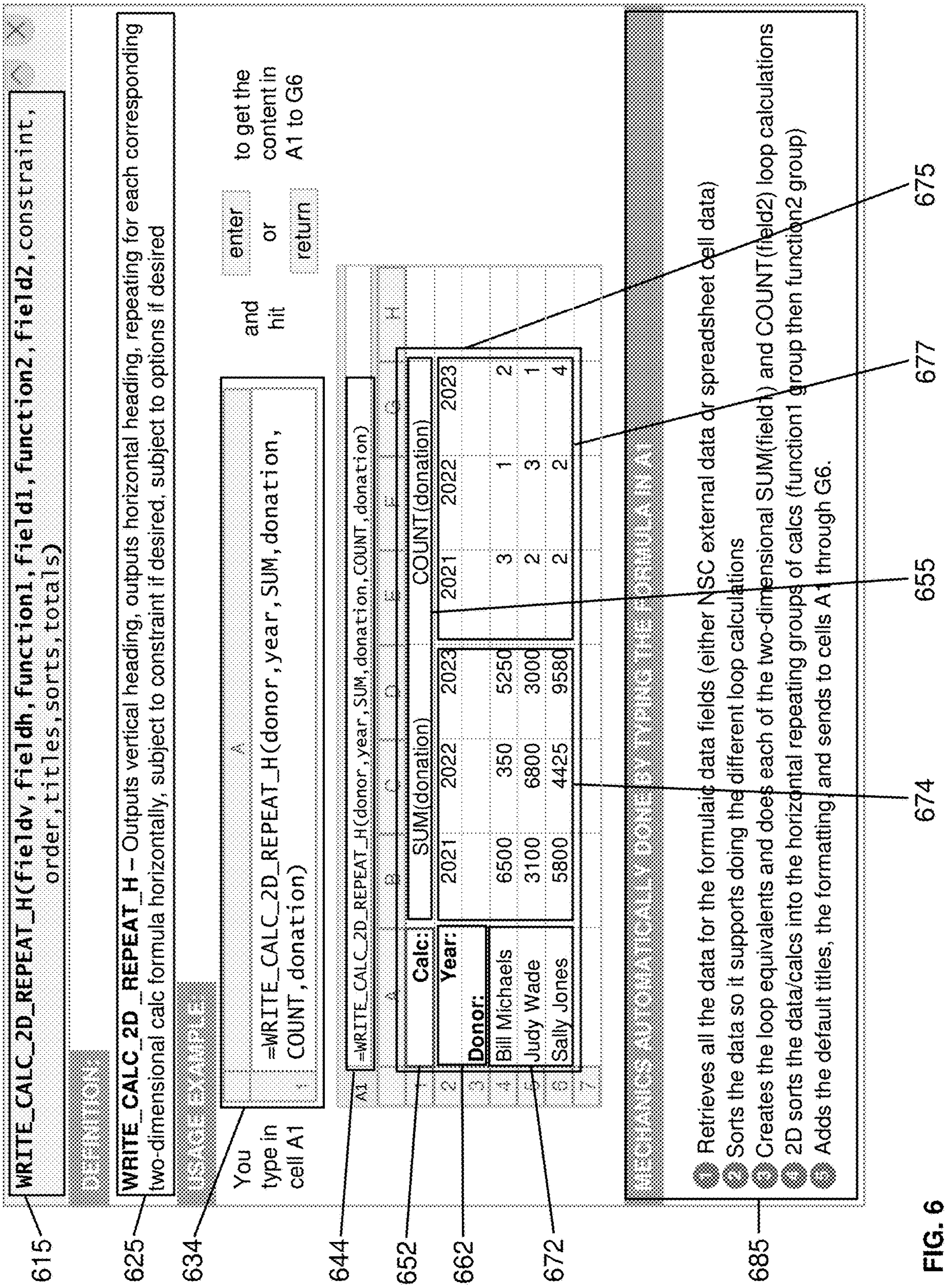
FIG. 6 examples an embodiment with one of many alternative syntaxes/argument structures which provides the same outcome as FIG. 4 but with no argument groups and only comma separated single specifier arguments (e.g., no arguments specifying more than one field, one function or a field/function combinations).

FIG. 6 examples an alternative syntax/argument structure for the same formula as in FIG. 4. Our technology supports many different syntaxes to effectively create the same pre-built function formula. FIG. 6 examples an alternative where there are no argument groups and the calculations are done separating the range or array functions from the formulaic data they work on. This syntax/argument construct is just like existing spreadsheet functional formula syntax/argument structures. The arguments are separated by commas and there are only single specifier arguments, each specifying a single field/range, a single function, a single algebraic operator, or a single option. There are no compound specifier arguments that specify in one argument more than one field, a field combined with a function, or multiple option specifications. The syntax/argument structure 615 has six required arguments, which are bolded, and five optional arguments, which a not bolded. You can see from the description 625 being similar to 425 in FIG. 4 that while the arguments are different, they are doing the same thing. In the syntax/argument structure 615 the first two arguments, 'fieldv,fieldh' specify the complementary vertical and horizontal headings for the two-dimensional loop equivalent calculations which are then specified in the next four arguments, 'function1,field1,function2,field2'. The big difference is the FIG. 6 syntax/argument structure is not as flexible as the syntax/argument structure in FIG. 4 to accommodate multiple nested heading fields, more than two calc repetitions, a broader diversity of calculations (e.g., multiple range or array function calcs), and multiple constraints. Although a larger family of functions and some reordering of arguments (e.g., constraint changed to the last arguments constraint1, constraint2, . . . ) can create coverage of the variants.

The formula 634 in FIG. 6 delivers the same result 675 as the result 475 from the formula 434 in FIG. 4. The five automatically executed steps 685 by the formula 634 are the same five steps 485 in FIG. 4. Those steps deliver the vertical and horizontal heading field names initial capitalized and followed by a colon 662 as titles, adding 'Calc:' 652 as the calculation title. The technology also delivers the calc1 and calc2 headings 655 of their respective formulas ('SUM(donation)', COUNT(donation)') merged in cells centered above the two calculation result repetitions (674 and 677) with the complementary vertical heading values 672 as the results 675 in cells 'A1' to 'G6' for the formula 644 in cell 'A1' 652.

Range or Array Function Family—Constraint(s)

Figure 7:
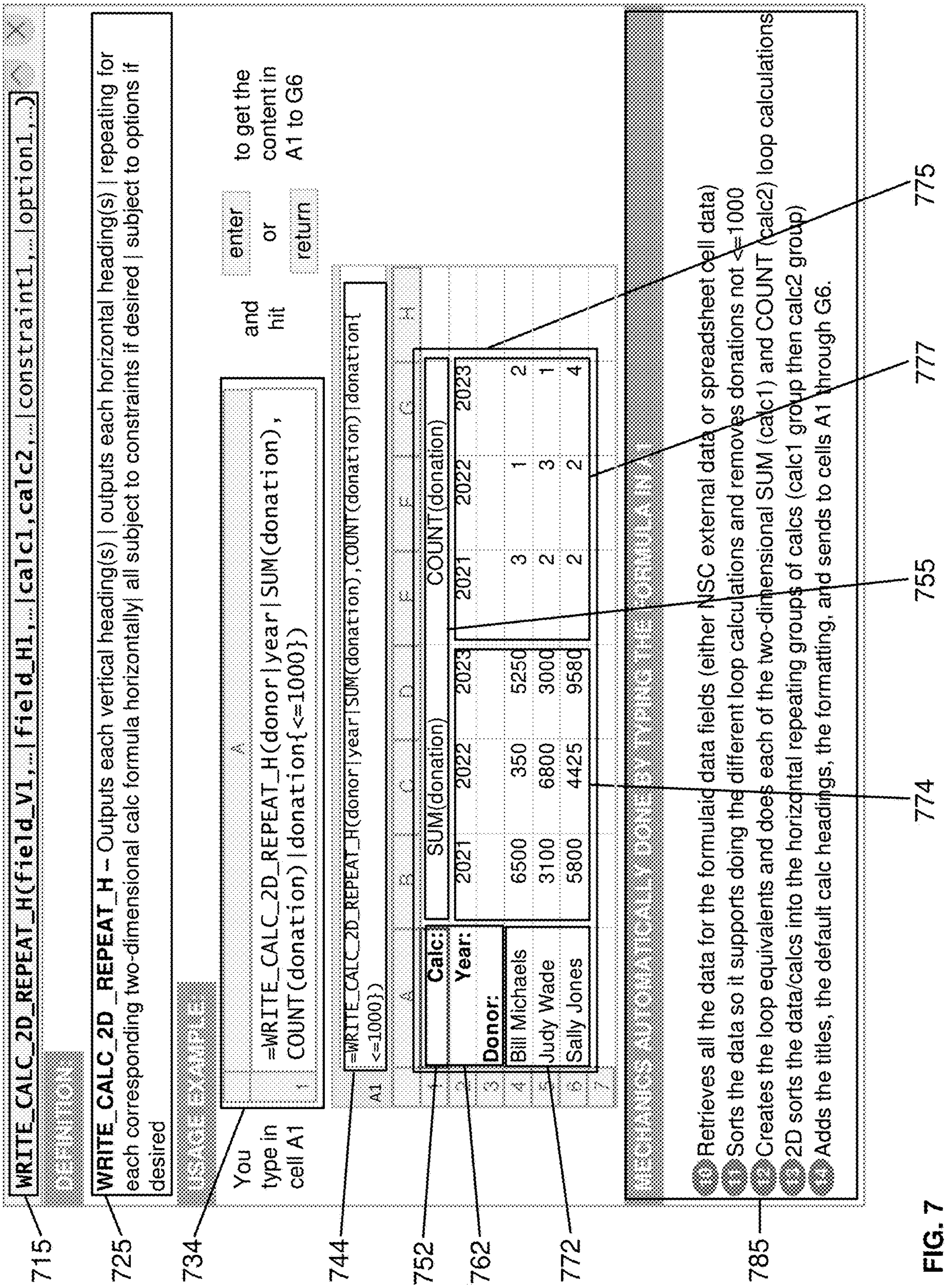
FIG. 7 examples the constraint usage in the embodiment used in FIG. 4.
Figure 17:
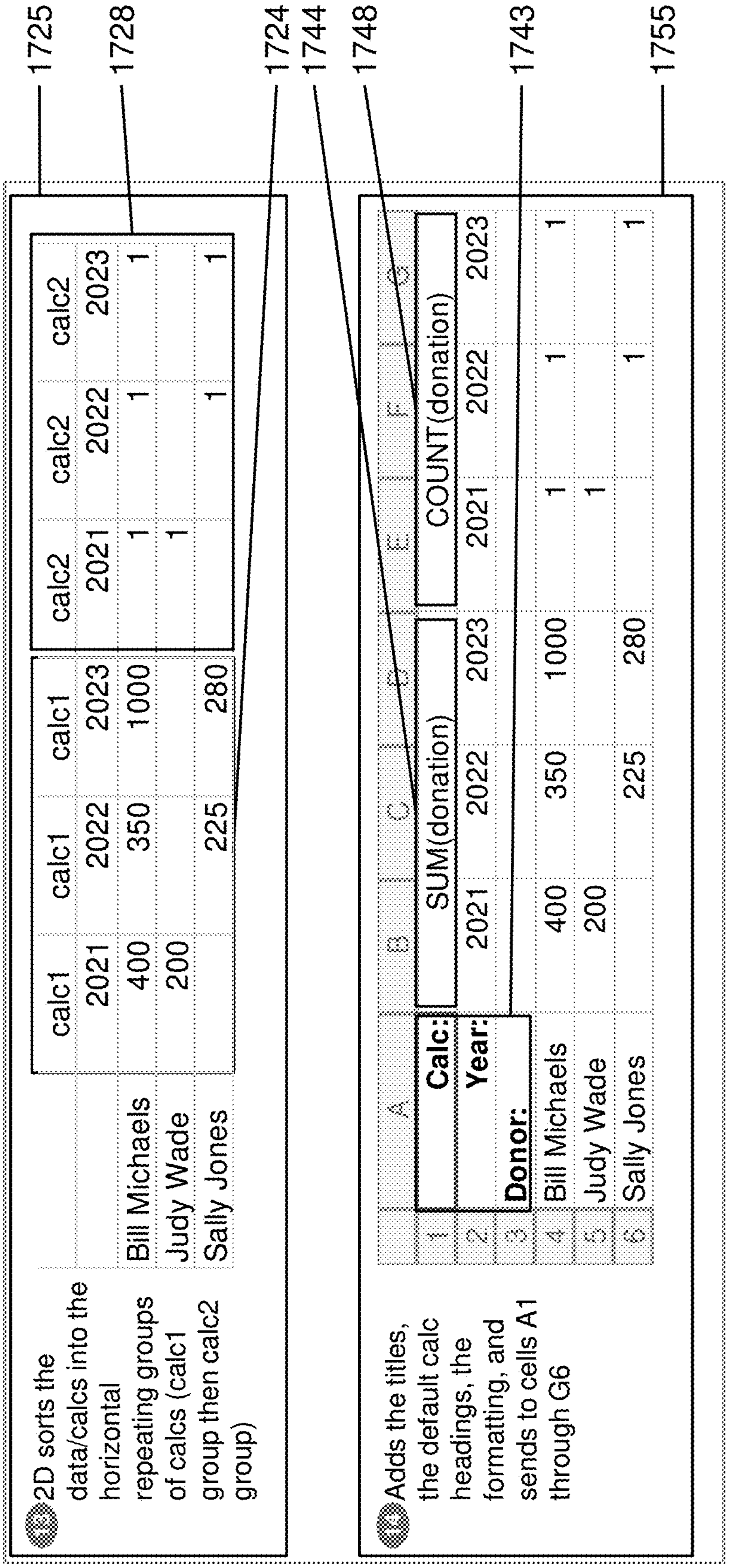

FIG. 7 examples the constraint usage in the embodiment used in FIG. 4. The syntax/argument structure 715 and the description 725 are the same as in FIG. 4. The formula 734/744 is the same as the formula 434/444 in FIG. 4 with the addition of the constraint argument 'donation {<=1000}'. The addition of the constraint argument changes the automatically done steps 785 after the first step, numbered '10' 1643 in FIG. 16, retrieves the data (as that step is the same as step one 1343 in FIG. 13 which is the first step used in FIG. 4). The second step, numbered step '11' 1645 removes the donations that are not less than or equal to 1000 (retaining the donations greater than 1000). The third step, numbered step '12' 1648, creates the loop equivalents and then does the calc 1 and calc2 calculations. The fourth step, numbered step '13' 1725 in FIG. 17, then two-dimensionally sorts the results into the repeating groups/sets 1724/1728 of calculations. Finally, the last step, numbered step '14' 1755, formats the results and adds the titles 1743 and the calc headings 1744/1748 sending the results 1755 to cells 'A1' through 'G6' 775 in FIG. 7 with the cell 'A1' 752 formula 744. There you can see the two calc repetitions with their associated horizontal heading values 774/777 with the calc headings 755, the titles 762, and the row heading values 772. Note this example contained a single constraint but could have contained any number of constraints as this embodiment supports multiple constraints.

Range or Array Function Family—Options

Figure 8:
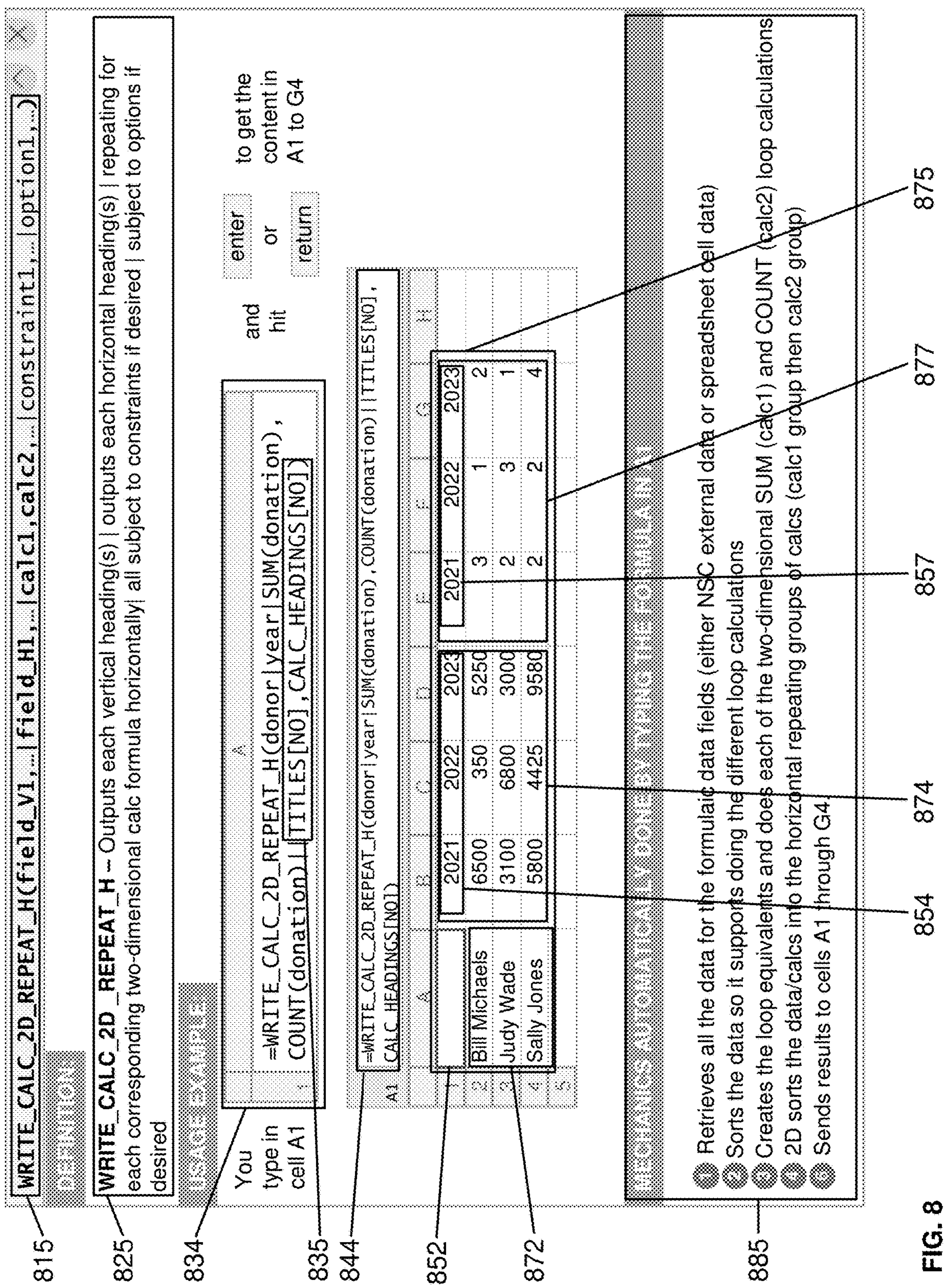
FIG. 8 examples option usage in the embodiment used in FIG. 4 to remove the default headings titles.

FIG. 8 examples option usage in the embodiment used in FIG. 4 to remove the default headings titles. These options are applicable to any of our families of repeat functions and can be used to turn off defaults or turn back on defaults with a different argument. Note, our technology also supports the turning back on of defaults by simply removing the overriding argument. In this example the syntax/argument structure 815 and the description 825 are the same as in FIG. 4. The formula 834/844 for cell 'A1' 852 is the same as the formula 434/444 in FIG. 4 with the addition of the options 'TITLES[NO], CALC_HEADINGS[NO]' 835. Those options remove the titles 452/462 in FIG. 4 and the calc headings 455 in FIG. 4 that this embodiment otherwise default delivers (as it did in FIG. 4). So, the user instead get the results shown in FIG. 8 875, with no titles and where the two calc repetitions 874 and 877 lack the calc headings and instead only have the horizontal headings 854 and 857 with of course the complementary vertical heading values 872. The results are generated by the steps one, two, three, four and six summarized in 885 and detailed in FIG. 13 and FIG. 14. Since these steps have been previously described for brevity's sake, we will not repeat those descriptions.

Figure 9:
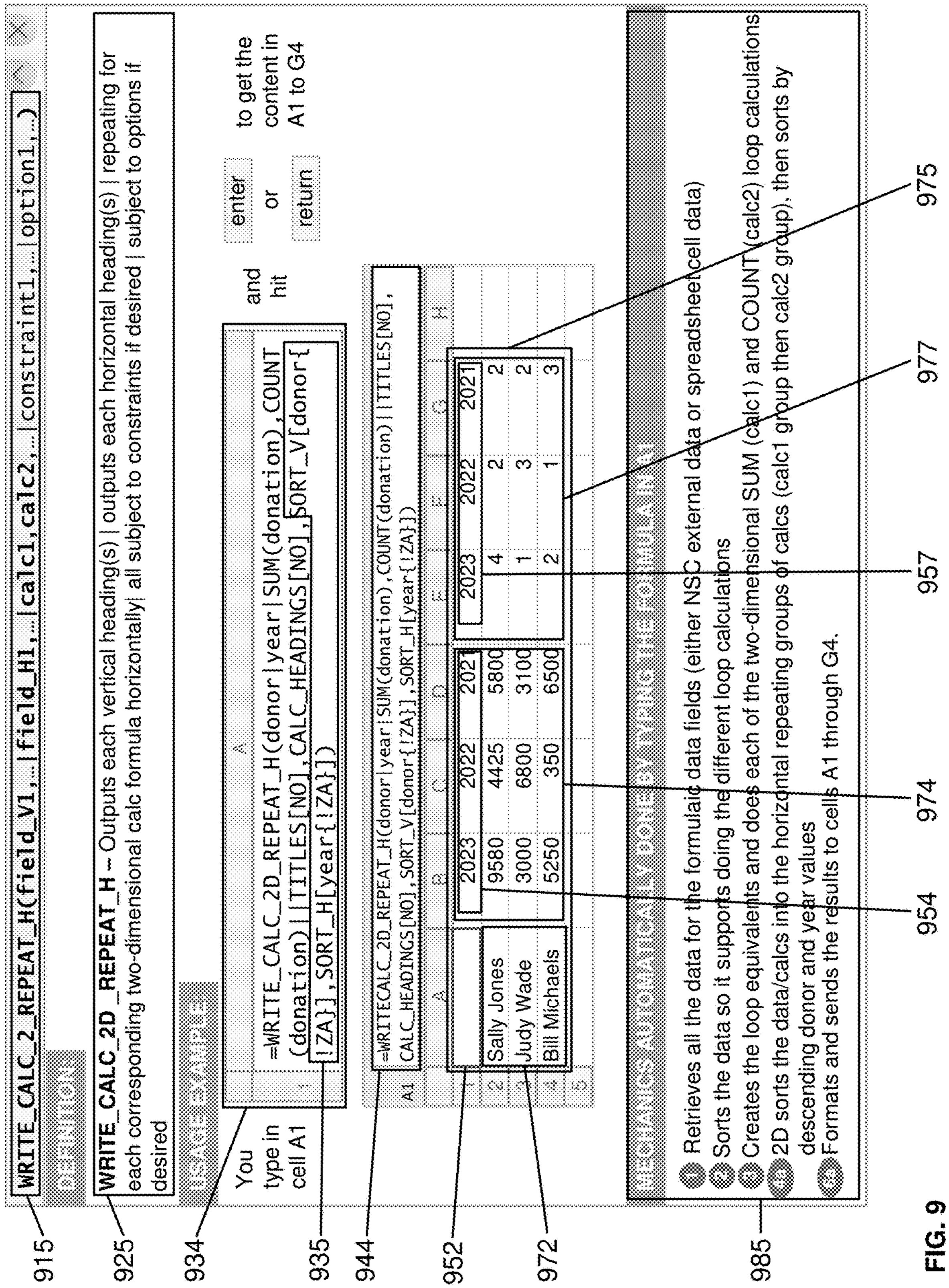
FIG. 9 examples additional options usage, in this situation changing both the vertical and horizontal sorting of the repeated results to the formula and embodiment otherwise exampled in FIG. 8.
Figure 50:
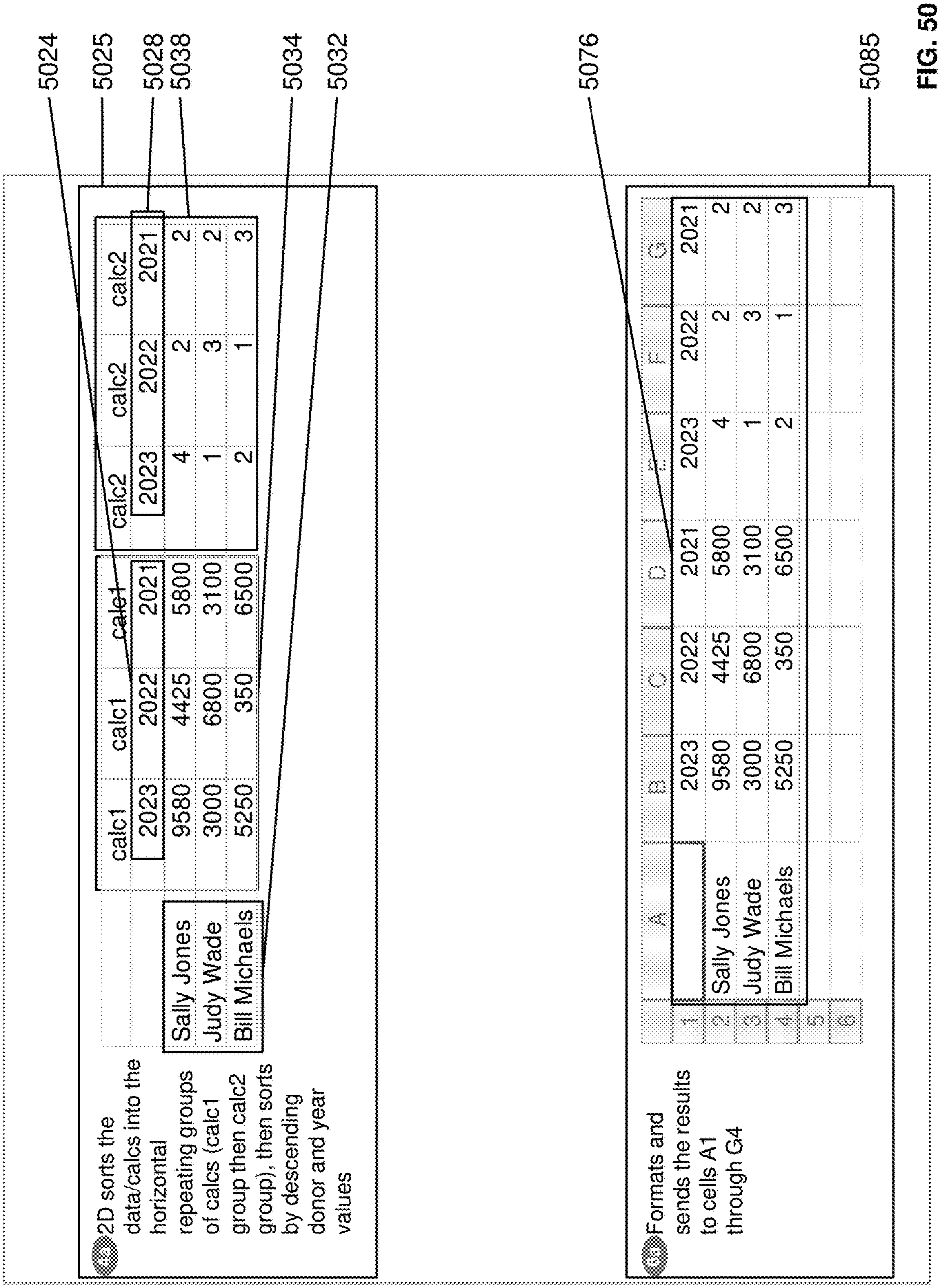
FIG. 50 examples automatically done steps by our functional formula in FIG. 9.

FIG. 9 examples additional options usage, in this situation changing both the vertical and horizontal sorting of the repeated results by adding two additional arguments to the formula and embodiment otherwise exampled in FIG. 8. As has been said before, these features are applicable to most if not all of our repeat function embodiments. This embodiment has default sorting of the repeating results by ascending values of the row and column heading field values as is exampled for the vertical headings 872 in FIG. 8 which are ascending alphabetically sorted and the horizontally repeated headings 854/857 which are ascending numerically sorted. In FIG. 9 the user instead wants to descending sort both the vertical and horizontal headings and their accompanying calculated results. To do so in this embodiment the user adds two arguments, 'SORT_V[donor{!ZA} ], SORT_H[year{!ZA}]' 935. Those arguments cause the results to sort by descending sorts of the vertical headings 972 and to horizontally sort both sets of results (974 and 977) by the descending values of the horizontal headings (954 and 957). This is all done using the syntax/argument structure 915 identical to that in FIG. 8, FIG. 7, FIG. 5, and FIG. 4. The automatically done steps by the formula 934 summarized in 985 are the same as previous steps '1', '2' and '3' (in FIG. 13). However, the fourth step, step '4*a*' 5025 in FIG. 50, is different where the repeated calculations (5034 and 5038) are descending sorted by the vertical heading values 5032 and descending sorted by the two sets of horizontal heading values 5024 and 5028. Those results 5076 are then formatted and sent to the cells 'A1' through 'G4' 975 with the formula 944 in cell 'A1' 952 in FIG. 9 by the fifth step, numbered '6*a*' and exampled in 5085 in FIG. 50.

Figure 10:
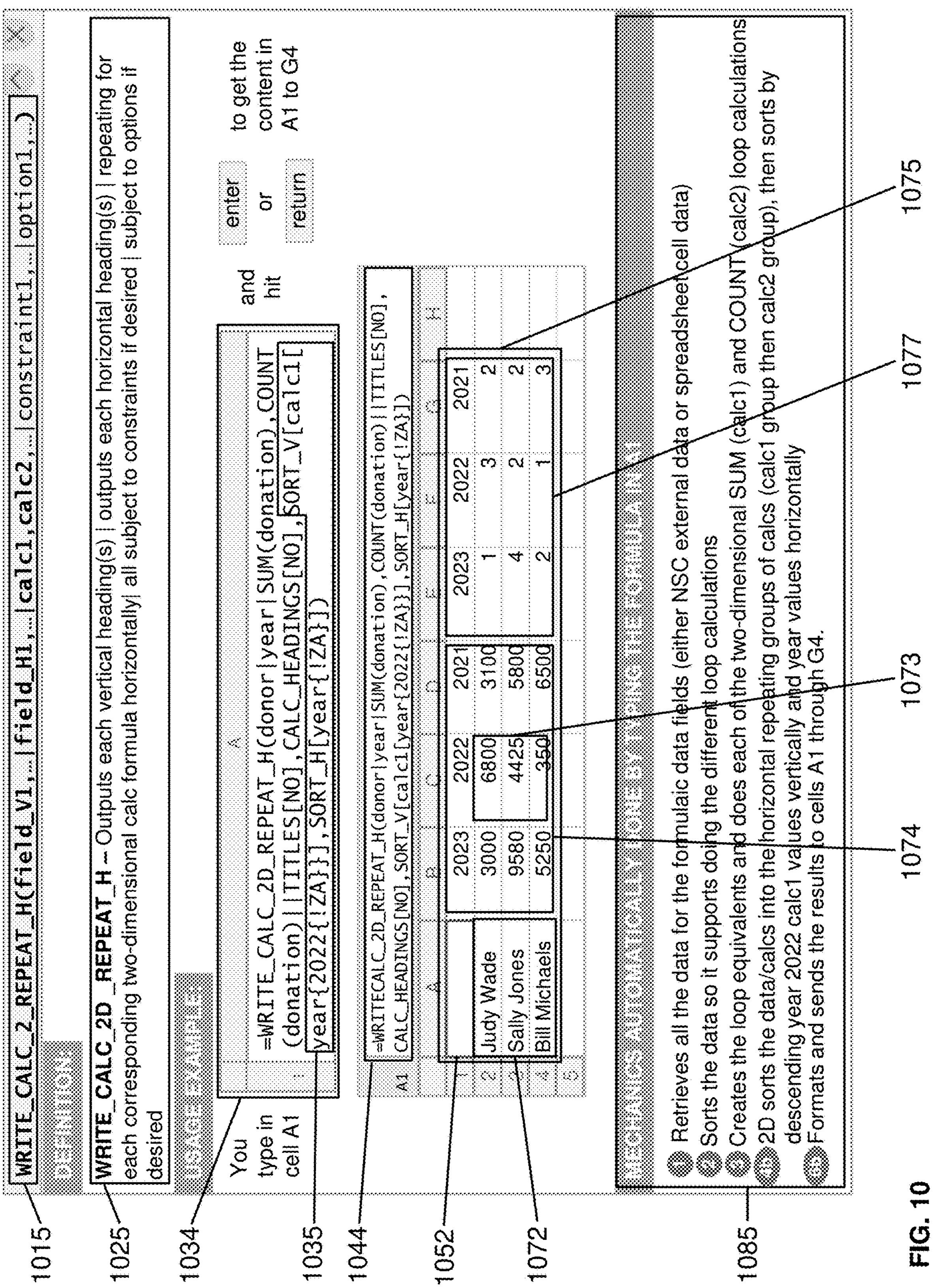
FIG. 10 examples an additional options sort variant to the embodiment in FIG. 4 supported by our technology where the user wants to vertically sort all the repeated heading and calc results by a calc value and horizontally sort the headings and repeated calcs by descending values of a heading.
Figure 51:
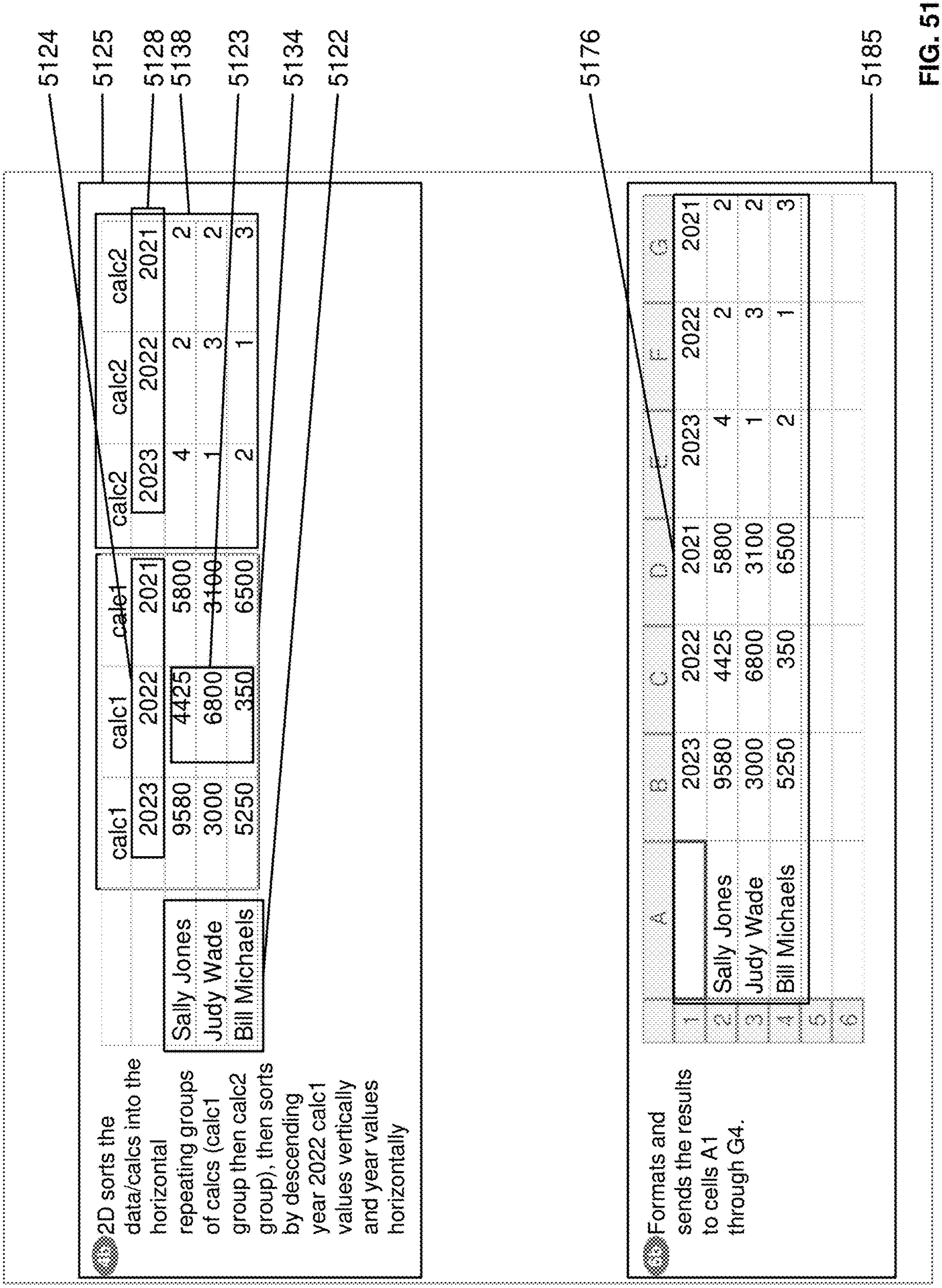
FIG. 51 examples automatically done steps by our functional formula in FIG. 10.

FIG. 10 examples an additional options sort variant supported by our technology where the user wants to vertically sort all the repeated heading and calc results by the 'calc1' values for the 'year' value '2022' and horizontally sort the headings and repeated calcs by descending values of the heading 'year' field values. Our technology does the sort in a way retaining the relationships in both (all) of the calcs ('calc1' 1074 and 'calc2' 1075) so the user can do cross comparisons across the two calcs and be comparing like data (i.e., data from the same rows of the source data set). This is all done using the syntax/argument structure 1015 identical (noting that some variants may have different defaults) to that in FIG. 9, FIG. 8, FIG. 7, FIG. 5, and FIG. 4. Noting, these features are supported in our technology with different syntax/argument structures and in similar ways for the other families of our two-dimensional repeat functions. The automatically done steps by the formula 1034/1044 summarized in 1085 are the same as previous steps '1', '2' and '3' (in FIG. 13) which is then followed by step '4*b*' 5125 in FIG. 51 where the repeated calculations (contained in 5134 and 5138) are descending sorted vertically by the year '2022' 'calc1' values 5123 and descending sorted horizontally by the two sets of horizontal heading 'year' values 5124 and 5128. Those results 5176 are then formatted and sent to the cells 'A1' through 'G4' 1075 in FIG. 10 by step '6*b*' 5185 in FIG. 51 with the formula 1044 in cell 'A1' 1052.

The preceding two-dimensional repeat function examples have been for what we call a group repetition, where all the calc results are grouped by calc. For example, all the calc1 results (e.g., 5134 in FIGS. 51 and 1074 in FIG. 10) grouped together followed by then all the calc2 (e.g., 5138 in FIGS. 51 and 1077 in FIG. 10) results grouped together. However, our technology supports a different set of embodiments where the calc results are not grouped together by calc but instead organized serially by heading value as exampled next.

Range or Array Function Family—Series Repetition

Figure 11:
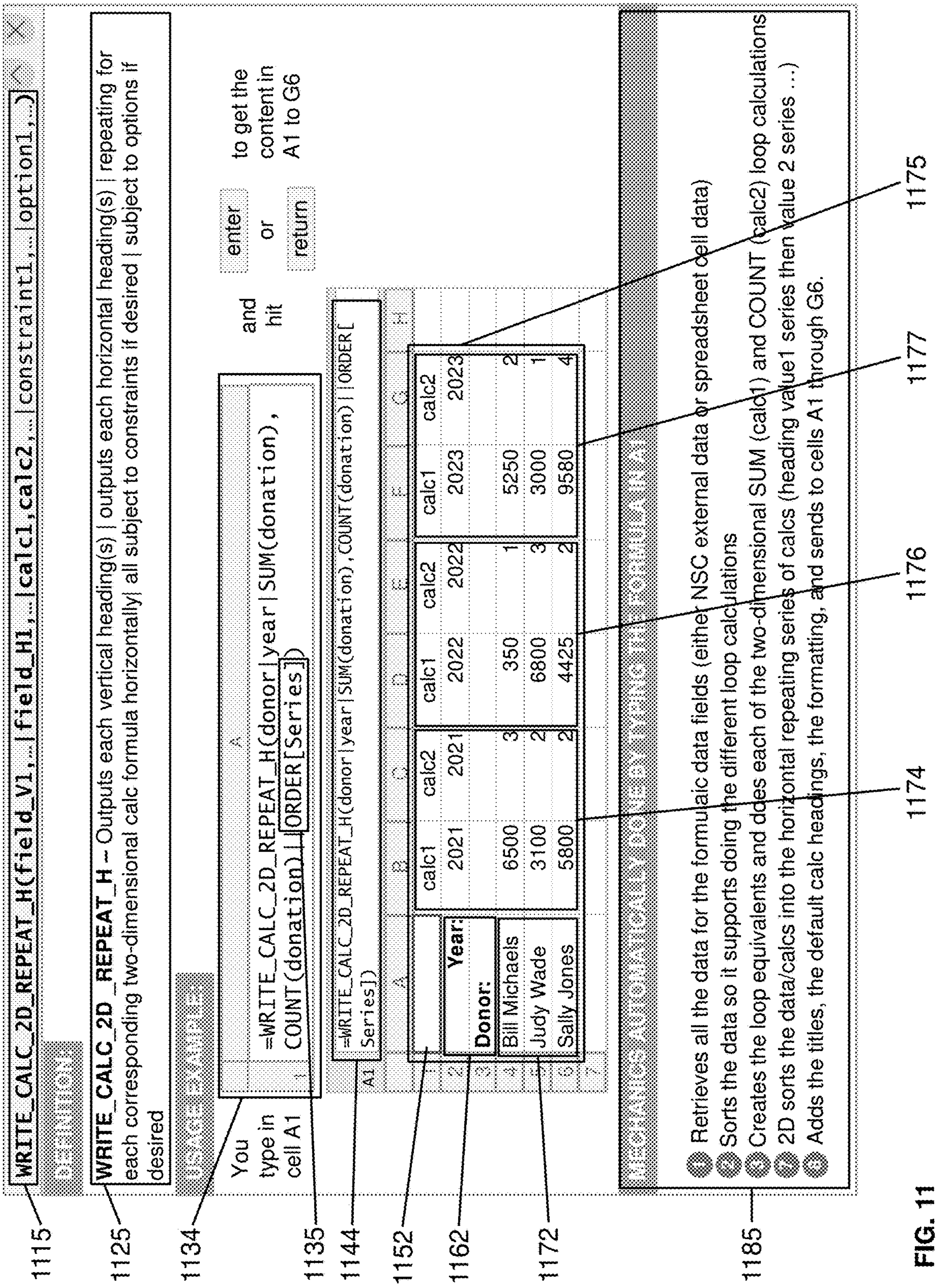
FIG. 11 examples an embodiment of our range or array family of repeat calculation prebuilt functions which populates the repetitions horizontally with default vertical and horizontal headings titles and an option used to replace the calc group repetitions with serial calc repetitions grouped by the horizontal heading field values.
Figure 15:
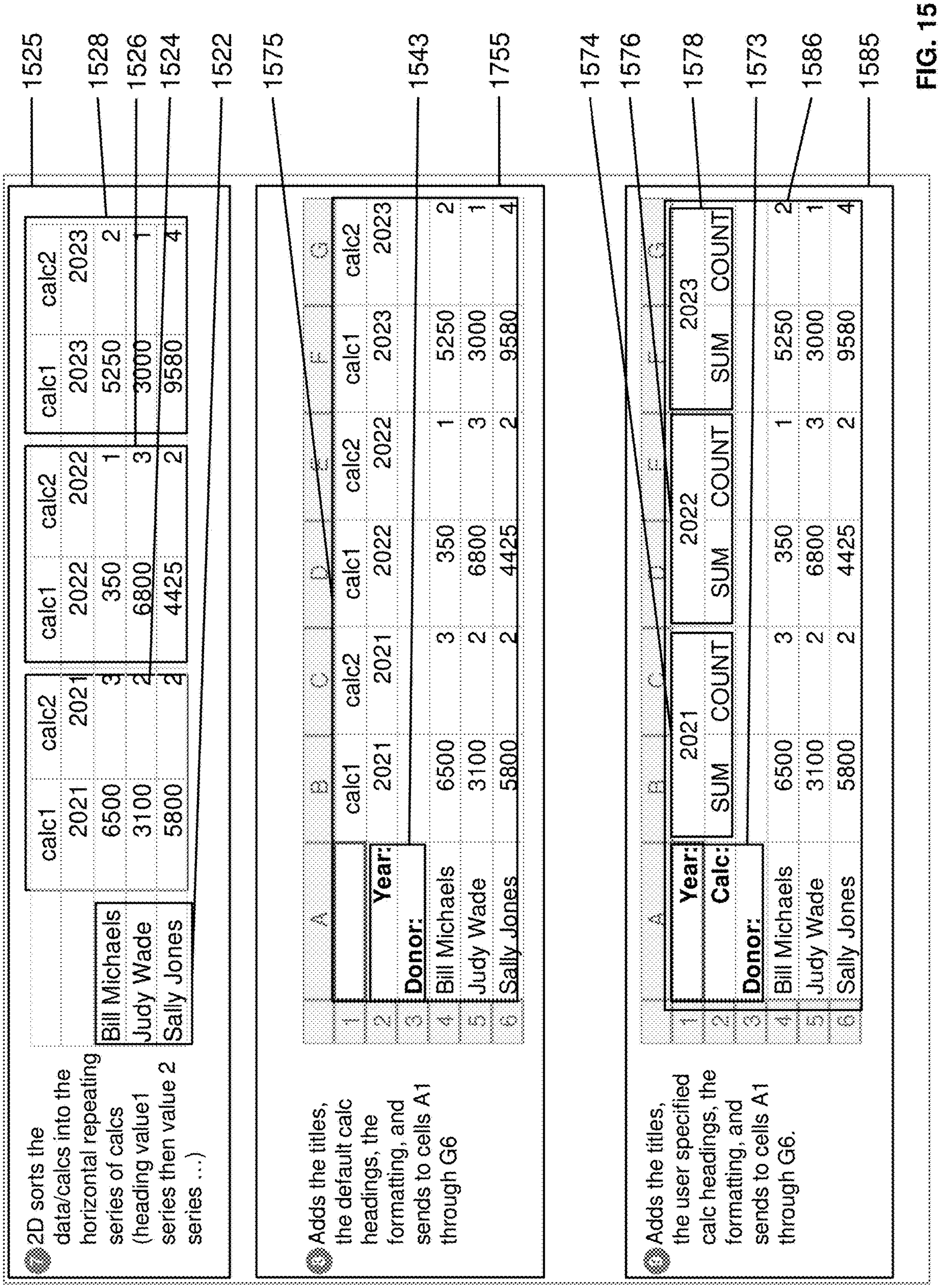

FIG. 11 examples an embodiment of our range or array family of repeat calculation prebuilt functions which populates the repetitions horizontally with default vertical and horizontal headings titles and an option used to replace the calc repetitions with serial calc repetitions grouped by the horizontal heading field values. In this embodiment the 'Series' ordering of the repeating output is triggered by an 'ORDER[Series]' 1135 argument in the functional formula 1134 which otherwise is a formula similar to some of the previous examples. The difference is that rather than presenting the results grouped together by calc, this embodiment presents the calc results in series form grouped by value of the heading, which in this example are the horizontal values of the field 'year' as exampled in 1174 ('year' '2021), 1176 ('year' '2022), and 1177 ('year' '2023). This is all done using the syntax/argument structure 1115 similar to that in FIG. 10, FIG. 9, FIG. 8, FIG. 7, FIG. 5, and FIG. 4. The automatically done steps by the formula 1134/1144 summarized in 1185 are the same as previous steps '1', '2' and '3' (in FIG. 13) followed by step '7' 1525 in FIG. 15 where the repeated calculations are ascending sorted vertically by the 'donor' values 1522 and horizontally ordered by ascending values of 'year' groupings with serial ordering of the calcs within each 'year' grouping as exampled in 1524, 1526, and 1528. Then step '8' 1555 in FIG. 15 adds the titles 1543 (1162 in FIG. 11) and formats the results 1575 to be sent to cells 'A1' through 'G4' 1175 in FIG. 11 with the formula 1144 in cell 'A1' 1152.

Figure 12:
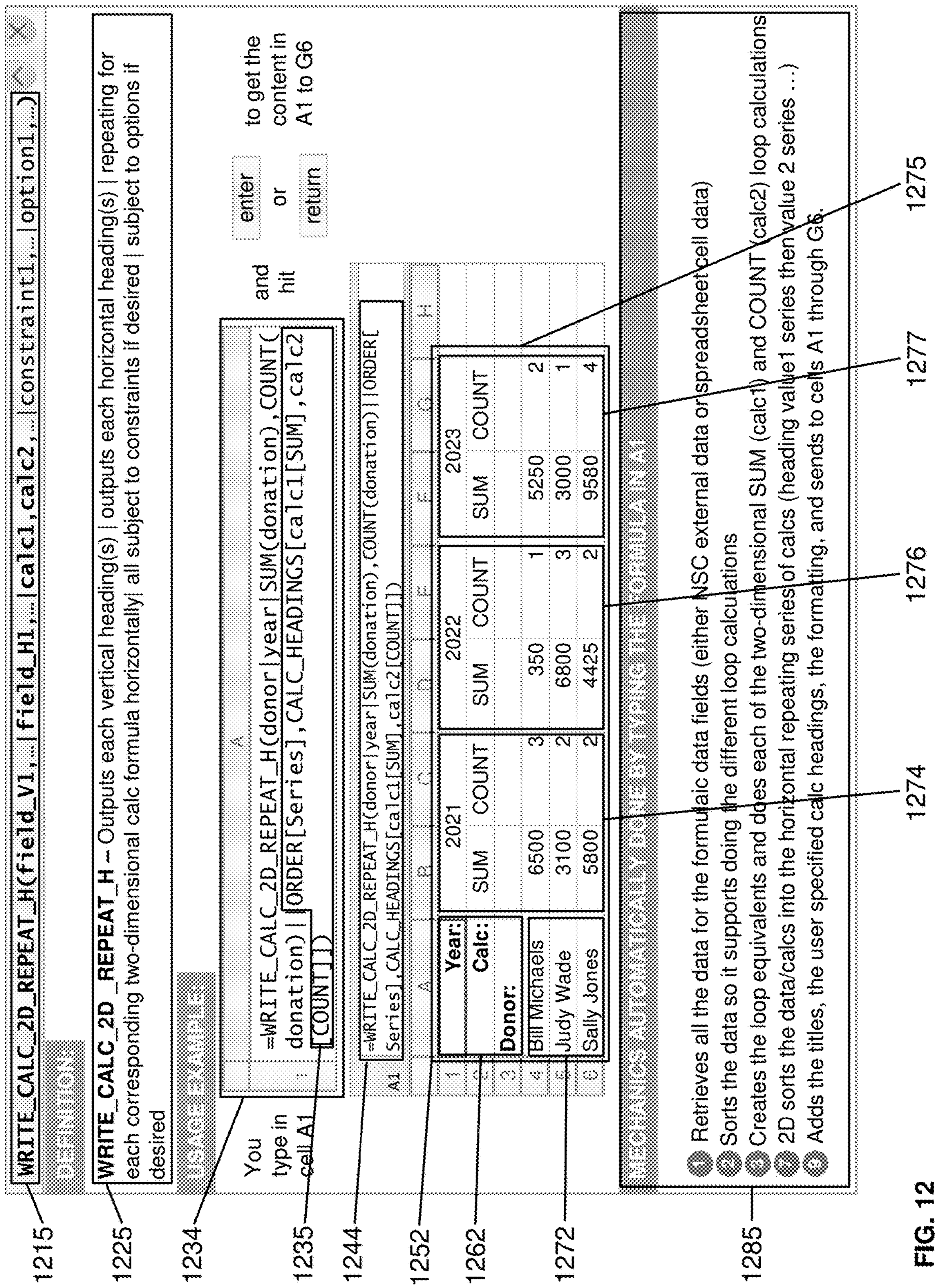
FIG. 12 examples an embodiment of our range or array family of repeat calculation prebuilt functions employing a series ordering option, an option for custom calc titles, and different positioning of the headings and titles.

FIG. 12 examples an embodiment of our range or array family of repeat calculation prebuilt functions employing a series ordering option, an option for custom calc titles, and different positioning of the headings and titles. In this example the user added a 'CALC_HEADINGS[calc] [SUM], calc2[COUNT]]' argument 1235 (a compound specifier with multiple sub-arguments within an argument) to the functional formula 1134 in FIG. 11. This replaces the previous 'calc1' and calc2' headings with the custom calc headings 'SUM' (for calc1) and 'COUNT' (for calc2) as exampled in 1274, 1276, and 1277. This embodiment also places the horizontal field values headings ('2021', '2022', and 2023') above the 'SUM' (for calc1) and 'COUNT' (for calc2) headings in merged cells. This is all done using the syntax/argument structure 1215 similar to that in FIG. 11, FIG. 10, FIG. 9, FIG. 8, FIG. 7, FIG. 5, and FIG. 4. The automatically done steps by the formula 1234/1244 summarized in 1285 are the same as previous steps '1', '2' and '3' (in FIG. 13) followed by step '7' 1525 in FIG. 15 where the repeated calculations are ascending sorted vertically by the 'donor' values 1522 (1272 in FIG. 12) and horizontally ordered by ascending values of 'year' groupings with serial ordering of the calcs within each 'year' grouping as exampled in 1524 ('year' '2021), 1526 ('year' '2022), and 1528 ('year' '2023). Then followed by step '9' 1555 in FIG. 15 which moves the year values to the top row, merges those values within the grouped cells, substitutes the custom headings for the calc 1 (using SUM) and calc2 (using COUNT) as shown in 1574/1576/1578, adds the titles 1573 (1262 in FIG. 12), and formats the results 1586 to be sent to the cells 'A1' through 'G6' 1275 in FIG. 12 with the formula 1244 in cell 'A1' 1262. While we could example different variants of the series repeat functions with different syntaxes, vertical repeats, and other features exampled herein, for brevity's sake we will move on to our next family of repeat functions, the family which does calculations which do not employ range or array functions.

Non Range or Non-Array Function Family

The next family of our two-dimensional repeat functions works very similarly to the previous family except the calculations do not include a range or array function and therefore do the repetitive calculations for every row of the data set employing the multiple sets of algebraic formulaic data calcs as we example in FIG. 52 through FIG. 55 and FIG. 19 through FIG. 29. The formulas can be purely algebraic formulaic data calcs and/or include non-range or non-array spreadsheet prebuilt functions (e.g., SQRT, SIN, and LOG 10) as was exampled in our regular 2D functions in our U.S. application Ser. No. 17/903,934 titled "Method and System for Improved 2d Ordering of Output from Spreadsheet Analytical Functions," filed 6 Sep. 2022.

Non Range or Non-Array Function Family—Required Arguments

Figure 52:
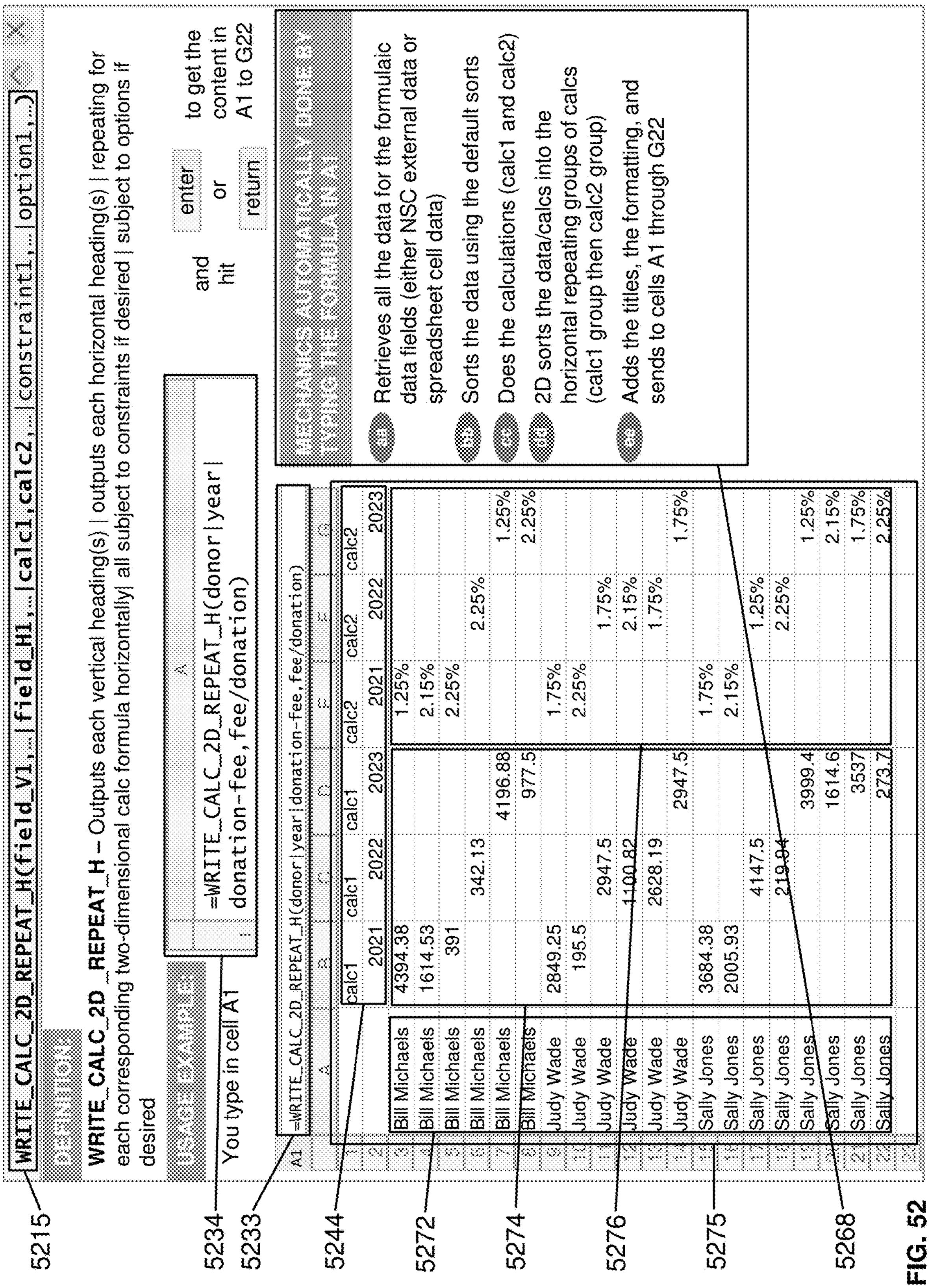
FIG. 52 examples an embodiment of our non-range or array family of repeat calculation prebuilt functions which populates the repetitions horizontally with default calculation numbered headings employing an argument group syntax/argument structure delivering spread results while employing a function name and syntax/argument structure shared with our range or array family of repeat calculation prebuilt functions.

FIG. 52 examples an embodiment of our non-range or array family of repeat calculation prebuilt functions which populates the repetitions horizontally with default calculation numbered headings employing an argument group syntax/argument structure delivering spread results while employing a function name and syntax/argument structure shared with our range or array family of repeat calculation prebuilt functions. FIG. 52 examples the functional formula 5234 employing the similar syntax/argument structure 5215 and functional name as FIG. 12, FIG. 11, FIG. 10, FIG. 9, FIG. 8, FIG. 7, and FIG. 4. This was employed to give the user a great deal of flexibility from a single function. However, we could have used a different function name, and we could use different syntaxes/argument structures which allow specification of repeat two-dimensional (2D) calculations. And this family of function embodiments supports vertical repetitions (like exampled in FIG. 5), serial grouping of the different calcs (like exampled in FIG. 11 and FIG. 12), and other options as example herein which are not re-exampled for brevity's sake. The functional formula 5234 examples one vertical heading ('donor'), one horizontal heading ('year') and then two calcs, calc1 ('donation-fee') and calc2 ('fee/donation') which repeat horizontally because of the ' H' in the function name in this embodiment. This functional formula 5234 has the minimum number of required fields (i.e., six) and algebraic operators (i.e., two) for the non-range or non-array family of functions. Note, the six different fields do not need to be unique but need to somehow provide the two headings (i.e., one vertical and one horizontal) and the two calcs (each one employing one algebraic operator). The functional formula 5234 automatically executes steps 'aa' through 'dd' and step 'ce' summarized in 5268 when the user hits 'enter' or 'return' to populate the formula in cell 'A1'. Those steps are illustratively exampled in FIG. 53 through FIG. 55.

Step 'aa' 5343 in FIG. 53 examples the formula automatically starting by retrieving the data from any of the data sets in FIG. 1A through FIG. 2B. Step 'bb' 5345 then examples the data being sorted by the default sorts, in this embodiment ascending for both the vertical and horizontal headings. Step 'cc' 5348 then does the row-by-row calc1 and calc2 calculations. Step 'dd' in FIG. 54 then two-dimensionally arranges the complementary headings and the related calcs into the two horizontal repetitions 5444 and 5447 using the default vertical 5424 (5272 in FIG. 52) and horizontal 5426 (5244 in FIG. 52) heading values ascending ordered. In this embodiment the data is spread on the vertical axis, the axis which is not duplicated by the calc repetitions. Spread means that each row of the data is represented by a row in the two-dimensional calculations thus giving in this example more than one row per each value of the vertical headings (e.g., six 'Bill Micheals', six 'Judy Wade' and eight 'Sally Jones'). The end result here is there are as many vertical headings as there are rows in the data set (as contrasted with each repeated calc set of the horizontal headings which are deduped to one column per heading value) and the two-dimensional results have numerous empty cells corresponding to the non-deduped rows. Step 'cc' in FIG. 55 then adds any additional formatting before sending the values 5565 to cells 'A1' through 'G22' 5275 in FIG. 52 for the formula 5233.

This syntax/argument structure 5215 employs two argument delimiters, i.e., commas and vertical bars. The advantage of this approach is that there is an application specified argument group structure containing required and optional arguments laid out for the user as shown in 5215. It has greater flexibility than the more typical spreadsheet single delimiter (e.g., commas) approach to have flexible numbers of arguments within the argument groups while still providing the user with the prebuilt function specified structure of defined argument groups (e.g., separated by the vertical bars) and required and optional arguments within them (e.g., separated by commas). Note in this starting syntax/argument structure the optional arguments are designated by the ' . . . ' however once the user fills in 'field_V1' our syntax guide, like the one in other spreadsheets, will show a next optional argument in the argument group of 'field_V2' incrementing further as the user populates further vertical heading arguments. These argument groups give users the defined structure for our prebuilt families of functions so the user knows exactly what to put where in the function formula but gives them the flexibility of putting different numbers of arguments within each argument group. Our technology employs two different types of argument groups, one (Like argument—argument groups) that accepts a variable number of like arguments as exampled in 'field_V1, . . . |field_H1, . . . |calc1,calc2, . . . | constraint1, . . . ', and a second (Named argument groups) that accepts a variable number of name arguments as is exampled in the '|option1 . . . ' argument group. Named argument groups contain a defined set of arguments where the argument contains a unique name our functional formula recognizes and knows what to do with, such as the previously exampled 'ORDER', 'COLLAPSE', and 'TOTAL_SUB_V_H' and then may or may not contain sub-arguments, e.g., the Series or Group in 'ORDER[Series]' and 'ORDER[Group]. These Named argument groups give the advantage of definitively telling the user the named arguments they can populate there but allows them to put the name arguments in any order they desire and only use the ones that they want to use without having to fill in ones they do not want. Our syntax/argument structure exampled here also has one additional flexibility benefit in that the calcs are specified like spreadsheet formula, e.g., 'donation-fee' or '(donation-fee)/donation', rather than in their separate field and algebraic operator single specification arguments. Our technology supports that single specifier arguments approach (see FIG. 58) as well, but this compound specifier argument approach (5215) affords much greater breadth of calcs from a single function syntax/argument structure as exampled in FIG. 19.

The result 5275 in FIG. 52 examples the non-range or non-array repeat calc function with one row per row of data, our technology supports more complicated calcs, different syntaxes/argument structures, constraints, and options including collapsing the results while retaining the calc-to-calc relationships so that the comparisons are of like data. We will next example a more complicated calc employing additional fields and algebraic operators before then exampling how collapsing (minimizing) of the results and how series results work un-collapsed and collapsed works in our technology.

Non Range or Non-Array Function Family—More Complicated Calc

Figure 19:
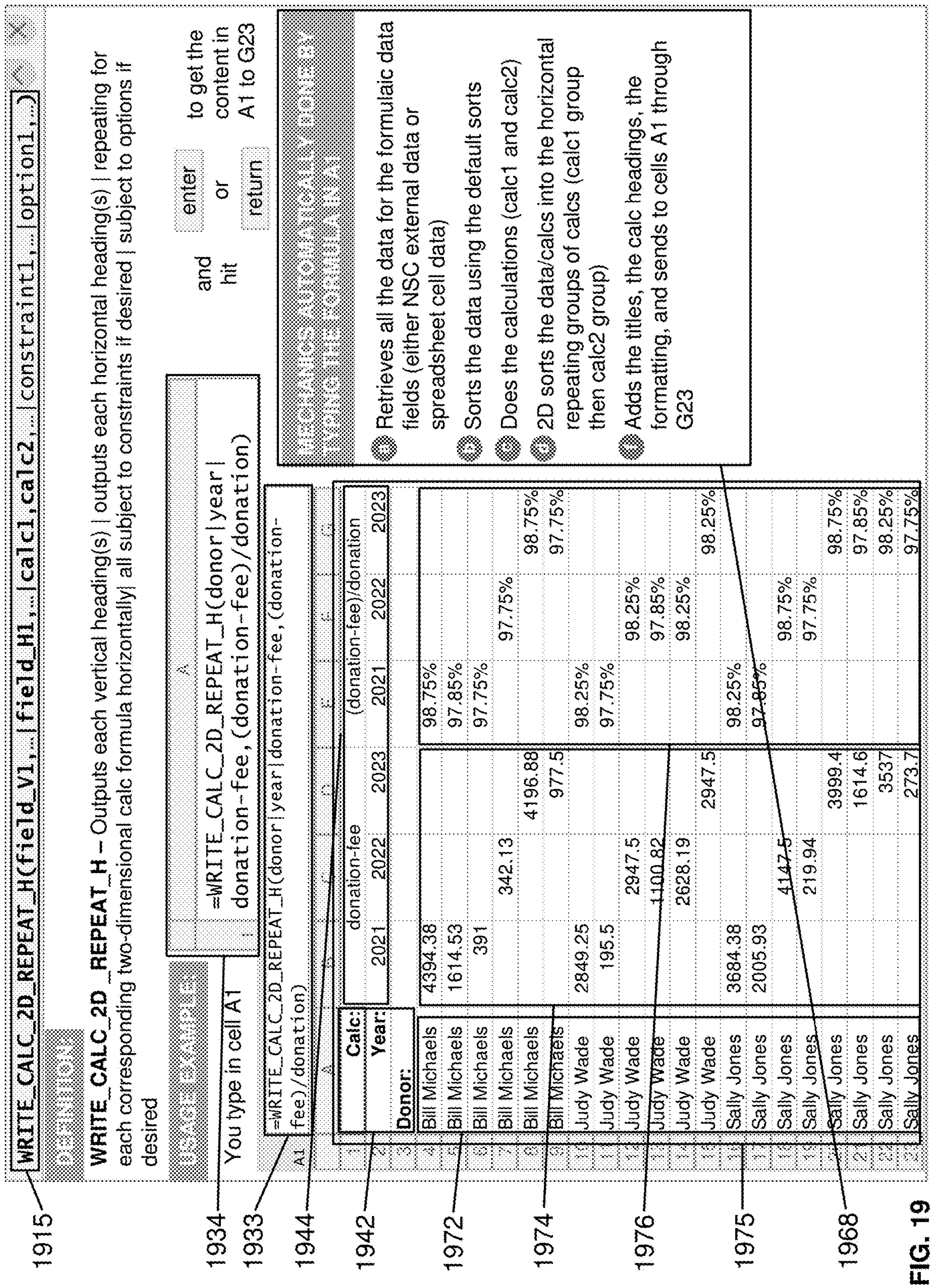
FIG. 19 examples an embodiment of our non-range or array family of repeat calculation prebuilt functions which populates the repetitions horizontally with merged calculation formula headings and titles for the all the headings employing an argument group syntax/argument structure delivering spread results while employing a function name and syntax/argument structure shared with our range or array family of repeat calculation prebuilt functions.

FIG. 19 examples a non-range or non-array two-dimensional calculation repeat functional formula 1934 employing parentheses to group the algebraic operations, one field more than the required minimum and one algebraic operator more than the required minimum. It examples an embodiment of our non-range or non-array family of repeat calculation prebuilt functions which populates the repetitions horizontally with merged calculation formula headings and titles for the all the headings employing an argument group syntax/argument structure 1915 delivering spread results while employing a function name and syntax/argument structure shared with our range or array family of repeat calculation prebuilt functions. We could have made the calc formulas much more complicated (because they support compound specifier arguments) including multiple algebraic operations and including non-range or non-array functions (e.g., SQRT, SIN, and LOG 10) but chose to keep the example simpler for case of illustrating how our function works. The functional formula 1934 examples one vertical heading ('donor'), one complementary horizontal heading ('year') and then two calcs, calc1, 'donation-fee', and calc2, '(donation-fee)/donation' (both calcs being compound specifier arguments) as shown in 1944, which repeat horizontally because of the ' H' in the function name in this embodiment. This functional formula 1934 automatically executes steps 'a' through 'd' and step 'f' summarized in 1968 when the user hits 'enter' or 'return' to populate the formula 1933 in cell 'A1' and the values in cells 'A1' through 'G23' 1975. Those steps are illustratively exampled in FIG. 23 through FIG. 25.

Step 'a' 2343 in FIG. 23 examples the formula automatically starting by retrieving the data from any of the data sets in FIG. 1A through FIG. 2B. Step 'b' 2345 then examples the data being sorted by the default sorts, in this embodiment ascending for both the vertical and horizontal headings. Step 'c' 2348 then does the row-by-row calc1 and calc2 calculations. Step 'd' 2445 in FIG. 24 then two-dimensionally arranges the headings and calcs into the two horizontal repetitions 2444 and 2447 using the default vertical and horizontal heading values ascending ordered. Those headings and calcs are spread presented with one row per row of the data in the data set. Step 'f' in FIG. 25 then adds the titles 2532 (1942 in FIG. 19), the merged calc heading cells (2523 and 2527) for the two repetitions (2563 and 2567) and any additional formatting before sending the values 2565 to cells 'A1' through 'G23' 1975 in FIG. 19 for the formula 1934.

The result 1975 in FIG. 19 examples the non-range or non-array repeat calc function with one row per row of data (spread). Which results in one row or one column of the data across each of the adjoining two-dimensional repetitions (tables) the has one value per repetition (table) as exampled in FIG. 19 where there is only one calc1 value in each row of the calc1 ('donation-fee') repetition 1974 and one calc2 value in each row of calc2 ('(donation-fee)/donation') repetition 1976. Our technology supports another variant which collapses down (minimizes) the results retaining the calc-to-calc relationships so that the comparisons are of like data as we will example next.

Non Range or Non-Array Function Family—Collapse

Figure 20:
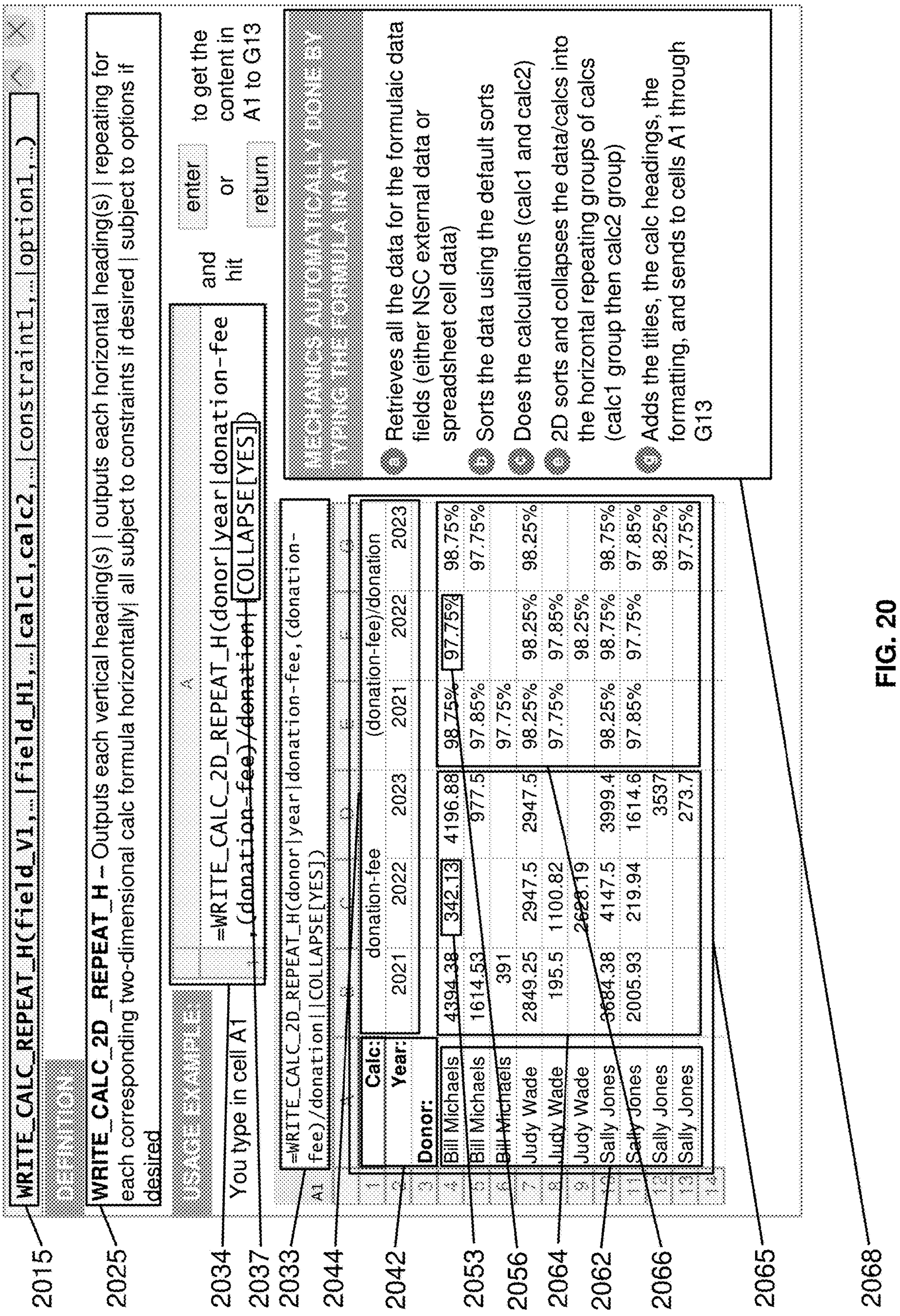
FIG. 20 examples the embodiment in FIG. 19 with an optional argument which automatically collapses the results.

FIG. 20 examples a non-range or non-array two-dimensional calculation repeat functional formula 2034 executing the same formula as FIG. 19 1934 with an optional argument 'COLLAPSE[YES]' 2037 added (a named argument in the 'option1, . . . ' named argument group). In this embodiment that argument 2037 triggers the collapsing (minimizing) of the results so that they present the same results 2065 in thirteen rows as is presented in FIG. 19 1975 in twenty-three rows. This is accomplished by our technology collapsing down data within columns (for the ' H' function variant) utilizing cells that were unoccupied in FIG. 19 1975. That collapsing ensures that all the data calc results are presented in the least (minimal) number of rows (the axis upon which the data was spread). The collapsing ensures that related data between calcs is put into the same position within the different calc repetitions, as exampled by the value '97.75%' 2056 in cell 'F4'being the 'calc2' for the corresponding '342.13' 2053 'calc1' value in 'C4'. This ensures that when users do calc-to-calc comparisons they are comparing related values. This ensures calculations done on each row of the data set are symmetrically positioned across the different repetitions. Other than the addition of this option, the functional syntax/argument structure 2015, description 2025, and the first three steps ('a', 'b', and 'c') of the automatically done mechanics 2068 by the functional formula 2034 are the same as in FIG. 19. The difference starts in step 'e' 2485 in FIG. 24 where when our technology two-dimensionally arranges the headings and calcs into the two horizontal repetitions 2484 and 2487 using the vertical and horizontal heading values ascending ordered (ascending being the default ordering in this embodiment), it also collapses down rows for like vertical heading values where there are empty spaces retaining the calc-to-calc relationships. As exampled by the 'calc1' value '342.13' moving from 2434 in the non-collapsed (spread) variant to 2474 in the collapsed variant and its corresponding 'calc2' value '0.977514' moving from 2437 in the non-collapsed variant to 2477 in the collapsed variant. Then within the 'Bill Michaels' vertical heading the 'calc1' values '4196.88' and '977.5' moving from 2435 in the non-collapsed (spread) variant to 2475 in the collapsed variant and their corresponding 'calc2' values '0.987501' and '0.9775' moving from 2438 in the non-collapsed (spread) variant to 2478 in the collapsed variant. Thus, collapsing the number of rows needed and retaining the calc-to-calc relationships (positional symmetry). This collapsing (minimizing) of the previously spread results on the vertical axis ensures the least number of vertical rows that will display all the results. In this example the minimum number of rows required for 'Bill Michaels' is three set by the values in the columns for '2021'. The minimum number of rows for 'Judy Wade' is three set by the values in the columns for '2022'. And the minimum number of rows for 'Sally Jones' is four set by the values in the columns for '2023'. That sets the total minimum number of calc output rows at ten (three plus three plus four as shown in 2062, 2064 and 2066 in FIG. 20). Step 'g' in FIG. 26 then adds the titles 2632 (2042 in FIG. 20), the merged calc heading cells 2634 and 2637 (2044 in FIG. 20) for the two repetitions 2653 and 2657 (2064 and 2066 in FIG. 20) and any additional formatting before sending the values 2655 to cells 'A1' through 'G13' 2065 in FIG. 20 for the formula 2033.

Non-Range or Non-Array Function Family—Series

Figure 21:
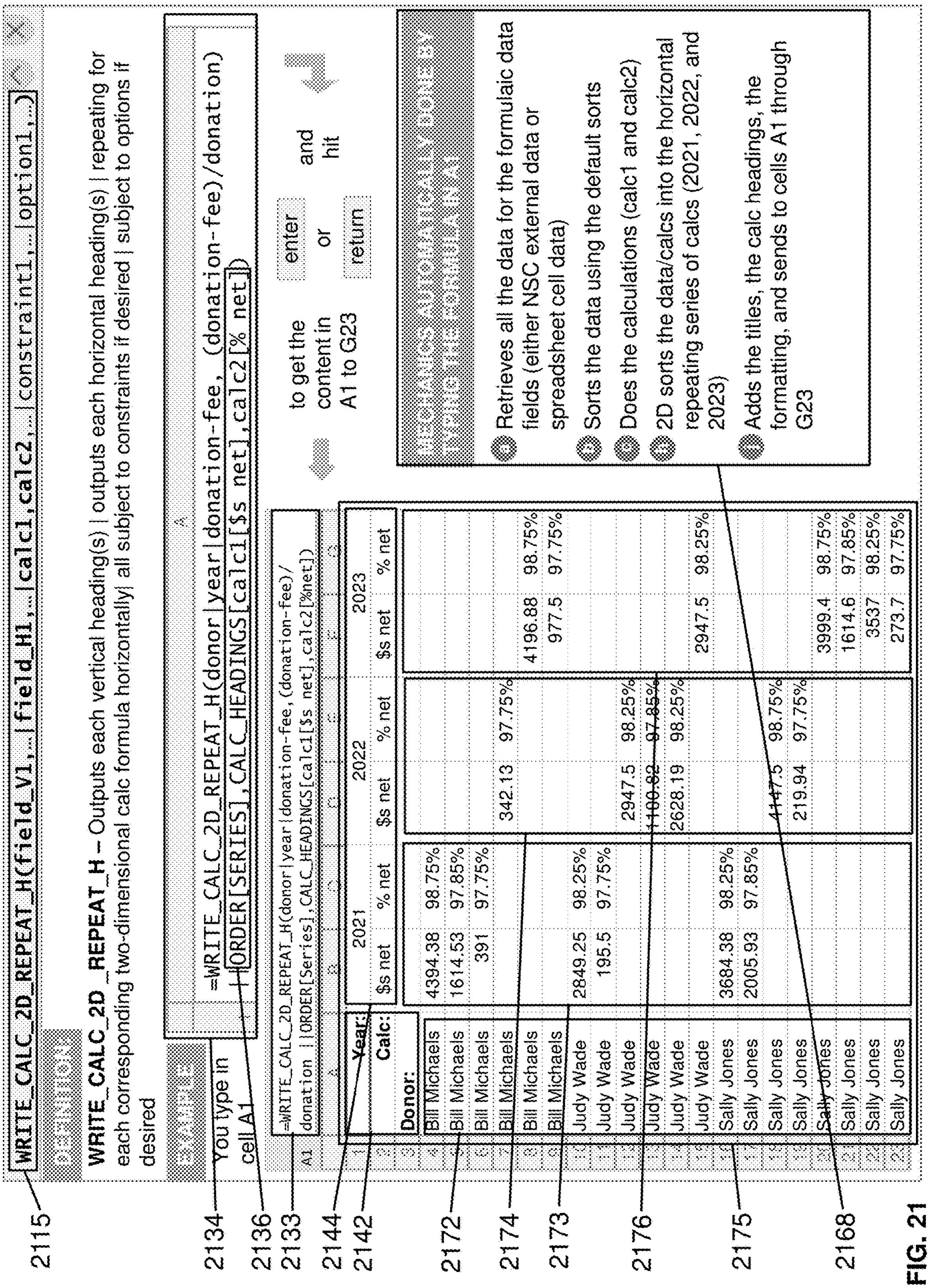
FIG. 21 examples an embodiment of our non-range or non-array family of repeat calculation prebuilt functions employing a series ordering option, an option for custom calc titles, and different positioning of the headings and titles (e.g., horizontal headings above the calc headings).

Like our previous family of repeat functions the non-range or non-array 2D calc repeat function family supports our 'SERIES' ordering of the repeated calcs. FIG. 21 examples an embodiment of our non-range or non-array family of repeat calculation prebuilt functions employing a series ordering option, an option for custom calc titles, and different positioning of the headings and titles (e.g., horizontal headings above the calc headings). In this example the user added 'ORDER[SERIES]' and 'CALC_HEADINGS[calc 1[$s net], calc2[% net]]' arguments 2136 to the functional formula 2134. In this embodiment it causes the horizontal results to have the horizontal heading field values for 'year' as the first row (in automatically merged cells) with a second row with the custom calc headings '$s net' and '% net' as exampled in 2144. This is all done using the syntax/argument structure 2115 identical to that in FIG. 20. The automatically done steps by the formula 2134/2133 summarized in 2168 are the same as previous steps 'a' through 'c' (in FIG. 23). They are followed by step 'h' 2745 in FIG. 27 where the repeated calculations are ascending sorted vertically by the 'donor' values 2724 (2172 in FIG. 21) and horizontally ordered by ascending values of 'year' groupings with serial ordering of the calcs within each 'year' grouping as exampled in 2744, 2746, and 2748. Step 'j' in FIG. 28 then moves the year values to the top row, merges those values within the grouped cells, substitutes the custom headings for the calc 1 (with $s net) and calc2 (with % net) in 2833, 2835, and 2837 (2144 in FIG. 21) above the calcs 2873, 2875, and 2877 (2173, 2174 and 2176 in FIG. 21), adds the titles 2832 (2142 in FIG. 21), and formats the results 2874 to be sent to the cells 'A1' through 'G23' 2175 in FIG. 21 with the formula 2133.

Non Range or Non-Array Function Family—Series and Collapse

Figure 22:
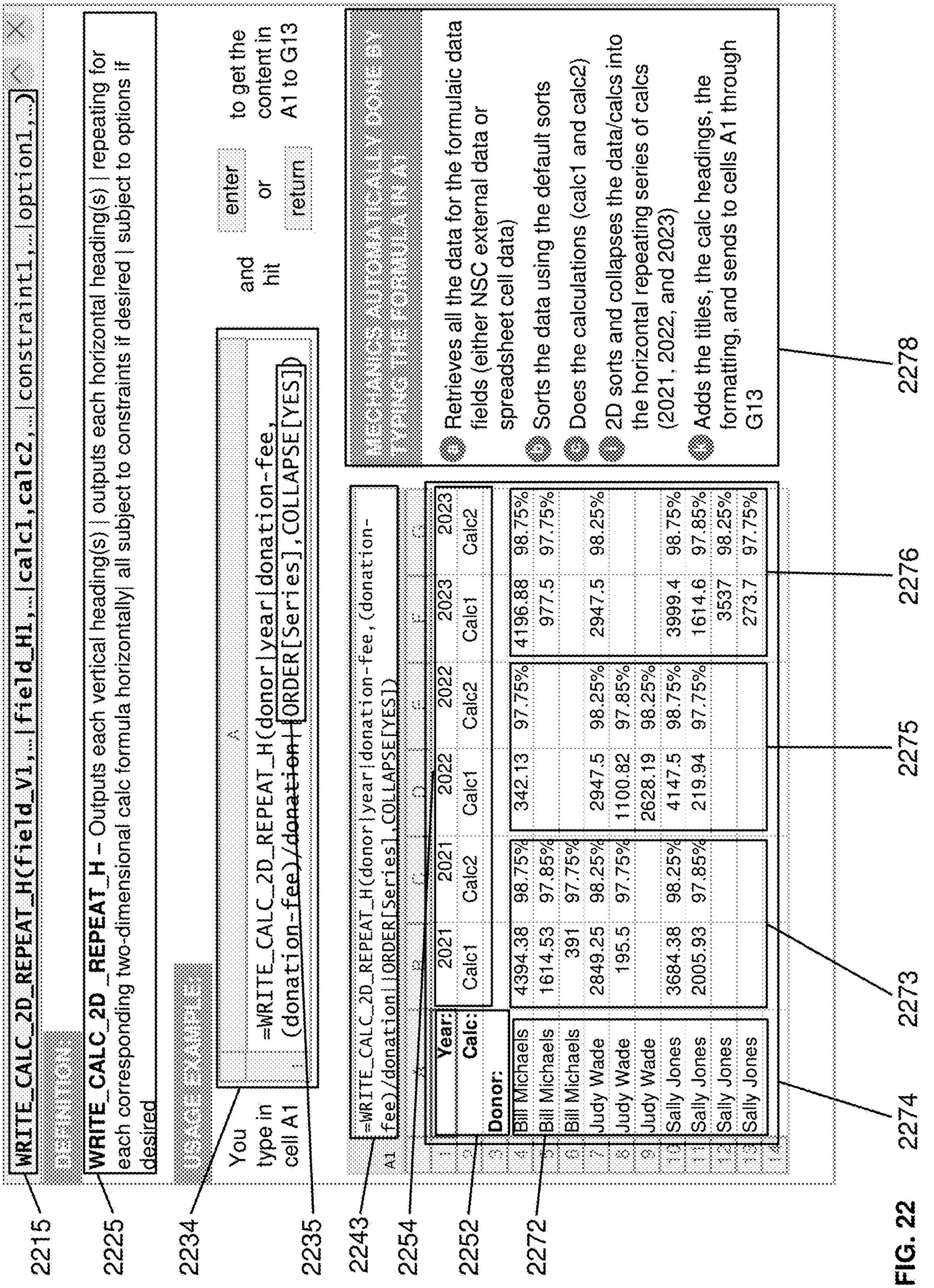
FIG. 22 examples an embodiment of our non-range or non-array family of repeat calculation prebuilt functions employing a series ordering option and a collapse option.
Figure 24:
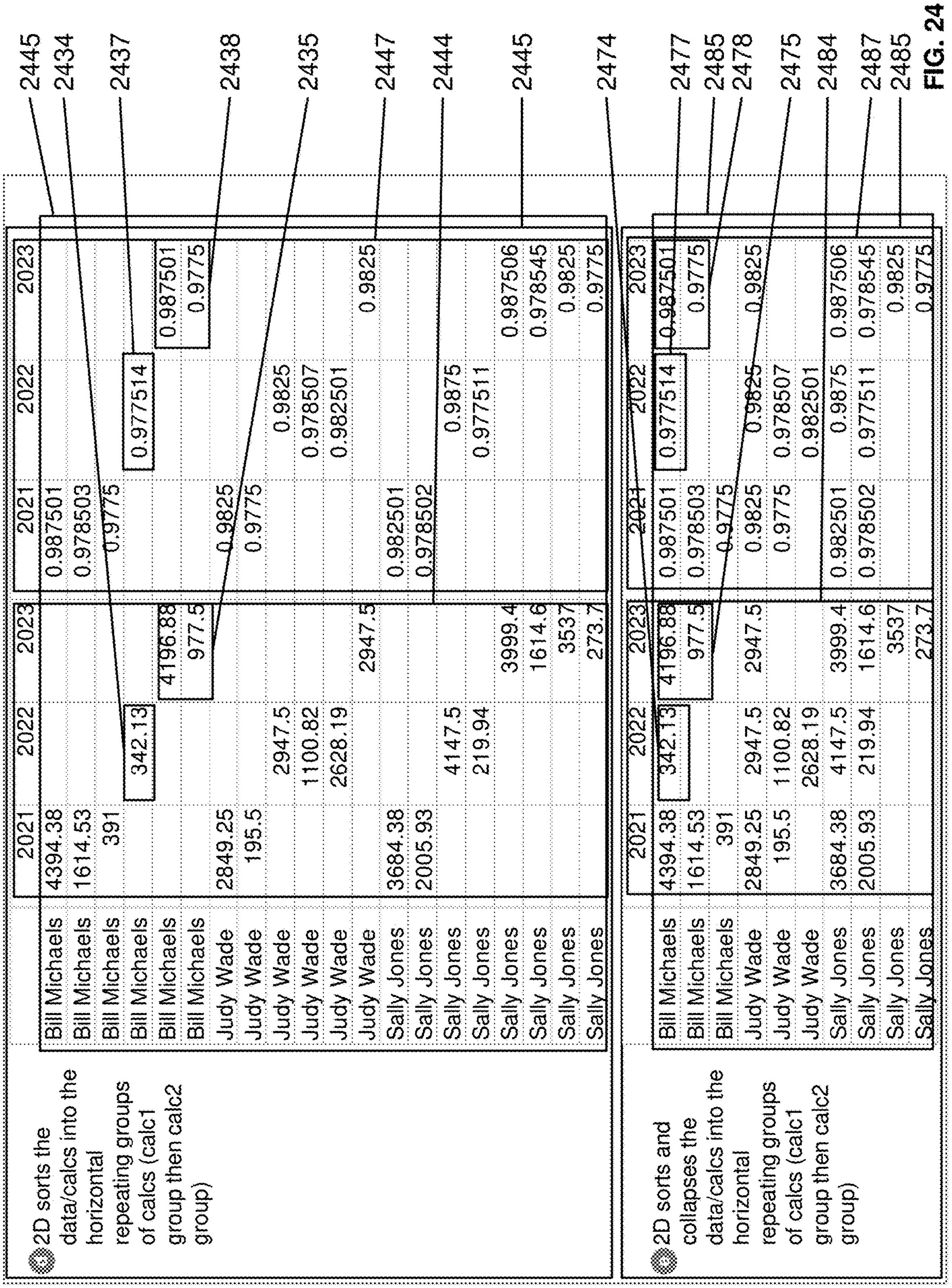
Figure 25:
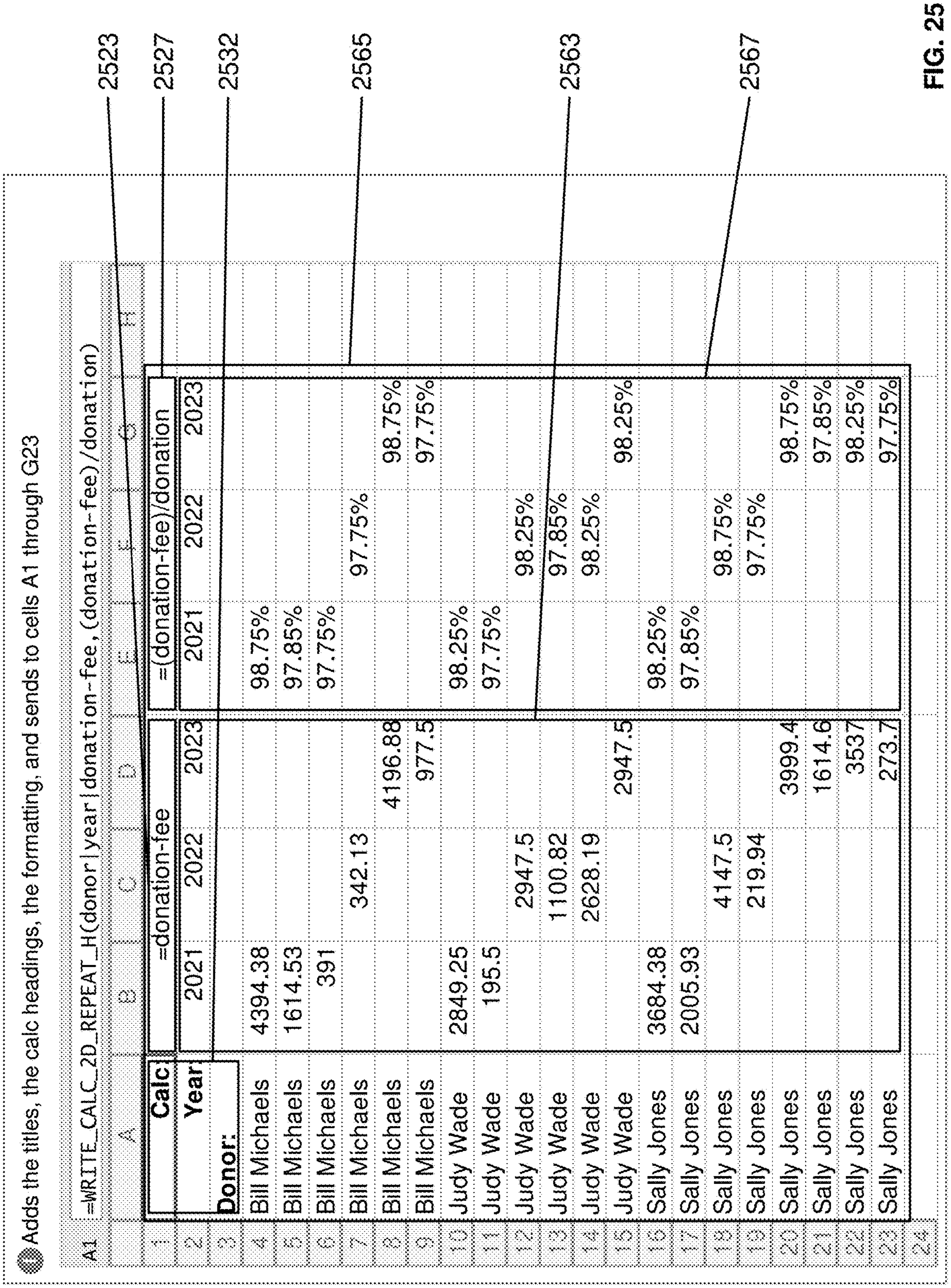
Figure 26:
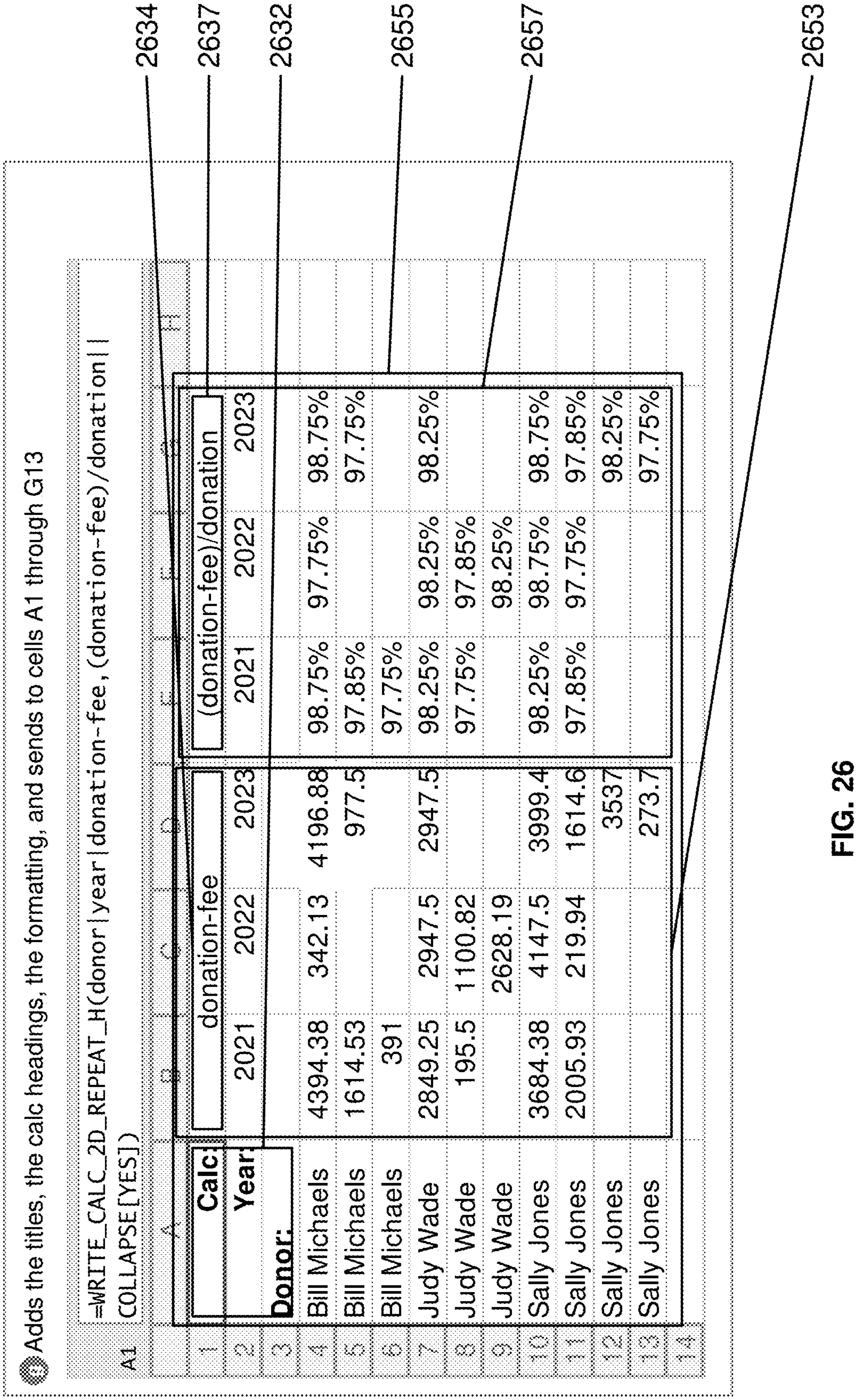
Figure 28:
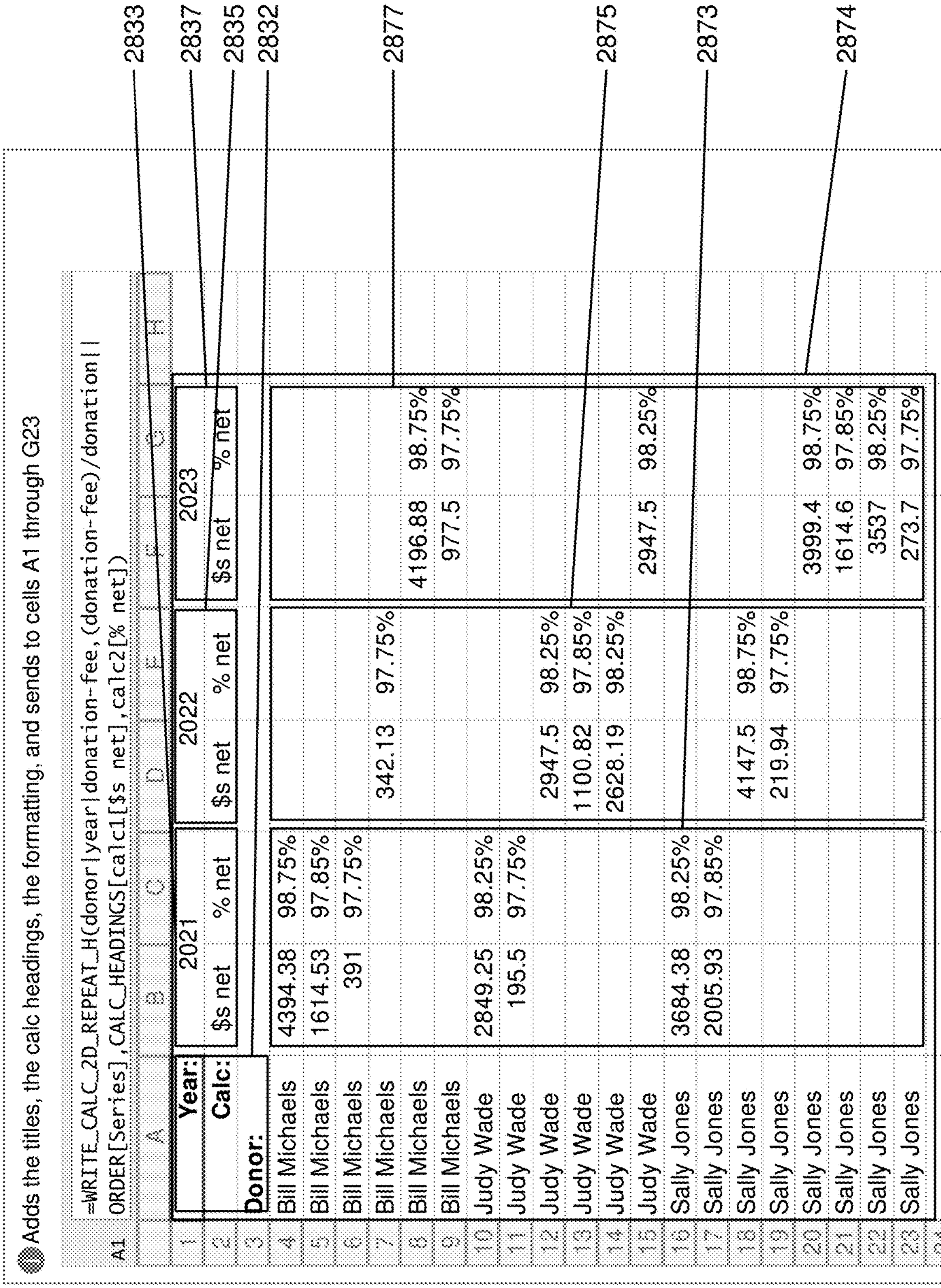
Figure 29:
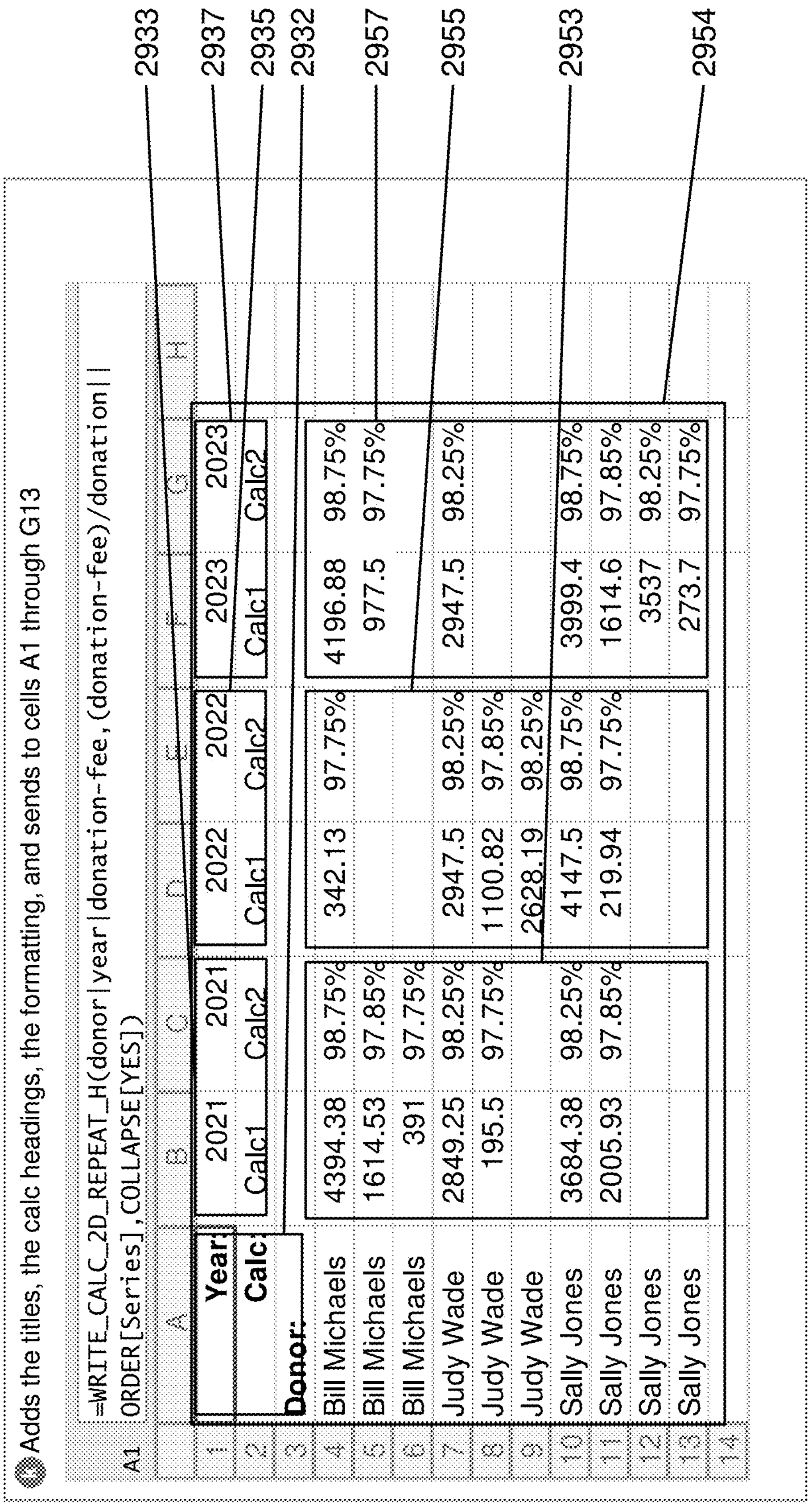

Our non-range and non-array 2D calculation repeat function family supports collapsing series results as exampled in FIG. 22. FIG. 22 examples an embodiment with simple default headings and does the serial version of the previously exampled collapsing. For the simplicity of the exampling purposes, it uses the same syntax/argument structure 2215 as that in FIG. 20 and FIG. 22 just with some differences in defaults. The series ordering and collapsing is triggered by the same option arguments 'ORDER[Series], COLLAPSE[YES]' 2235 as previously exampled. However, different arguments could be used or dedicated functions (with different function names) that do one or both of the optional arguments as defaults.

FIG. 22 examples the serial output of the different calcs (e.g., 'calc1' and 'calc2') by grouping of the horizontal heading years as exampled by the repetitions by year 2273 ('2021'), 2275 ('2022'), and 2276 ('2023') for the vertical headings 2272 with the horizontal headings and calc titles 2254. This is illustratively delivered automatically by the formula 2234/2243 by the five steps summarized in 2278. The first three of those steps (step 'a', step 'b', and step 'c' exampled in FIG. 23 have been previously explained. The fourth step, step 'i' 2785 exampled in FIG. 27 collapses the calcs in a manner similar to the one described in step 'e' 2485 in FIG. 24, except in serial order of the calcs 2784/2786/2788 after the results are 2D sorted. This collapsing of the previously spread results retains the positional symmetry across the repetitions, in this example within the three 'year' value groupings. The fifth step, step 'k' exampled in FIG. 29 then moves the 'year' values to the top row and adds the 'Calc1' and 'Calc2' serial heading in 2933, 2935, and 2937 (2254 in FIG. 22) above the calc repetitions 2953, 2955, and 2957 (2273, 2274 and 2276 in FIG. 22), adds the titles 2932 (2252 in FIG. 22), and formats the results 2954 to be sent to the cells 'A1' through 'G13' 2274 in FIG. 22 for the formula 2243. We will next example a different syntax/argument structure for our non-range or non-array function family.

Non Range or Non-Array Function Family—Alternative Syntax

Figure 58:
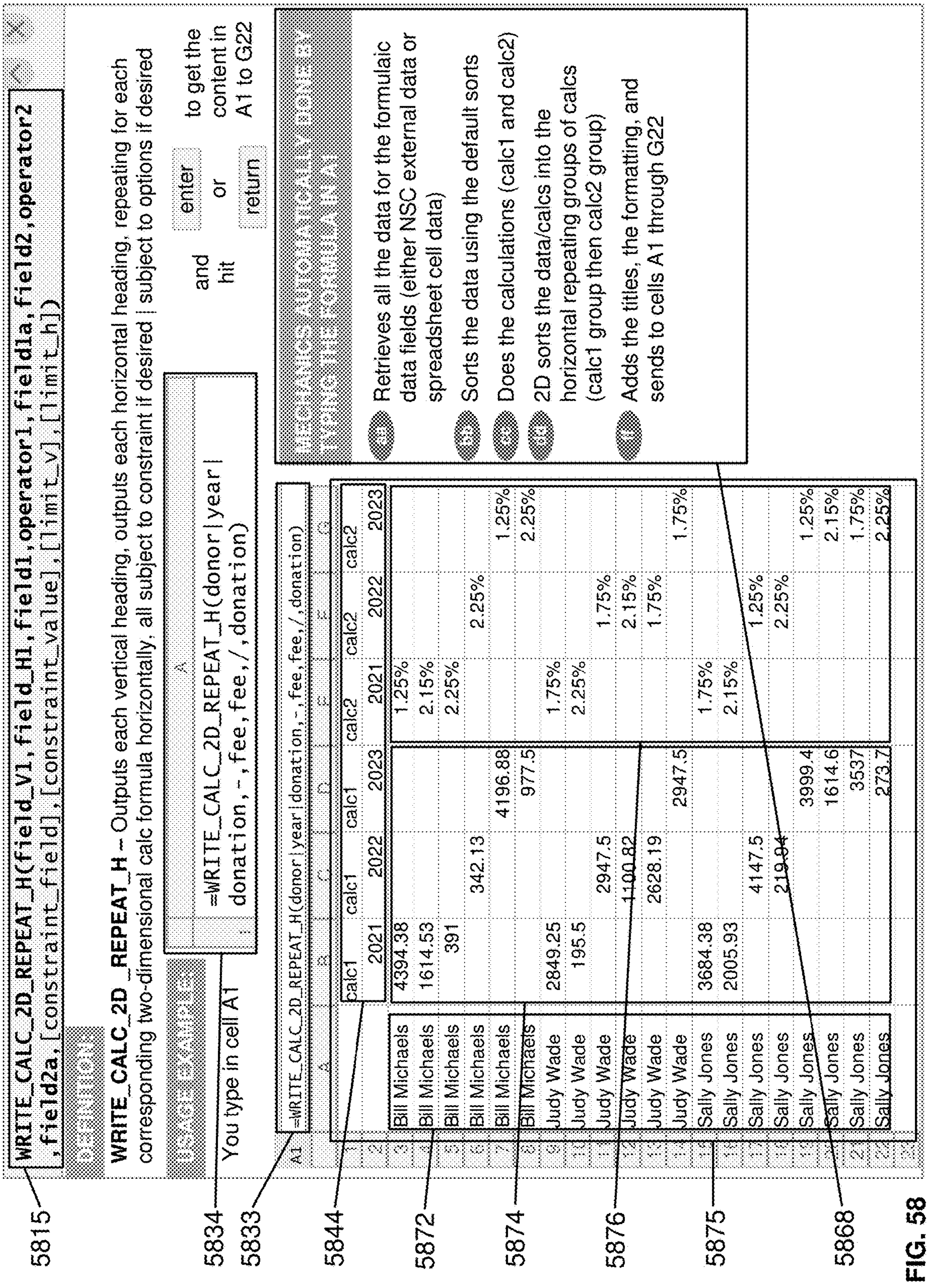
FIG. 58 examples an alternative syntax/argument structure (with no argument groups and each argument specifies a single field, field value, single algebraic operator, or single option specification) for our non-range or non-array two-dimensional calculation repeat function.

FIG. 58 examples an alternative syntax/argument structure for our non-range or non-array two-dimensional calculation repeat function. The functional syntax/argument structure 5815 contains only singular arguments separated by commas. There are no argument groups (e.g., repeat argument or named argument groups) and each argument specifies a single field, field value, single algebraic operator, or single option specification. There are no arguments accepting compound specifiers (e.g., fee/donation) but instead each argument is a single specifier (although that specification can have many different values to choose from). The functional formula 5834 examples one vertical heading ('donor'), one horizontal heading ('year') and then two calcs, calc1 ('donation-fee') specified as 'donation,-, fee' and calc2 ('fee/donation') specified as 'fee,/,donation'. The calcs will repeat horizontally because of the ' H' in the function name in this embodiment but equally works for vertical repetitions and of course different names for the prebuilt function. This functional formula 5834 has the minimum number of required fields (i.e., eight) and algebraic operators (i.e., two). Note, the six different fields do not need to be unique but need to somehow provide the two headings (i.e., one vertical and one horizontal) and the two calcs (each one employing one algebraic operator). This functional formula 5834 automatically executes steps 'aa' through 'dd' and step 'ff' summarized in 5868 when the user hits 'enter' or 'return' to populate the formula in cell 'A1'. Those steps are illustratively exampled in FIG. 53, FIG. 54, and FIG. 59.

Step 'aa' 5343 in FIG. 53 examples the formula automatically starting by retrieving the data from any of the data sets in FIG. 1A through FIG. 2B. Step 'bb' 5345 then examples the data being sorted by the default sorts, in this embodiment ascending for both the vertical and horizontal headings. Step 'cc' 5348 then does the row-by-row calc1 and calc2 calculations. Step 'dd' in FIG. 54 then two-dimensionally arranges the vertical headings 5424 (5872 in FIG. 58) and the calcs/horizontal headings (5844 in FIG. 58) into the two horizontal repetitions 5444 and 5447 (5874 and 5876 in FIG. 58) using the default vertical and horizontal heading values ascending ordered. Step 'ff' in FIG. 59 then adds any additional formatting before sending the values 5965 to cells 'A1' through 'G22' 5875 in FIG. 58 for the formula 5833.

The result 5875 in FIG. 58 examples one of many possible different syntaxes supported by our technology. There are many different syntaxes that work to specify the needed fields, algebraic operators, and any desired additional arguments (e.g., constraints and options). However, rather than exampling additional different syntax/argument structures and features for this repeat family of our functions, we will move onto exampling the third family of repeat functions—the one involving no calculations.

No Calculation Function Family

Our final family of two-dimensional repeat functions involves no calculations as it repetitively organizes and displays related data in repeated 2D (two-dimensional) groups. It operates more like the non-range or non-array function 2D calculation repeat functions than the range or array 2D calculation repeat functions. This is because it, like the non-range or non-array function 2D calculation repeat functions gives results per row of data (in the data-set) and does not range or array function reduce the number of results. Variants of the no calculation 2D repeat function family do collapse the data as was exampled for the non-range or non-array function 2D calculation repeat functions and supports the serial output of the different 2D fields as we will later example.

Figure 56:
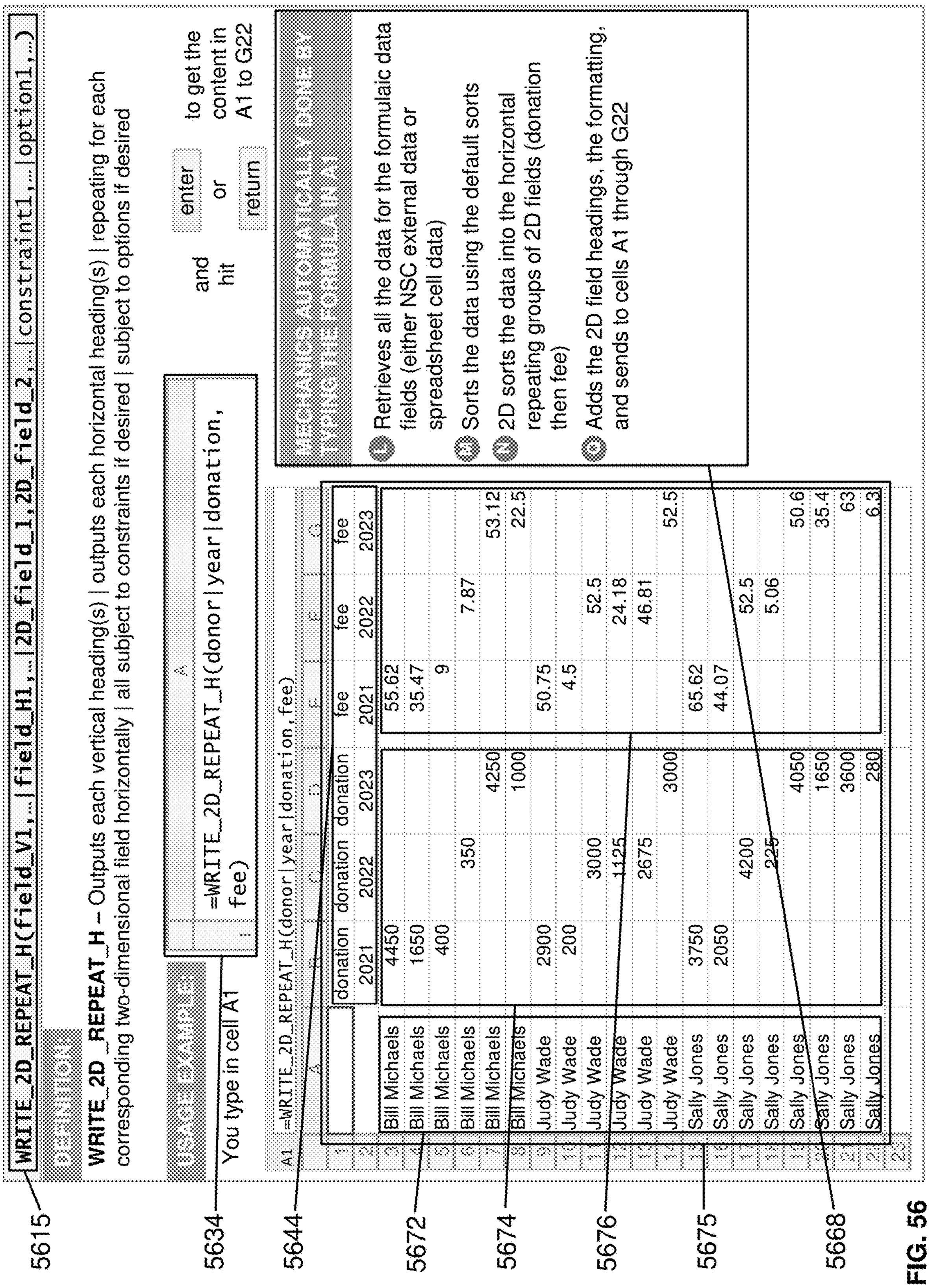
FIG. 56 examples an embodiment of our no calculation family of repeat calculation prebuilt functions employing a syntax/argument structure employing argument groups for a formula with only the required arguments delivering spread results.

FIG. 56 examples the use of only the required arguments with a small set of defaults (e.g., horizontal, and vertical sorting). The syntax/arguments 5615 of the function in this embodiment are:

WRITE_2D_REPEAT_H(field_V1, . . . |field_H1, . . . |2D_field_1,2D_field_2, . . . |constraint1, . . . |option1, . . . )

with the required arguments bolded. The name of the function 'WRITE_2D REPEAT H was set to be similar (without'_CALC') to the previous function names but could be any name, ideally not already used in typical spreadsheets. The syntax/argument structure was also patterned after argument group variants of the previous embodiments but could be very different provided it supplies the necessary fields and any prebuilt function optionality.

Figure 36:
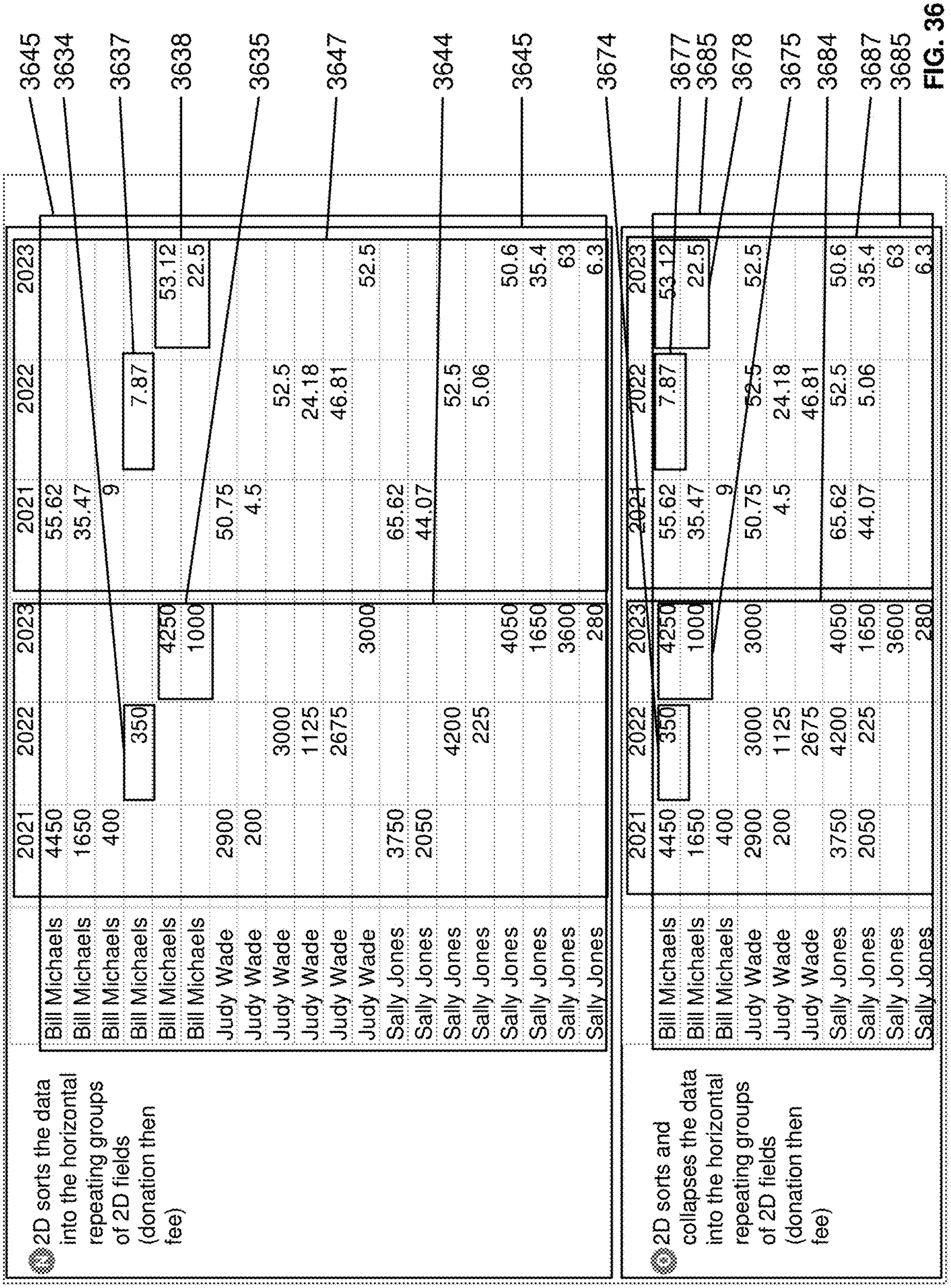
Figure 57:
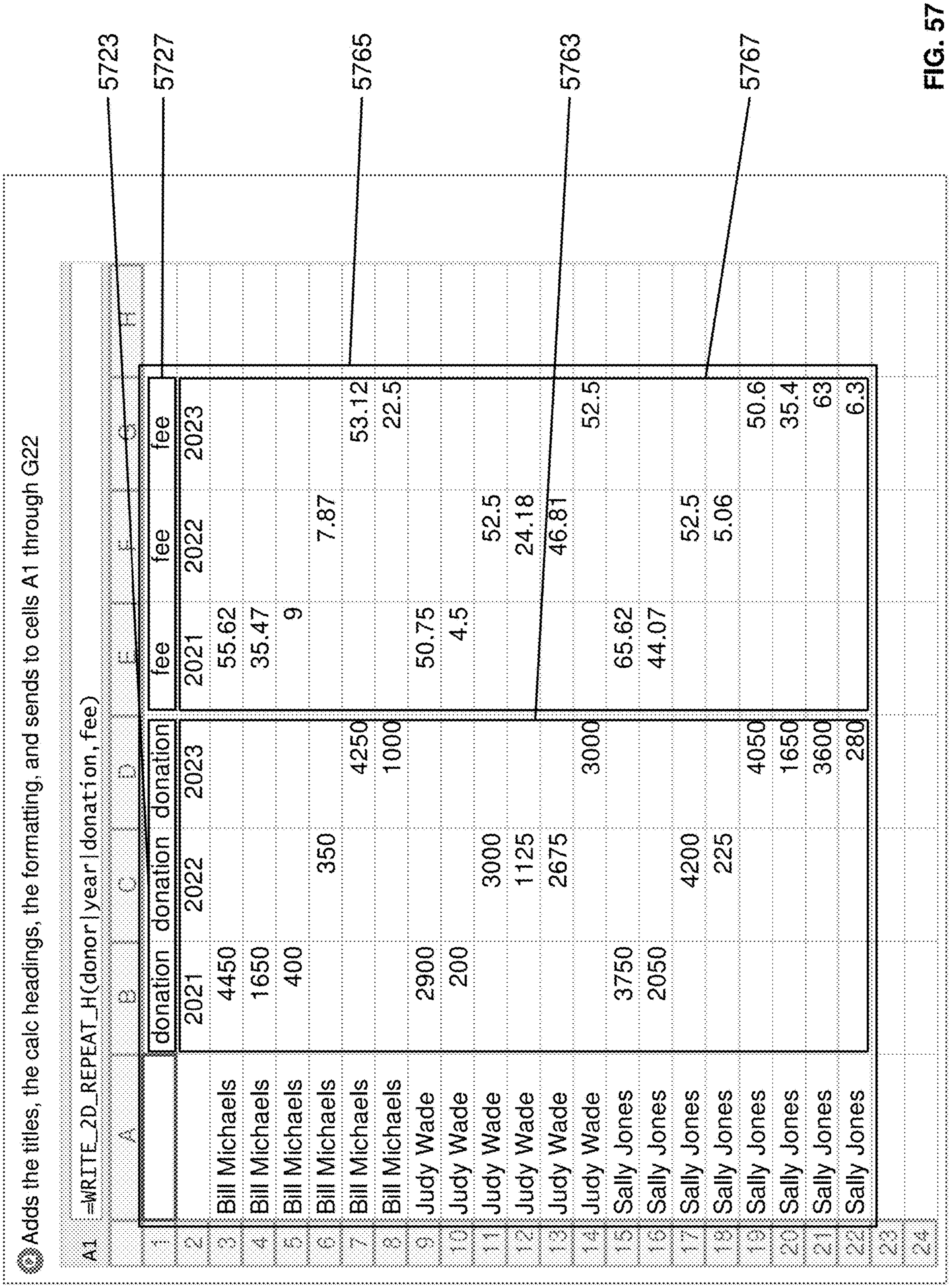
FIG. 57 examples an automatically done step by our functional formula in FIG. 56.

We again are exampling our technology with the very small data set shown in either FIG. 1A, FIG. 1B, FIG. 2A, and FIG. 2B to make more visible what our technology is doing without the complexity of typically large data sets. As we have mentioned, our examples could be using any one of those data sources or any variants. We will illustrate for explanation purposes steps of what our technology is doing (summarized in 5668 and exampled in more detail in FIG. 35, FIG. 36, and FIG. 57), recognizing this is for understanding of what it is doing and not an exact depiction of how our application code is doing it. FIG. 56 starts with a charity worker looking to present two matched two-dimensional sets of data for both the donor donations and the fees associated with those donations by donor and year. To do so they input the formula 5634:

'=WRITE_2D_REPEAT_H(donor|year|donation,fec)' where 'donor' is the formulaic data field input 'field_V1' that provides the vertical table headings, and 'year' is the field input 'field_H1' that provides the horizontal table headings. Because this function is the horizontal repeat version, as designated by the ' H' in the function name, the repeated data will be done horizontally sharing the vertical table headings ('donor' 5672) and replicating the horizontal table complementary headings ('year' 5644). The '2D_field_1' argument 'donation' provides the data for the first two-dimensional (2D) repetition values 5674 and its three 'donation' headings 5644 (which are generated by our app using the field name) while the '2D_field_2' argument 'fee' provides the data for the second 2D repetition values 5676 and its three 'fee' headings 5644 (which are generated by our app using the field name). The data retrieval is done in the first step, step 'L' 3544 in FIG. 35, and could source the data from either in cell (e.g., FIG. 2A or FIG. 2B) or non-spreadsheet cell (e.g., FIG. 1A or FIG. 1B) data sets. The second step, step 'M' 3546 in FIG. 35, sorts the data using the default ascending vertical and horizontal heading sorts. The third step, step 'N' 3645 in FIG. 36, two-dimensionally sorts the vertical and horizontal heading field values with ascending values (the defaults) and their related two sets of data 2D field values 3644 ('donation') and 3647 ('fee'). In this embodiment the data is spread on the vertical axis, the axis which is not duplicated by the calc repetitions. This means that each row of the data is represented by a row in the two-dimensional sort. We call this process spreading the data. The end result is there are as many vertical headings as there are rows in the data set (as contrasted with each repeated set of the horizontal headings which are deduped) and the two-dimensional results have numerous empty cells corresponding to the non-deduped rows. The fourth step, step 'Q' in FIG. 57, then adds the 'Field:' headings 5723 and 5727, cell formats the results including the two repetitions (5763 and 5767) and sends the results 5765 and the formula to cells 'A1' to 'G22' 5675 in FIG. 56 giving the charity worker two sets of similarly sorted organized sets of data for easy review.

No Calculation Function Family—Titles

Figure 30:
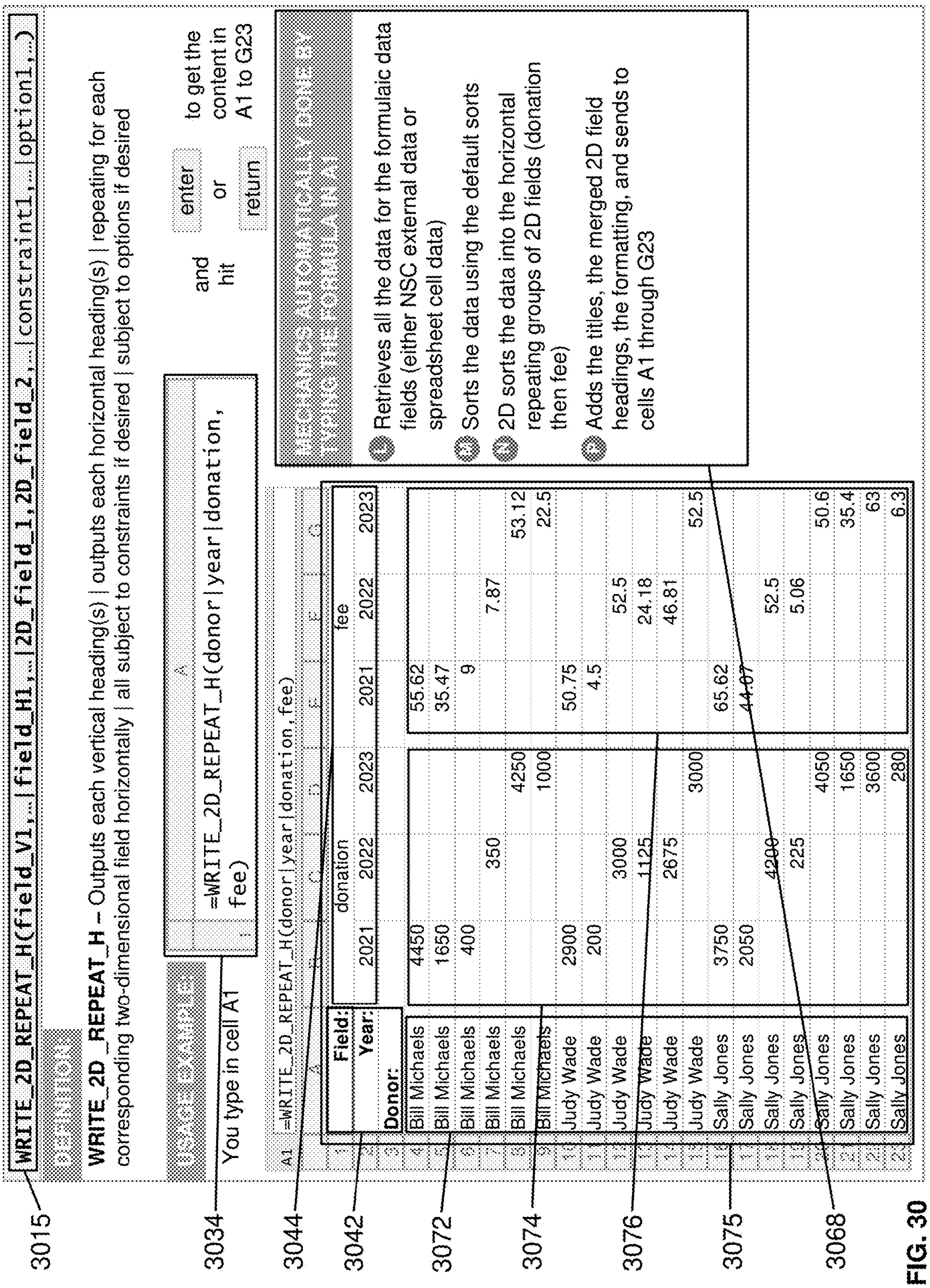
FIG. 30 examples an embodiment of our no calculation family of repeat calculation prebuilt functions employing a syntax/argument structure employing argument groups for a formula with only the required arguments delivering spread results and default population of titles and default merging of the two-dimensional field headings.

FIG. 30 examples another embodiment which uses of only the required arguments, however with a default setting of populating titles. The syntax/arguments 3015 of the function in this embodiment are:

WRITE_2D_REPEAT_H(field_V1, . . . |field_H1, . . . |2D_field_1,2D_field_2, . . . |constraint1, . . . |option1, . . . )

with the required arguments bolded like in 5615 in FIG. 56. The name of the function 'WRITE_2D_REPEAT_H was set to be similar to the previous function names but could be any name, ideally not already used in typical spreadsheets.

Figure 37:
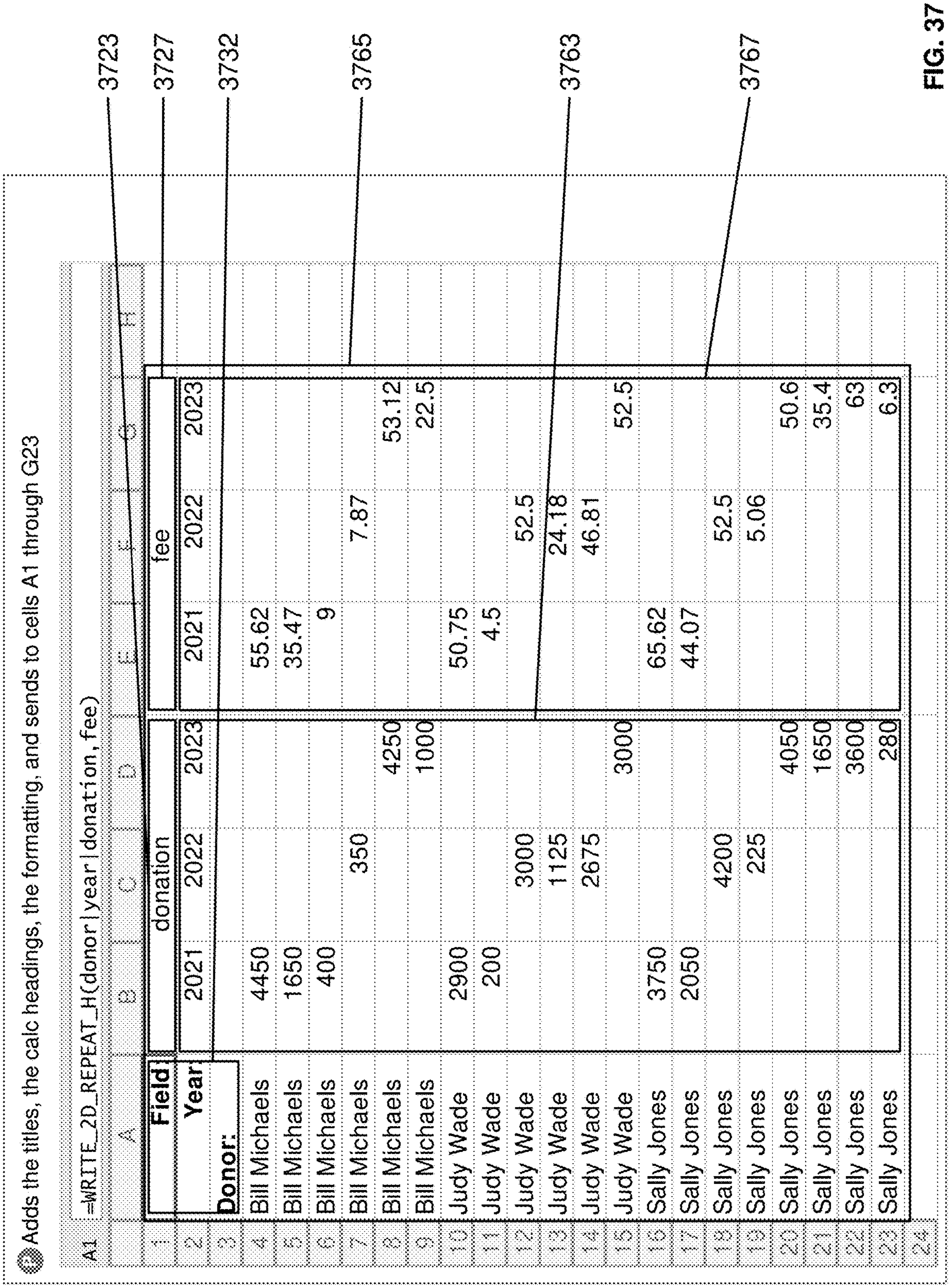

We will illustrate for explanation purposes steps of what our technology is doing (summarized in 3068 and exampled in more detail in FIG. 35, FIG. 36, and FIG. 37), recognizing this is for understanding of what it is doing and not an exact depiction of how our application code is doing it. FIG. 30 starts with a charity worker looking to present two matched two-dimensional sets of data for both the donor donations and the fees associated with those donations by donor and year. To do so they input the formula 3034:

'=WRITE_2D_REPEAT_H(donor|year|donation,fec)' where 'donor' is the formulaic data field input 'field_V1' that provides the vertical table headings, 'year' is the field input 'field_H1' that provides the horizontal table headings. Because this function is the horizontal repeat version, as designated by the ' H' in the function name, the repeated data will be done horizontally sharing the vertical table headings ('donor' 3072) and replicating the horizontal table headings ('year' 3044). The '2D_field_1' argument 'donation' provides the data for the first 2D repetition 3074 and its 'donation' merged cell heading 3044 while the '2D_field_2' argument 'fec' provides the data for the second 2D repetition 3076 and its 'fee' merged cell heading 3044. Note, while this example was for a horizontal repeat version our technology supports a vertical repeat version working in a manner similar to the previous example herein. The data retrieval is done in the first step, step 'L' 3544 in FIG. 35, and could source the data from either in cell (e.g., FIG. 2A or FIG. 2B) or non-spreadsheet cell (e.g., FIG. 1A or FIG. 1B) data sets. The second step, step 'M' 3546 in FIG. 35, sorts the data using the default ascending vertical and horizontal heading sorts. The third step, step 'N' 3645 in FIG. 36, two-dimensionally sorts the vertical and horizontal heading fields values with ascending values (the defaults) and their related two sets of two-dimensional data. The fourth step, step 'P' in FIG. 37, then adds the titles 3732 (3042 in FIG. 30), adds the 'Field:' headings 3723 and 3727, cell formats the results 3765 including the two repetitions (3763 and 3767) and sends them and the formula to cells 'A1' to 'G23' 3075 in FIG. 30 giving the charity worker two sets of similarly sorted organized sets of data for easy review with automatically generated titles for the headings. These automatically generated titles are done by default in this embodiment this and the default merging of the two-dimensional field headings are the differences between this embodiment and the one exampled in FIG. 56. In other embodiments the automatically generated titles could be replaced by user specified custom titles.

No Calculation Function Family—Collapse

Figure 31:
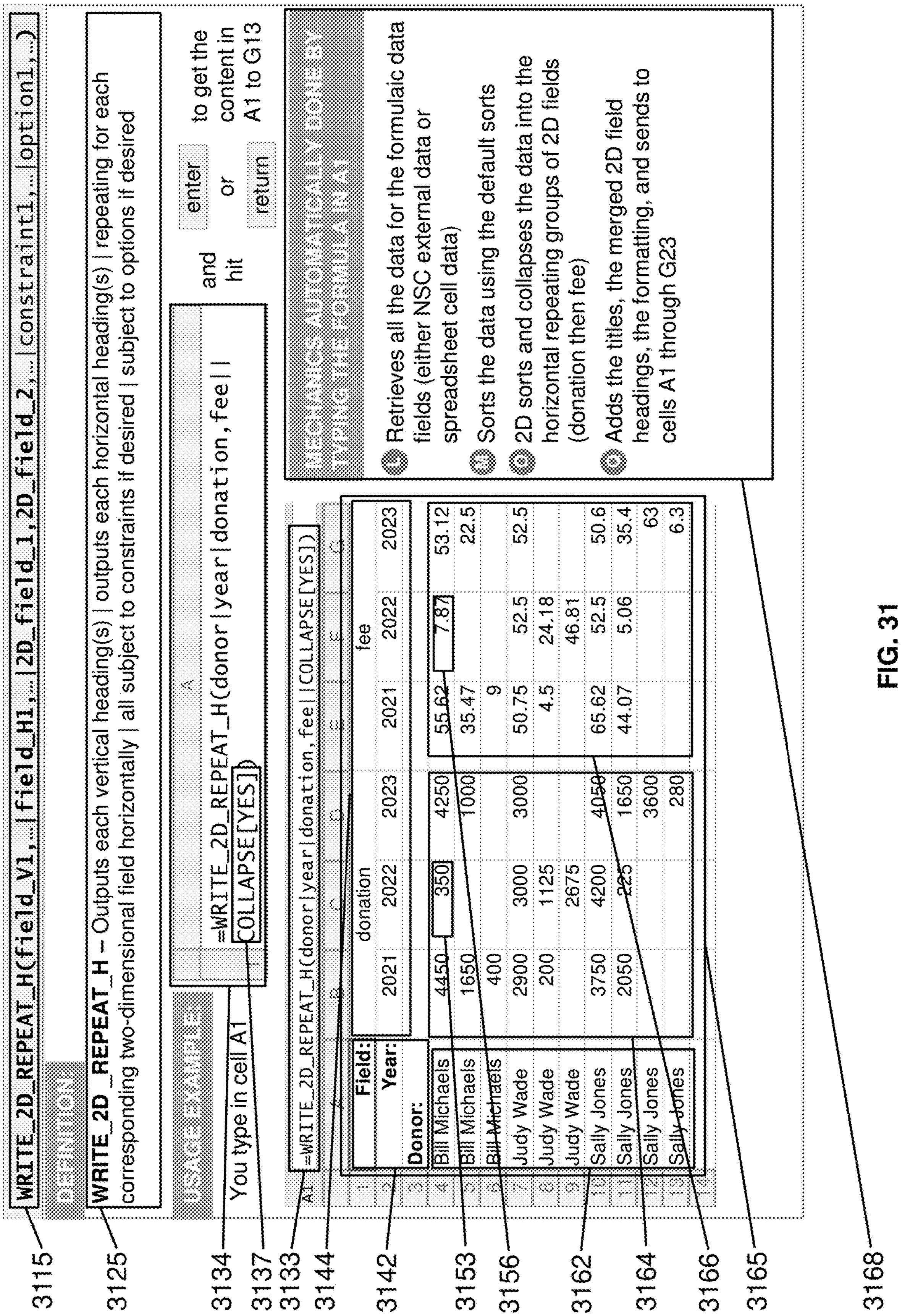
FIG. 31 examples the embodiment and formula in FIG. 30 with an optional argument added that collapses the otherwise spread results.
Figure 38:
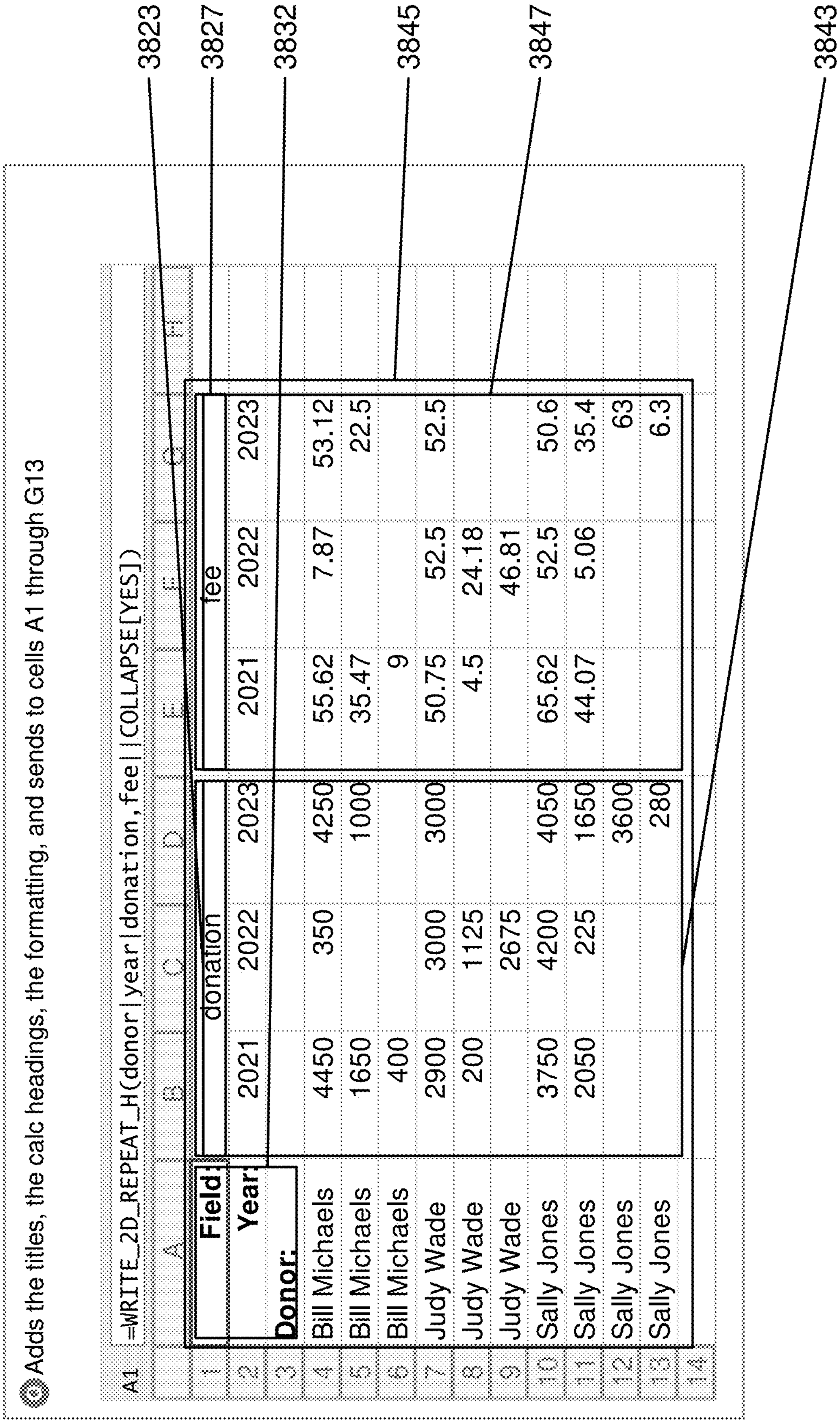

FIG. 31 examples a no calculation two-dimensional repeat functional formula 3134 executing the same formula as FIG. 30 3034 with the addition of an optional argument 'COLLAPSE[YES]' 3137. In this embodiment that argument 3137 triggers the collapsing (minimizing) of the results so that the formula presents the same results 3165 in thirteen rows as is presented in FIG. 30 3075 in twenty-three rows. This is accomplished by our technology collapsing data within columns (for this embodiment of the ' H' function variant) utilizing cells that were unoccupied in the repeated two-dimensional results 3074 and 3076 in FIG. 30. The collapsing (minimizing) ensures that related data is put into the same position (positional symmetry) within the different '2D_field' repetitions, as exampled by the value '7.87' 3156 in cell 'F4' being the '2D_field_2' value for the corresponding '350' 3153 '2D_field 1' value in 'C4'. This ensures that when users do "2D_field_1' to '2D_field_2' (or more if there are more repetitions) comparisons they are comparing related values. Other than this option, the functional syntax/argument structure 3115, description 3125, and the first two steps ('L' and 'M') of the automatically done mechanics 3168 by the functional formula 3134 are the same as in FIG. 30. The difference starts in step 'O' 3685 in FIG. 36 where when our technology two-dimensionally arranges the headings and 2D_fields into the two horizontal repetitions 3684 and 3687 using the vertical and horizontal heading values ascending ordered (the default ordering), it also collapses down rows for like vertical headings where there are empty spaces retaining the 2D_field to 2D_field relationships (positional symmetry). As exampled by the '2D_field_1' value '350' moving from 3634 in the non-collapsed (spread) variant to 3674 in the collapsed variant and its corresponding '2D_field_2' value '7.87' moving from 3637 in the non-collapsed (spread) variant to 3677 in the collapsed variant. Then within the 'Bill Michaels' vertical heading the '2D_field_1' values '4250' and '1000' moving from 3635 in the non-collapsed (spread) variant to 3675 in the collapsed variant and their corresponding '2D_field_2' values '53.12' and '22.5' moving from 3638 in the non-collapsed (spread) variant to 3678 in the collapsed variant. Thus, collapsing the number of rows needed and retaining the 2D_field to 2D_field relationships (positional symmetry). This collapsing of the previously spread results on the vertical axis ensures the least number of vertical rows that will display all the two-dimensional field value results. In this example the number of minimum number of rows required for 'Bill Michaels' is three set by the values in the columns for '2021'. The minimum number of rows for 'Judy Wade' is three set by the values in the columns for '2022'. And the minimum number of rows for 'Sally Jones' is four set by the values in the columns for '2023'. That sets the total minimum number of two-dimensional calc output rows at ten (three plus three plus four as shown in 3162, 3164 and 3166 in FIG. 31). Step 'Q' in FIG. 38 then adds the titles 3832 (3142 in FIG. 31), the merged 2D_field heading cells 3823 and 3827 (3144 in FIG. 31) for the two repetitions 3843 and 3847 (3164 and 3166 in FIG. 31) and any additional formatting before sending the values 3845 to cells 'A1' through 'G13' 3165 in FIG. 31 for the formula 3133.

No Calculation Function Family—Series

Figure 32:
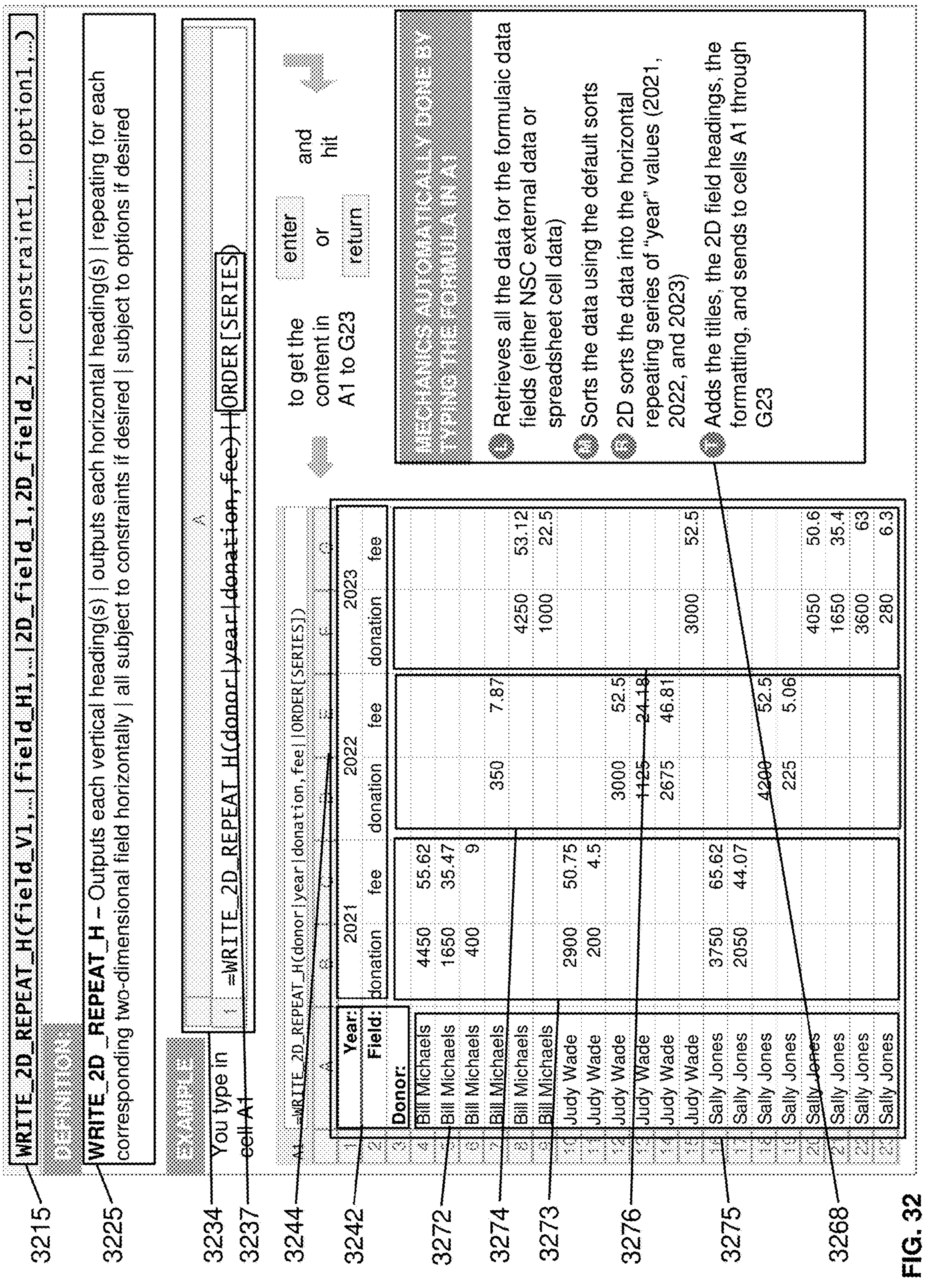
FIG. 32 examples the embodiment and formula in FIG. 30 with an optional argument added that series orders the two-dimension field values while grouping by horizontal heading values.

Like our previous family of repeat functions the no calculation 2D calc repeat function family supports our 'SERIES' ordering of the repeated 2D_fields. FIG. 32 examples a series ordering of our repeating no calculation 2D function technology. In this embodiment the 'SERIES' ordering of the repeating output is triggered by an 'ORDER [SERIES]' 3237 argument in the functional formula 3234 which otherwise is a formula similar to the previous example in FIG. 30 3034. The difference is that rather than presenting the results grouped together by 2D_field, this embodiment presents the 2D_field results in series form grouped by value of the heading, which in this example are the horizontal values of the field 'year' as exampled in 3242 (the '2021', '2022', and '2023'). This is all done using the syntax/argument structure 3215 identical to that in FIG. 30

Figure 40:
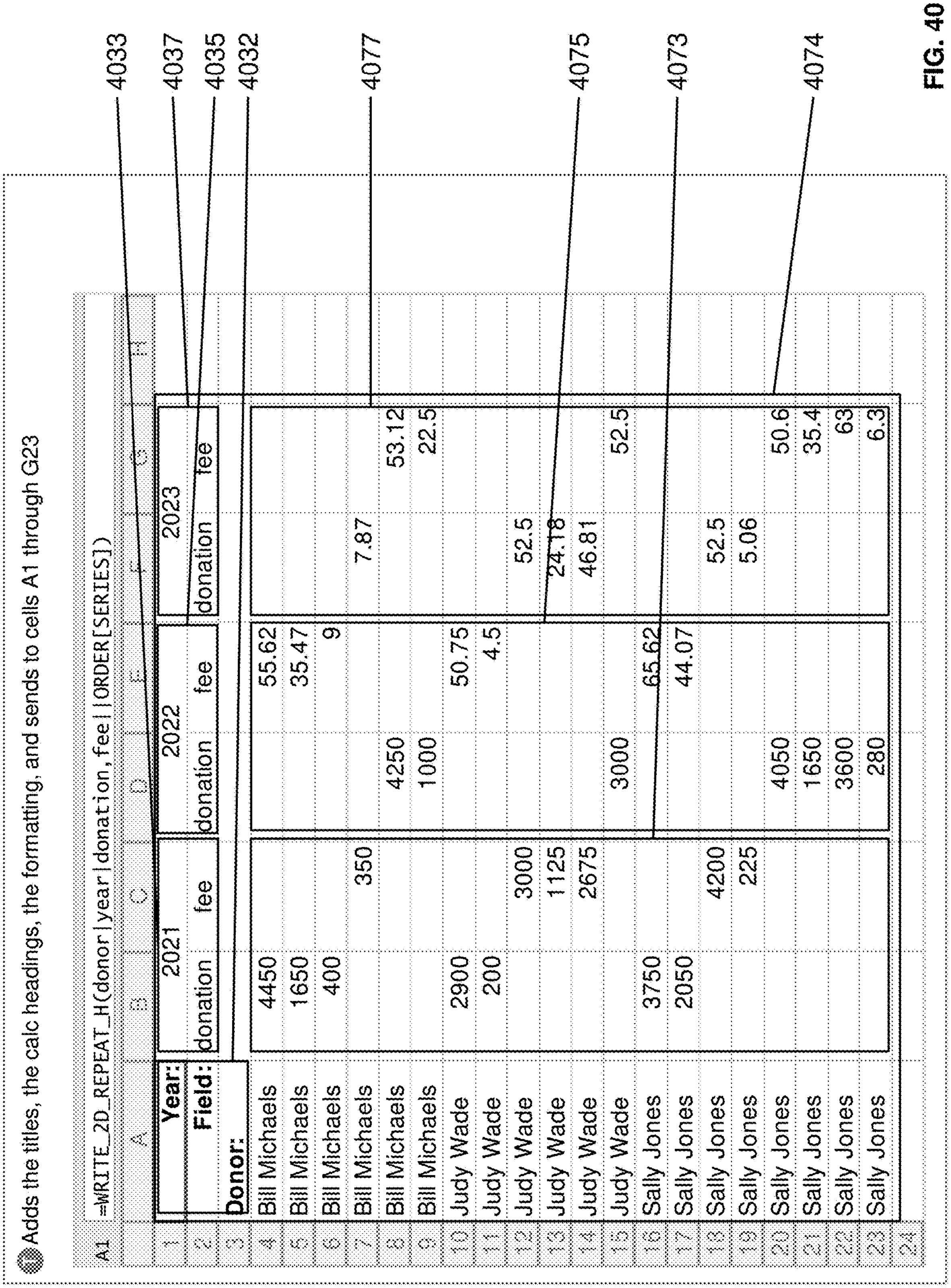

3015 and FIG. 31 3115. The automatically done steps by the formula 3234 summarized in 3268 are the same as previous examples in FIG. 30 and FIG. 31 for the first two steps (step 'L' and step 'M') exampled in FIG. 35. The difference starts in the next step, step 'R' 3945 in FIG. 39, where the repeated 2D_fields are ascending sorted vertically by the 'donor' values 3942 (3272 in FIG. 32) and horizontally ordered by ascending values of 'year' groupings with serial ordering of the 2D fields within each 'year' grouping as exampled in 3944, 3946, and 3948 (3273, 3274 and 3276 in FIG. 32). Then step 'T' in FIG. 40 adds the titles 4032, merges the 'year' values over the two-dimensional field headings 4033, 4035 and 4037 above the two-dimensional field values 4073, 4075 and 4077, and formats the results 4074 to be sent to cells 'A1' through 'G23' 3275 in FIG. 32.

No Calculation Function Family—Series and Collapse

Figure 33:
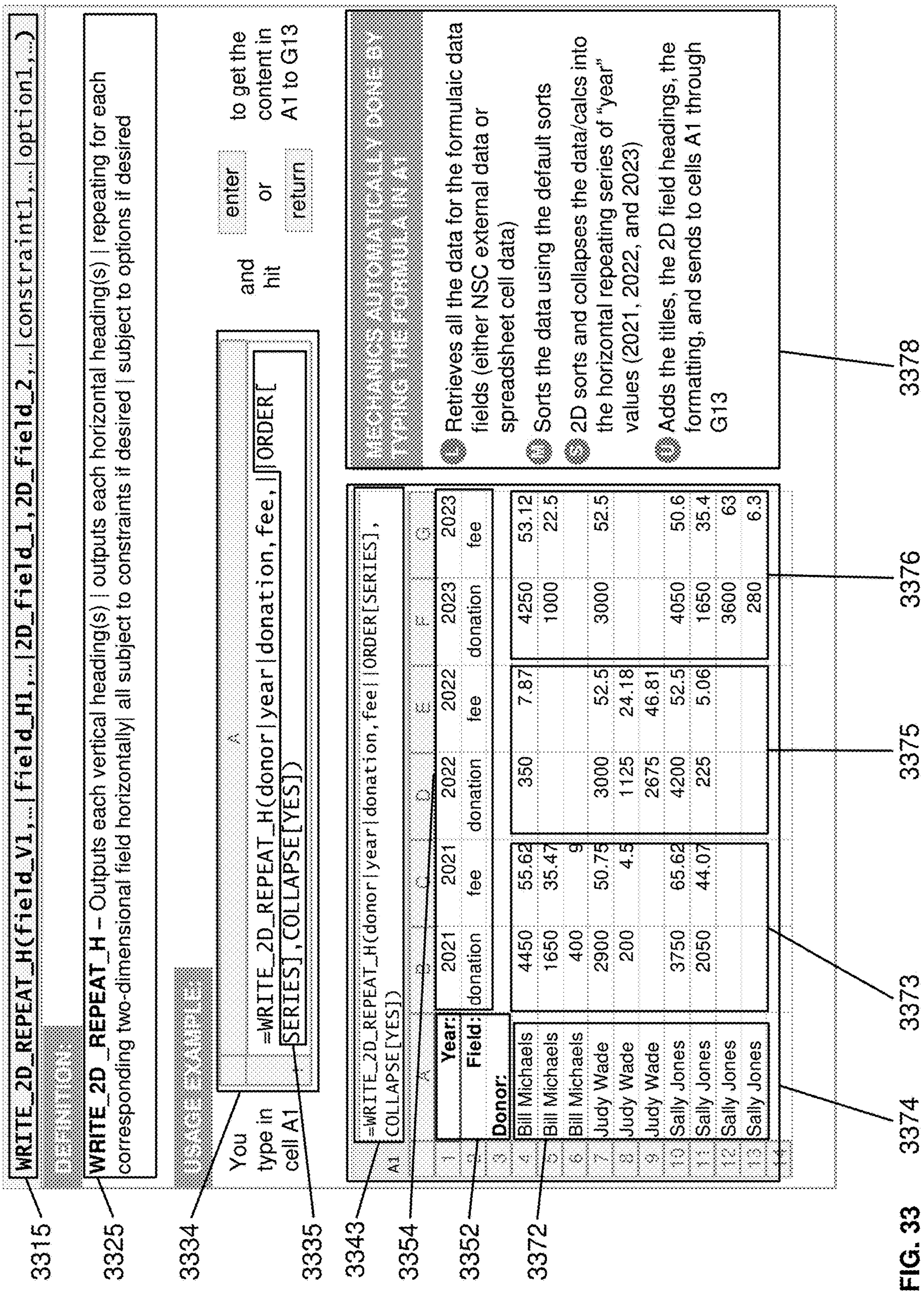
FIG. 33 examples the embodiment and formula in FIG. 32 with an optional argument added collapses the otherwise spread series results.

Our no calculation 2D calculation repeat function family supports collapsing series results as exampled in FIG. 33. FIG. 33 examples an embodiment with simple default headings and does the serial version of the collapsing previous exampled in FIG. 32. For the simplicity of the exampling purposes, it uses the same syntax/argument structure 3315 as that in FIG. 30, FIG. 31, and FIG. 32. The series ordering and collapsing is triggered by the same option arguments 'ORDER[SERIES], COLLAPSE[YES]' 3335 as previously exampled. However, different arguments could be used or dedicated functions (with different function names) that do one or both of the series or collapsing.

Figure 41:
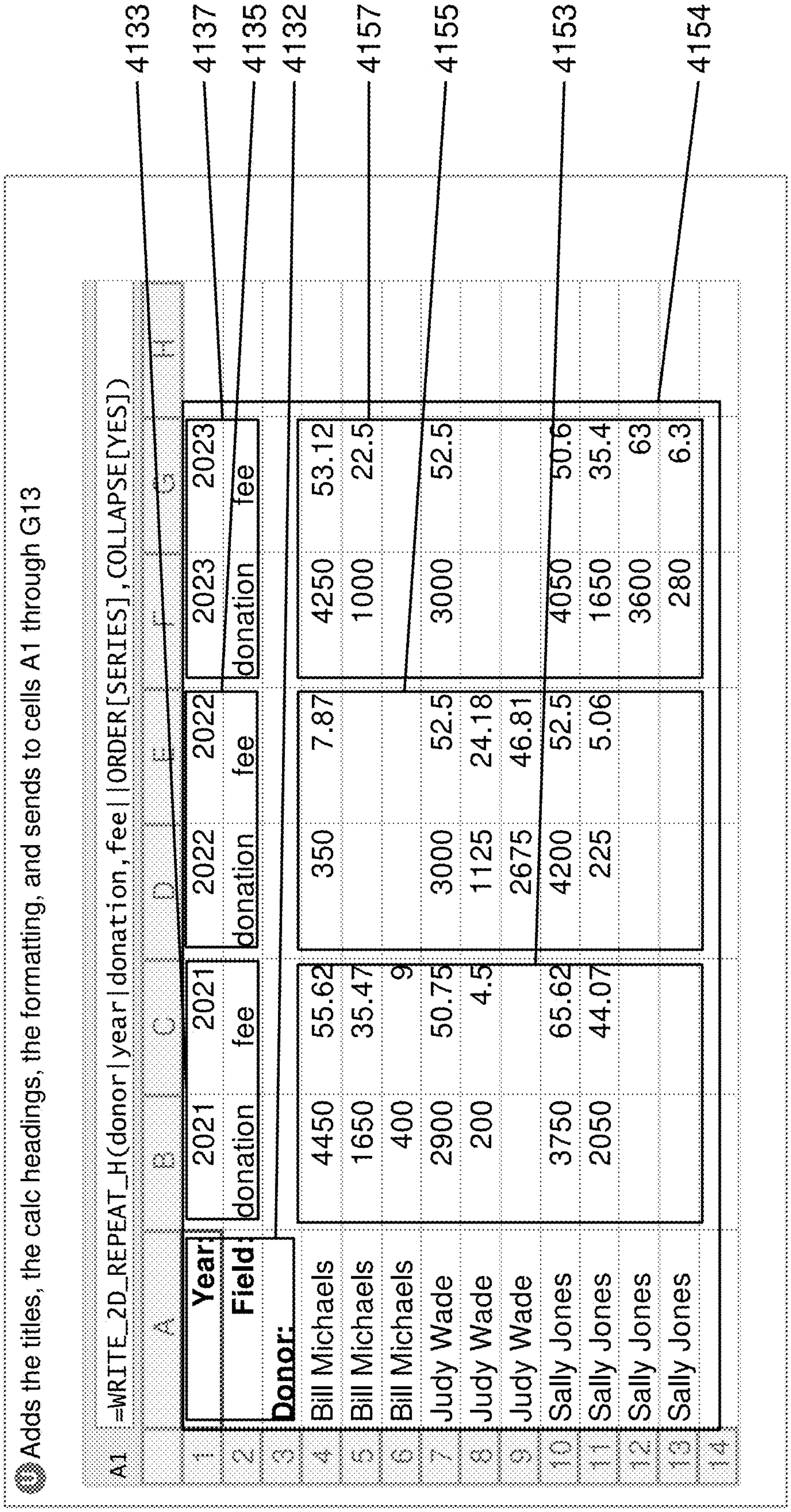

FIG. 33 examples horizontal headings serial output 3354 of the different 2D_fields (e.g., '2D_field_1' 'donation' and '2D_field_2' 'fee') by grouping of the horizontal heading 'year' values '2021', '2022', and '2023' with a 'donation' column and a 'fee' column for each year value. These are then paired with their complementary vertical headings 3372 and titles 3352. This is illustratively delivered automatically for the formula 3334 by the four steps summarized in 3378. The first two of those steps, step 'L' and step 'M' exampled in FIG. 35, have been previously explained. The third step, step 'S' 3985 exampled in FIG. 39, collapses the 2D_fields 3984, 3986, and 3988 in a manner similar to the one described in step 'O' 3685 in FIG. 36 except in serial order of the 2D_fields. The fourth step, step 'U' exampled in FIG. 41 then moves the 'year' values to the top row and adds the '2D_field_1' argument 'donation' field and '2D_field_2' argument 'fee' field name in the serial headings in 4133, 4135, and 4137 above the calculated results 4153, 4155, and 4157 (3373, 3375 and 3376 in FIG. 33), adds the titles 4132 (3352 in FIG. 33), and formats the results 4154 to be sent to the cells 'A1' through 'G13' 3374 in FIG. 33 with the formula 3343.

No Calculation Function Family—Alternative Syntaxes

Figure 34:
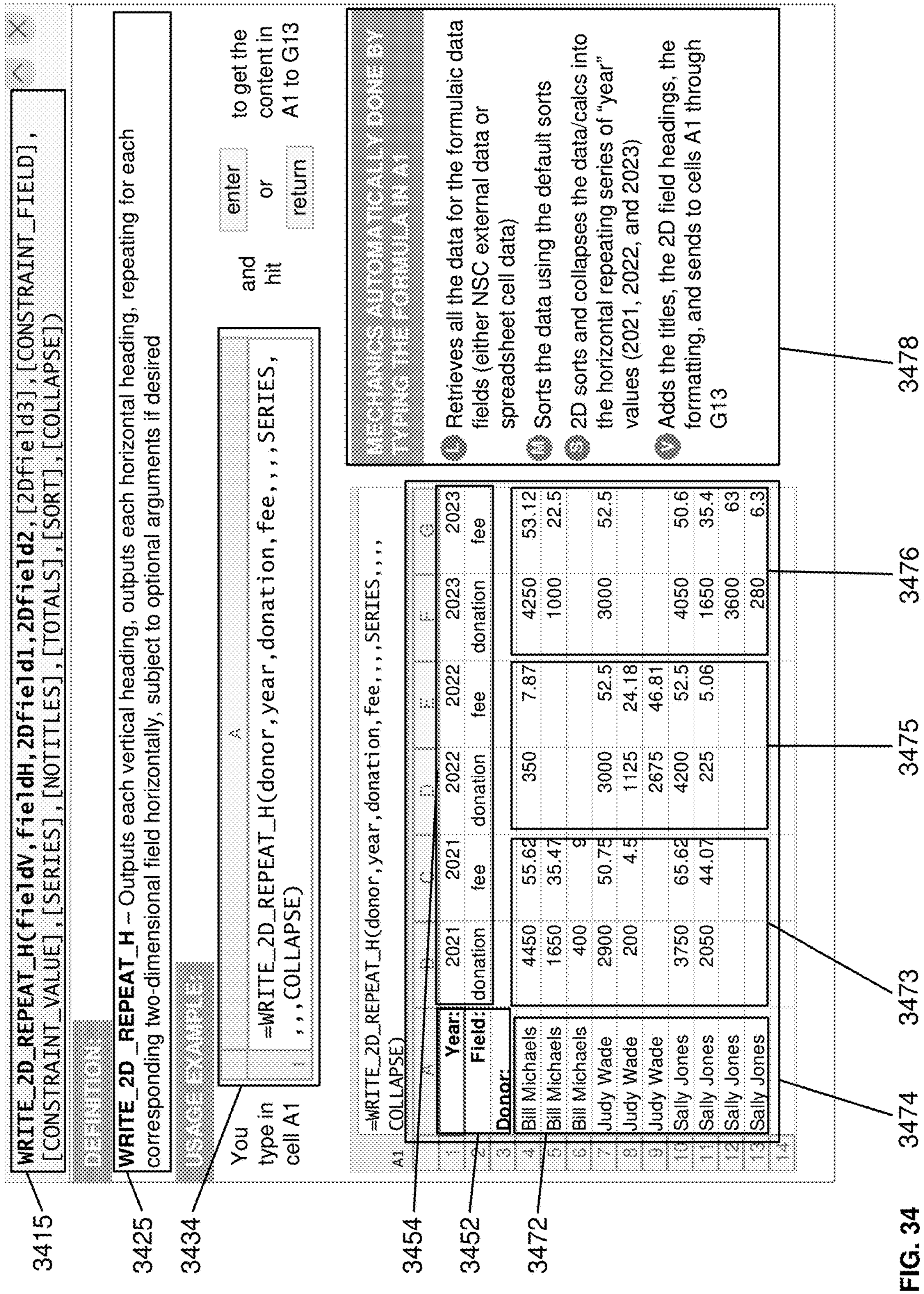
FIG. 34 examples an embodiment with one of many alternative syntaxes/argument structures which provides the same outcome as FIG. 33 but with no argument groups and only comma separated single specifier arguments (e.g., no arguments specifying more than one field, one function or a field/function combinations).

FIG. 34 examples an embodiment with one of many alternative syntaxes/argument structures which provides the same outcome as FIG. 33 but with no argument groups and only comma separated single specifier arguments (e.g., arguments specifying only one field, one function or one option, with no compound specifiers arguments). Our technology supports many different syntaxes to effectively create the same formula. FIG. 34 examples an alternative where there are no argument groups. This syntax/argument construct is just like existing spreadsheet functional formula syntax/argument structures. The syntax/argument structure 3415 has four required arguments, which are bolded, and eight optional arguments, which are not bolded and in square brackets in this embodiment as per below:

WRITE_2D_REPEAT_H(fieldV,fieldH,2Dfield1, 2Dfield2,[2Dfield3], [CONSTRAINT_FIEL D], [CONSTRAINT_VALUE],[SERIES],[NO-TITLES],[TOTALS],[SORT],[COLLAPSE])

Figure 42:
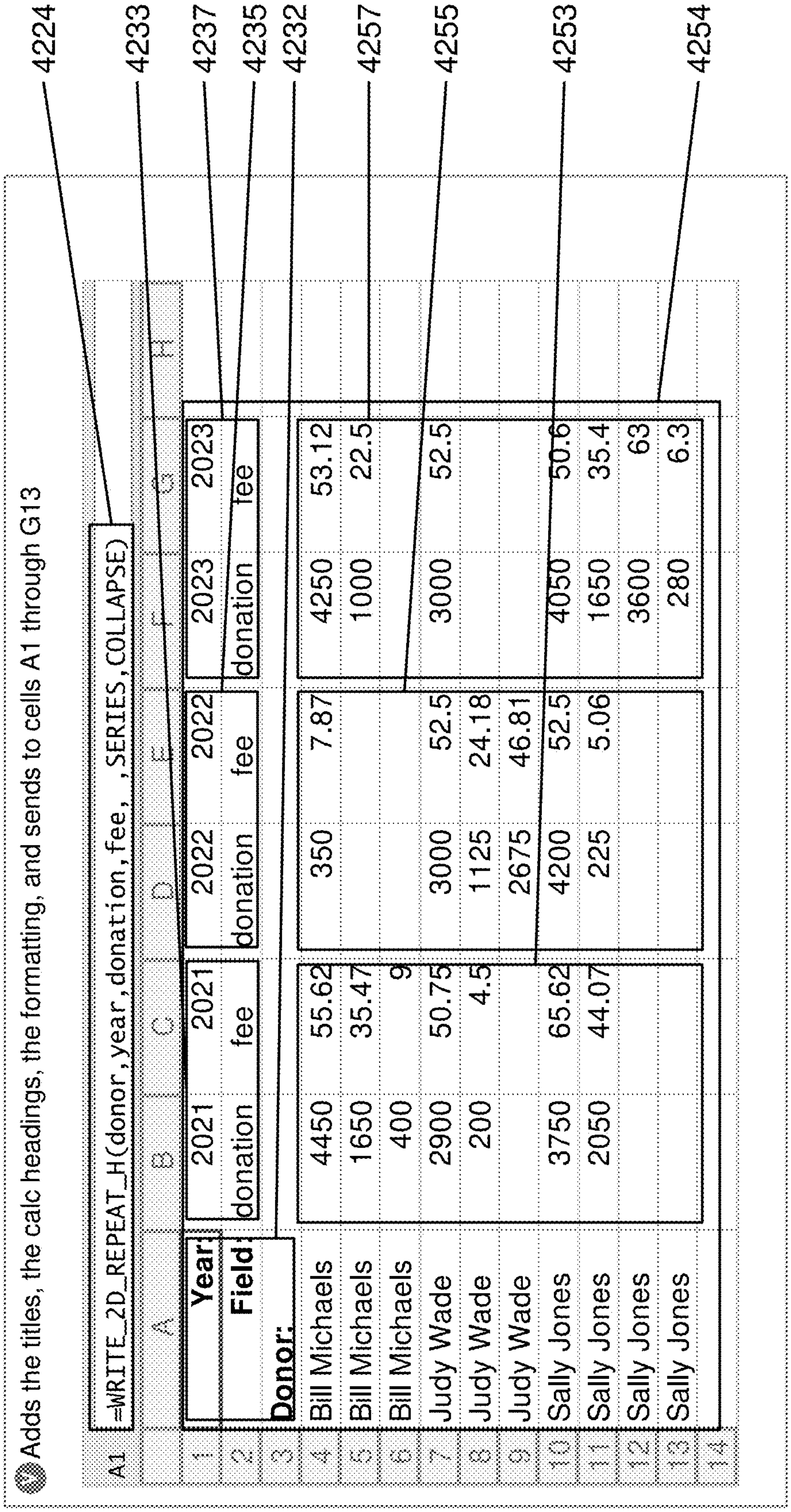

You can see from the description 3425 being somewhat similar to 3325 in FIG. 33 and the results being identical (3474 being identical to 3374 in FIG. 33) that while the arguments are different, the results can be the same. The big difference is the FIG. 34 syntax/argument structure is not as flexible as the syntax/argument structure in FIG. 33 to accommodate multiple nested heading fields, more two-dimensional repetitions, multiple constraints, and options being listed in different argument orders. Although a larger family of functions and some reordering of arguments (e.g., two-dimensional repetitions changed to the last arguments 2Dfield1, 2Dfield2,[2Dfield3], . . . ) can create more coverage of variants but at the trade-off of more complexity in the number of functions and the requirement to leave empty arguments. The formula 3434 in FIG. 34 delivers the same result 3474 as the result 3374 from the formula 3334 in FIG. 33. The four automatically executed steps 3478 by the formula 3434 have the same first three steps 'L', 'M' and 'S' as 3378 in FIG. 33. The fourth step, step 'V' only differs in the syntax of the returned formula 4224. That step, step 'V' exampled in FIG. 42 then moves the 'year' values to the top row and adds the '2D_field_1' argument 'donation' field name and '2D_field_2' argument 'fee' field name in the serial headings in 4233, 4235, and 4237 above the calculated results 4253, 4255, and 4257 (3473, 3475 and 3476 in FIG. 34), adds the titles 4232 (3452 in FIG. 34), and formats to the results 4254 sent to the cells 'A1' through 'G13' 3374 in FIG. 33 with the formula 3343.

Those steps deliver vertical and horizontal titles followed by a colon 3452, including 'Calc:' 3452. The horizontal headings 3454 are composed of three groups of the 'fieldH' values ('2021','2021' '2022','2022' 2023', and '2023') above series of '2Dfield1' and '2Dfield' values ('donation', 'fee'), all sitting above the three repetitions 3473, 3475, and 3476. This is then paired with the complementary row headings 3472. Those different optional arguments can be binary, for example like '[COLLAPSE]' which turns on the collapse and if an empty argument does not do the collapse (stays with the default of spread) or have many variants like '[SORT]' which can have many different argument values for different combinations of sorts. For example, an argument value of empty or '0' for all heading sorts ascending, '1' for descending sort by both vertical and horizontal headings, '2' for descending sorting by the vertical heading and ascending sorting by the horizontal heading, and '3' for ascending sorting by the vertical heading and descending sorting by the horizontal heading. Note, while there are different numbered options (e.g., empty, 0, 1, 2, and 3) that may do more than one thing in sort they are each specified by a single specifier. None of these syntax/argument structure arguments have compound specifiers.

Rather than re-exampling different syntax/argument structures and features for this no calculation repeat 2D family of our functions, we will move onto exampling our repeat families of functions doing nested headings and more than two repetitions with more options.

Nested Headings and More Repetitions—for all Families of Our Functions

Each of our families of two-dimensional repeat functions support nested headings and more than two repetitions (of range or array functions, non-range or non-array functions, and non-calculation functions). While we could example those for each of the families and many of the variants, for brevity's sake we will example them for one family and one syntax/argument structure.

Figure 43:
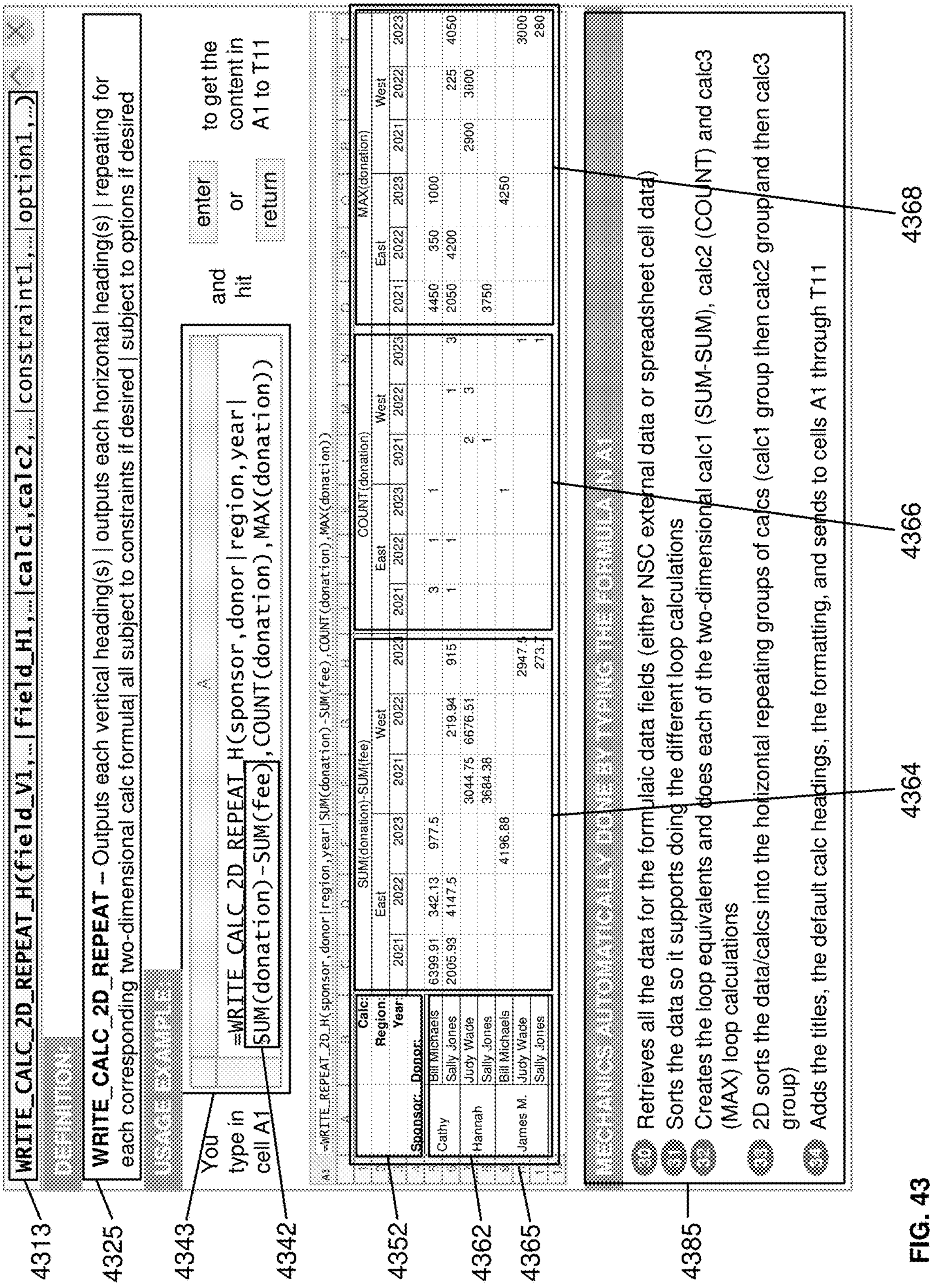
FIG. 43 examples nested vertical and horizontal headings for a three-repetition example of our range or array function two-dimensional repetition prebuilt function.

FIG. 43 examples nested vertical and horizontal headings for a three-repetition example of our range or array function two-dimensional repetition prebuilt function. It employs a syntax/argument structure 4313 which we have exampled numerous times before employing argument groups and compound specifier arguments. Although it could be accommodated by other alternative syntax/argument structures in our technology. The formula 4343 includes two nested vertical headings 'sponsor, donor', two nested horizontal headings 'region, year' and three range/array calcs 'SUM(donation)-SUM(fec), COUNT(donation), MAX(donation)'. It includes no complicated calcs, no constraints or no options but of course could have. This embodiment employs the same set of defaults as FIG. 4 applied to a more complicated formula. The result has three repetitions 4364, 4366, and 4368 each with nested horizontal headings, nested vertical headings 4362, and default titles 4352 generated by hitting enter or return to the formula 4343. The results are automatically generated by the five steps summarized in 4385. The data retrieval is done in the first step, step '30' 4543 in FIG. 45, and could source the data from either in cell (e.g., FIG. 2A or FIG. 2B) or non-spreadsheet cell (e.g., FIG. 1A or FIG. 1B) data sets. The second step, step '31' 4547 in FIG. 45, sorts the data for the two-dimensional nested loops and the third step, step '32' in FIG. 46, does the three sets (calc1, calc2, and calc3) of loop calculations. The fourth step, step '33' in FIG. 47A, two-dimensionally sorts the vertical and horizontal nested fields with ascending values (the defaults) and their related three sets of (loop) calculations replicating the horizontal headings for the 'calc2' and 'calc3' repetitions. The fifth step, step '34' in FIG. 47B, then cell formats the results and sends them and the formula to cells 'A1' to 'T11' 4365 in FIG. 43 giving the charity worker three sets of similarly sorted organized sets of nested analyses for easy review.

Range or Array Function Family—Multiple Range or Array Function Calc Arguments

FIG. 43 also examples our range or array function two-dimensional repetition prebuilt function supporting calculations employing more than one range or array function. In this example the 'calc1' argument 'SUM{donation)-SUM (fee)' 4342 (executed by the examples in 4657 in FIG. 46) in the formula 4343 employing two different range functions connected by an algebraic operator. Our technology supports combinations of different range or array functions within a single calc connected by any of the algebraic operators. This embodiment supports inputting them as a single compound argument although other embodiments of our technology support inputting them as single specifier arguments. The advantage of the compound arguments is that they support many different calculations with different numbers of fields, functions, and algebraic operators in a single argument.

Totals and Subtotals—for all Families of Our Functions

Each of our families of two-dimensional repeat functions support totals and subtotals of some type (e.g., SUMs, MAXs, MINs, or COUNTs). While we could example those for each of the families and many of the variants, for brevity's sake we will example them for one family and one syntax/argument structure.

Figure 44:
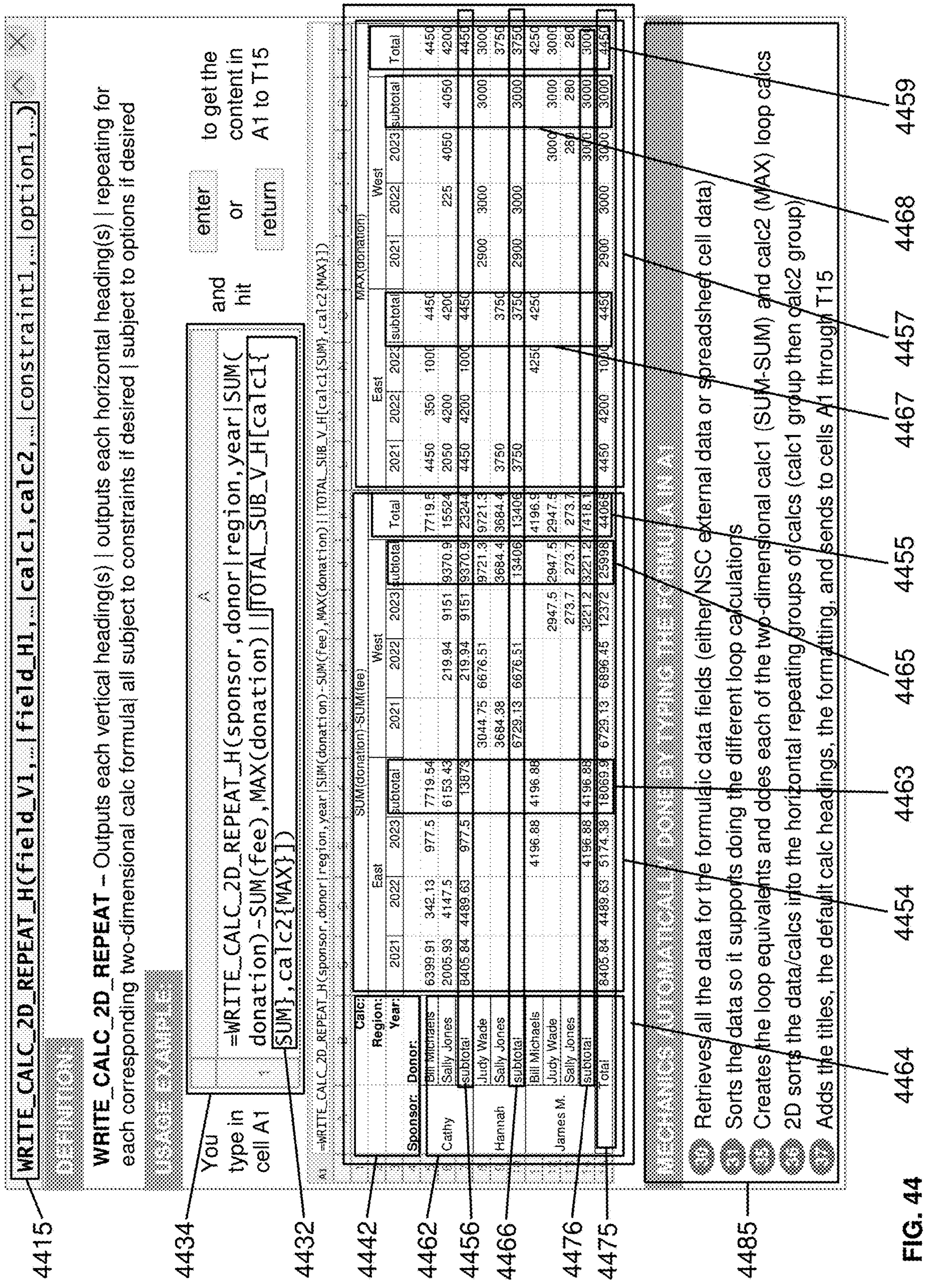
FIG. 44 examples one of our range or array function two-dimensional repetition prebuilt functions employing totals and subtotals.

FIG. 44 examples one of our range or array function two-dimensional repetition prebuilt functions employing totals and subtotals. For simplicity of exampling, it employs a syntax/argument structure 4415 which we have exampled numerous times before with a formula 4434 employing an optional argument 4332 which specifies the total and subtotal types and application. In this example generating both vertical and horizontal headings subtotals (4463, 4465, 4467, 4468, 4456, 4466, and 4476) and overall totals (4475, 4455, and 4459) employing different types of totaling/subtotaling (i.e., SUM and MAX) for the two repetitions (4454 and 4457) and the vertical headings (4462). The formula also adds the titles 4442. All of this is automatically done by the five steps ('30', '31', '35', '36', and '37') summarized in 4485 and exampled in FIG. 45, FIG. 48, FIG. 49A, and FIG. 49B.

The data retrieval is done in the first step, step '30' 4543 in FIG. 45, and could source the data from either in cell (e.g., FIG. 2A or FIG. 2B) or non-spreadsheet cell (e.g., FIG. 1A or FIG. 1B) data sets. The second step, step '31' 4547 in FIG. 45, sorts the data for the two-dimensional nested loops and the third step, step '35' in FIG. 48, does the two sets (calc1 and calc2) of loop calculations. The fourth step, step '36' in FIG. 49A, two-dimensionally sorts the vertical and horizontal nested fields with ascending values (the defaults) and their related two sets of (loop) calculations replicating the horizontal headings for the 'calc1' and 'calc2' repetitions. This step also adds in the totals and subtotals doing the calculations. Our technology does those totals and subtotals employing the functions specified in the argument 'TOTAL_SUB_V_H[calc 1 {SUM}, calc2{MAX} ] 4432 in FIG. 44. That compound specifier argument specifies summation totals for the calc 1 total and subtotal values and max values for the calc2 total and subtotal values as executed in in FIG. 49A. The fifth step, step '37' in FIG. 49B, then cell formats the results and sends them and the formula to cells 'A1' to 'T15' 4464 in FIG. 44 giving the charity worker two sets of similarly sorted organized sets of nested analyses with totals and subtotals for easy review.

Our technology supports adding all types of totals and subtotals in different mix and match combinations or one offs (e.g., just totals for the vertical axis). They can even be done for only one of the repetitions and of course can be done for more than two repetitions. However, rather than exampling more of this huge number of situations we will move on to discussing other features supported in our families of repetition functions.

Other Features—for all Families of Our Functions

There are a number of other features, e.g., FILL, LIMIT_V, LIMIT_H, and HIDE, exampled in our U.S. application Ser. No. 17/903,934 titled "Method and System for Improved 2d Ordering of Output from Spreadsheet Analytical Functions," filed 6 Sep. 2022 that are applicable to our new two-dimensional repeat families of functions. However, for brevity's sake we will reference those previous examples and not re-example the features. These and all the examples herein are supported by today's computer technologies as described next.

Computer System

FIG. 60 is a block diagram of an example computer system, according to one implementation. Computer system 6010 typically includes at least one processor 6014 which communicates with a number of peripheral devices via bus subsystem 6012. These peripheral devices may include a storage subsystem 6024 including, for example, memory devices and a file storage subsystem, user interface input devices 6038, user interface output devices 6020, and a network interface subsystem 6016. The input and output devices allow user interaction with computer system 6010. Network interface subsystem 6016 provides an interface to outside networks, including an interface to communication network 6085, and is coupled via communication network to corresponding interface devices in other computer systems or in the cloud and usable for cloud applications.

User interface input devices 6038 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 6010 or onto communication network.

User interface output devices 6020 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 6010 to the user or to another machine or computer system.

Storage subsystem 6024 stores programming and data constructs that provide the functionality of some or all of the modules and methods described herein. These software modules are generally executed by processor 6014 alone or in combination with other processors.

Memory 6026 used in the storage subsystem can include a number of memories including a main random-access memory (RAM) 6030 for storage of instructions and data during program execution and a read only memory (ROM) 6032 in which fixed instructions are stored. A file storage subsystem 6028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 6028 in the storage subsystem 6024, or in other machines accessible by the processor.

Bus subsystem 6012 provides a mechanism for letting the various components and subsystems of computer system 6010 communicate with each other as intended. Although bus subsystem 6012 is shown schematically as a single bus, alternative implementations of the bus subsystem may use multiple busses.

Computer system 6010 can be of varying types including a workstation, server, computing cluster, blade server, server farm, or any other data processing system or computing device. Due to the ever-changing nature of computers and networks, the description of computer system 6010 depicted in FIG. 60 is intended only as one example. Many other configurations of computer system 6010 are possible having more or fewer components than the computer system depicted in FIG. 60.

Some Particular Implementations—Two-Dimensional Looped Calculation Tables

Some particular implementations and features are described in the following discussion. For brevity's sake we will layout separate implementations for the three different families of our repeat functions and then layout one set of dependent embodiment variations of one or more of our repeat function families. Where a substantial number of them are applicable to all three of the families. These implementations will be laid out in the clauses and then assembled into sets of singular family claims starting with a first set.

Some Particular Implementations—Range or Array Function Family

One implementation of our technology provides the user with a table generator prebuilt function that applies a user specified formula to user specified data fields to generate a table with two-dimensional headings with related multiple range or array calculation results as exampled in FIG. 3 through FIG. 18, and FIG. 43 through FIG. 51. These table generator prebuilt function formula implementations have a structured list of arguments or argument groups including required and optional arguments, although variants with just required arguments are supported in our technology. In the implementations with just arguments (e.g., FIG. 6), those arguments are separated by a single delimiter between arguments as is done with arguments in the existing spreadsheet prebuilt functions. In the implementations with argument groups (e.g., FIG. 3, FIG. 4, and FIG. 5) there are at least two delimiters, one determining where one argument group stops and another argument group begins. A second different delimiter separating arguments within an argument group. In the argument group implementations, the argument groups are predefined, and the types of arguments within them are predefined by our application although the number of arguments may not be defined when the argument group is a repeat argument group. When the argument group is a named argument group or an argument group with a fixed set and order of arguments then the arguments and their numbers are predefined in the syntax/argument structure but may differ in formula use as some or all of the arguments may be optional from a usage perspective.

These implementations support alternative argument and argument group syntaxes. Although all of the different syntaxes must have a required set of arguments that specify at least one vertical heading data set field or range, one horizontal heading field or range and at least two range or array calculation formulas each composed of at least one range or array function and at least one data set field or range. Each of those calculations can be specified in a single compound specifier argument or in multiple single specifier arguments. The calculations are done for each two-dimensional loop equivalent of unique vertical heading field and horizontal heading field values. The range or array calculated results are then presented in repeating groups of calculations sharing either the vertical or horizontal headings and then replicating the other of the complementary vertical or horizontal headings in the two-dimensional table output. That two-dimensional table output is then populated into multiple spreadsheet cells.

This implementations supports the variants of what we have previously named the "range or array function family" which two-dimensionally repeat. We will use that short name in quotes, as well as the short names for the other two families of our repeat functions, as we discuss the implementation variants applicable to each family. Because so many of the variants work across two or all three of our repeat function families for brevity's sake we will describe those implementation variants together. Before proceeding with the implementations shared across the other families, we will describe the other family implementations, starting with the non-range or non-array function family of our two-dimensional repeat functions.

Some Particular Implementations—Non Range or Non-Array Function Family

One implementation of our technology provides the user with a table generator prebuilt function that applies a user specified formula to user specified data fields to generate a table with two-dimensional headings with related multiple algebraic formula calculation results as exampled in FIG. 52 through FIG. 55, FIG. 58, FIG. 59, and FIG. 19 through FIG. 29. These table generator prebuilt function formula implementations have a structured list of arguments or argument groups including required and optional arguments, although variants with just required arguments are supported in our technology. In the implementations with just arguments (e.g., FIG. 58), those arguments are separated by a single delimiter between arguments as is done with arguments in the existing spreadsheet prebuilt functions. In the implementations with argument groups (e.g., FIG. 52, FIG. 19, and FIG. 20) there are at least two delimiters, one determining where one argument group stops and another argument group begins. A second different delimiter separating arguments within an argument group. In the argument group implementations, the argument groups are predefined, and the types of arguments within them are predefined by our application although the number of arguments may not be defined when the argument group is a repeat argument group. When the argument group is a named argument group or an argument group with a fixed set and order of arguments then the arguments and their numbers are predefined in the syntax/argument structure but may differ in formula use as some or all may be optional from a usage perspective.

These implementations support alternative argument and argument group syntaxes. Although all of the different syntaxes must have a required set of arguments that specify at least one vertical heading data set field or range, one horizontal heading field or range and at least two algebraic calculation formulas each composed of at least one algebraic operator (e.g., +. −. * , /, or /\) and at least two data set fields or ranges. Each of those calculations can be specified in a single compound specifier argument or in multiple single specifier arguments. The calculations are done for each combination of vertical heading field and horizontal heading field values (i.e., each row of data). The two or more algebraic formula calculated results are then presented in repeating groups of calculations sharing either the vertical or horizontal headings and then replicating the other of the complementary vertical or horizontal headings in the two-dimensional table output.

These implementations support the variants of what we have previously named the “non range or non-array function family” which two-dimensionally repeat. We will use that short name in quotes, as well as the short names for the other two families of our repeat functions, as we discuss the implementation variants applicable to each family. As mentioned before, we will discuss the third of our repeat function family implementations before discussing all the implementation variants applicable to one or more of the families.

Some Particular Implementations—No Calculation Function Family

One implementation of our technology provides the user with a table generator prebuilt function that applies a user specified formula to user specified data fields to generate a table with two-dimensional headings with related multiple two-dimensional field results as exampled in FIG. 56, FIG. 57, and FIG. 30 through FIG. 42. These table generator prebuilt function formula implementations have a structured list of arguments or argument groups including required and optional arguments, although variants with just required arguments are supported in our technology. In the implementations with just arguments (e.g., FIG. 34), those arguments are separated by a single delimiter between arguments as is done with arguments in the existing spreadsheet prebuilt functions. In the implementations with argument groups (e.g., FIG. 56, FIG. 30, and FIG. 31) there are at least two delimiters, one determining where one argument group stops and another argument group begins. A second different delimiter separating arguments within an argument group. In the argument group implementations, the argument groups are predefined, and the types of arguments within them are predefined by our application although the number of arguments may not be defined when the argument group is a repeat argument group. When the argument group is a named argument group or an argument group with a fixed set and order of arguments then the arguments and their numbers are predefined in the syntax/argument structure but may differ in formula use as some or all may be optional from a usage perspective.

These implementations support alternative argument and argument group syntaxes. Although all of the different syntaxes must have a required set of arguments that specify at least one vertical heading data set field or range, one horizontal heading field or range, and at least two two-dimensional fields or ranges used to populate the adjoining repeat tables of values. The two-dimensional field values are presented for each combination of vertical heading field and horizontal heading field values (i.e., each row of data). The two-dimensional field results are then presented in repeating groups of two-dimensional fields sharing either the vertical or horizontal headings and then replicating the other of the complementary vertical or horizontal headings in the two-dimensional table output.

These implementations support the variants of what we have previously named the “no calculation function family” which two-dimensionally repeat. We will use that short name in quotes, as well as the short names for the other two families of our repeat functions, as we discuss the implementation variants applicable to each family next.

Family Variant Implementations—Syntax/Argument Structure

Each of our families of repeat functions supports many different syntax/argument variant implementations. Those variants can have different numbers of arguments, arguments in argument groups (multiple argument delimiters, e.g., ‘|’ separating different argument group arguments and ‘,’ separating different arguments within an argument group), no argument groups (single argument delimiter, e.g., ‘,’), arguments that are single specifiers (specifying single fields, single functions, a single number/text/date, or a single input in an option argument), or compound specifier arguments (combining functions, fields, algebraic operators, numbers/text/dates, or multiple inputs within an option argument). While elements of most of the implementation variants are applicable to more than one family however there are some different syntax/argument structure implementation variants specific to only one family such as those driven by the impact of functions, algebraic operators, or differences in fields employed.

Syntax/Argument Structure—Range or Array Function Family

Figure 14:
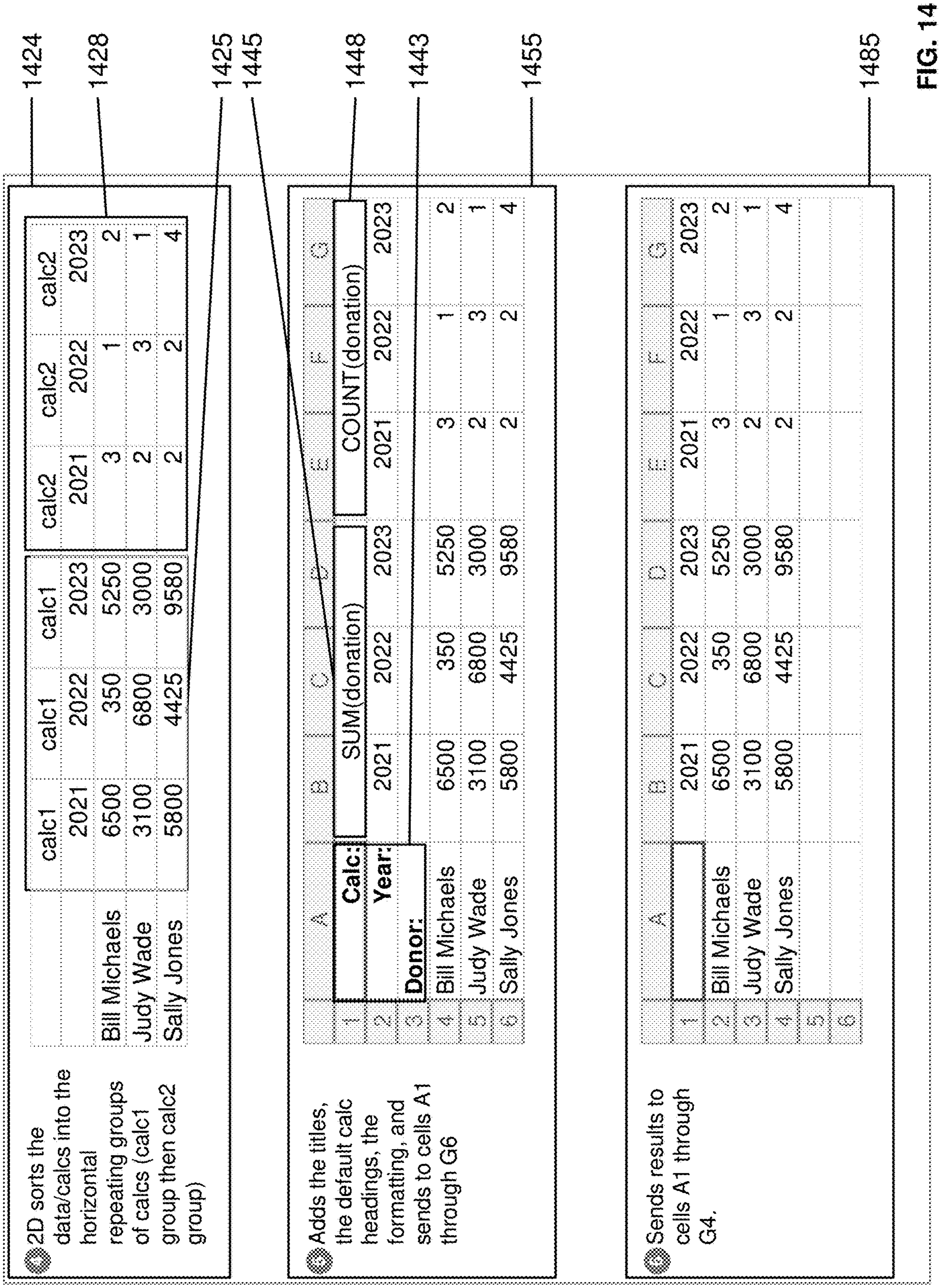

One of those more single-family variants for the “range or array function family” is exampled in FIG. 6, FIG. 13, and FIG. 14 where each calc is specified in separate arguments for the calc range or array function and the field that it employs to do the calculation and there is a single delimiter (e.g., comma) separating the arguments. This is in contrast to the implementation in FIG. 3, FIG. 13, and FIG. 14 where each calc is specified in a single argument that combines the one or more range or array functions and one or more fields employed in each calculation argument (note, if there is more than one range or array function employed in the calc then one or more algebraic operators are also employed) and there are two delimiters, one separating arguments within the same argument group (e.g., commas) and one separating arguments in different argument groups (e.g., vertical bars). Further implementations of the separate arguments for each part of the calcs are supported for repeat functions with three or more calcs (e.g., FIG. 43) as well as for calcs with more complicated calculations such as the first calc 'SUM(donation)-SUM(fee)' 4342 in FIG. 43 which would require a separate argument syntax like 'function1, field1, Operator1, function1*a*, field1*a*' as exampled below as an alternative to the syntax/argument structure 4313 in FIG. 43:

WRITE_CALC_2D_REPEAT_H(fieldv,fieldh,function1,field1,Operator1,function1a,field1a,function2,field2,function3,field3,constraint, order, option1,option2,option3)

Note, where the required arguments are bolded, and the optional arguments are not bolded (or using the convention of some spreadsheets the not bolded (optional) arguments could be in square brackets (e.g., '[function3]'). Using either the bolded or square brackets syntax the formula 4342 in FIG. 43 instead would be:

=WRITE_CALC_2D_REPEAT_H(sponsor,donor|region,year,SUM,donation, SUM,fee,COUNT, donation, MAX,donation)

This examples an implementation where all of arguments are single specifiers, i.e., arguments with only one field, arguments with one algebraic operator, arguments with only one option specification (e.g., one custom titles not two custom titles), and no single argument containing a combination of a field or fields with one or more algebraic operators. There is only one argument delimiter (e.g., commas) as the syntax/argument structure has no argument groups.

Syntax/Argument Structure—Non-Range or Non-Array Function Family

Another of those single-family syntax/argument implementation variants is exampled in FIG. 58, FIG. 53, FIG. 54, and FIG. 59, this time for the "non range or non-array function family". It employs only a single delimiter, e.g., commas, not having any argument groups separated by a second type of delimiter, e.g., vertical bars. The fields and algebraic operators are specified as separate arguments, not a compound specifier argument specifying both fields and at least one algebraic operator. The example is but one of many possible syntax/argument structures fulfilling the specification needs of our "non range or non-array function family". There are many different ways to create single delimiter and single specifier syntax/argument structure non-range or non-array functions in our technology. Those ways are in contrast to the examples in FIG. 52 through FIG. 55 and FIG. 19 through FIG. 29 which employ a structured syntax/argument structure composed of required and optional argument groups containing required or optional arguments and compound specifier arguments.

Syntax/Argument Structure—No Calculation Function Family

Another of those single-family syntax/argument implementation variants is exampled in FIG. 34, FIG. 35, FIG. 39, and FIG. 42, this time for the "no calculation function family". It employs only a single delimiter, e.g., commas, not having any argument groups separated by a second type of delimiter, e.g., vertical bars. It is consistent with the syntax/argument structure used by the other spreadsheets. However, our technology also supports implementations with a different syntax/argument structure including two delimiters, one separating argument groups (e.g., vertical bars) and the other separating arguments within argument groups as exampled in FIG. 56, FIG. 30, FIG. 31, FIG. 32, and FIG. 33. This has the advantage of a prebuilt function specified set of required or optional argument groups containing specified required or optional arguments supporting a broader range of formulas from a single syntax/argument structure while still retaining the specified structure for user understanding and use.

Family Variant Implementations—Horizontal and Vertical Repetitions

All of our families of repeat functions support implementations displaying the repetitions horizontally (e.g., FIG. 3, FIG. 52, and FIG. 56) and vertically (e.g., FIG. 5). In the horizontal replication implementations, the replicated calcs or two-dimensional field values share the same vertical headings and replicate the horizontal headings as exampled in FIG. 3. In the vertical replication implementations, the replicated calcs or two-dimensional fields share the same horizontal headings and replicate the vertical headings as exampled in FIG. 5.

Family Variant Implementations—Group and Series Repetitions

All of our families of repeat functions support implementations ordering the repetitions in groups (e.g., FIG. 3, FIG. 52, and FIG. 56) and series (e.g., FIG. 11, FIG. 21, and FIG. 32). Our grouped implementations orders the calcs or two-dimensional field values together as a group per calc (e.g., a group of calc1's then a group of calc2's) or two-dimensional field values (e.g., a group of '2D_field_1' values and then a group of '2D_field_1' values) as exampled without calc or two-dimensional field value headings in FIG. 3, as exampled with calc or two-dimensional field value headings in FIG. 52, and FIG. 56, and as exampled with group merged calc or two-dimensional field headings in FIG. 4, FIG. 19, and FIG. 30. Our series implementations orders the calcs or two-dimensional field values in series by respective vertical (for vertical replications) or horizontal (for horizontal replications) field value headings as exampled in FIG. 11, FIG. 21, and FIG. 32 where the vertical or horizontal field value headings are merged (FIG. 21 and FIG. 32) or un-merged (FIG. 11).

Family Variant Implementations—Sorting

All of our families of repeat functions implementations support many different types of sorting of the repeat calc or two-dimensional field values and their related heading values. The sorting changes the order of the horizontal and vertical field headings and their respective calc or two-dimensional field values. Doing this for both our group and series repetitions. One of those sorting implementations is by ascending vertical and horizontal field values as exampled in FIG. 3, FIG. 52, and FIG. 56. Another is by descending vertical and horizontal field values as exampled in FIG. 9. And of course, implementations support mix and match combinations of ascending and descending sorts across the horizontal and vertical axes as well as mix and match combinations within nested headings within an axis (e.g., horizontal). Another set of those implementations sorts by calc, or two-dimensional field row or column values as exampled in FIG. 10. FIG. 10 examples vertical sorting by the heading '2022' 'calc1' values 1073 but it would equally work for horizontal sorting by a row heading value and a calc to sort all of the repetitions. It would also work for multiple sorts on one dimension where the second sort orders any ties on the first sort results. And as stated previously it works for the all the repeat function families although for brevity's sake only exampled for one. Also, any of these sorts could be set as the default sort order (e.g., FIG. 3, FIG. 43, FIG. 52, and FIG. 56) or be a user specified sort order (e.g., FIG. 9 and FIG. 10).

Our repeat families of functions also support the sorting of the values within the group or series repetitions employing the total or subtotal range function evaluations as exampled in FIG. 37 through FIG. 43 and FIG. 66 through FIG. 69 in our U.S. application Ser. No. 17/903,934 titled "Method and System for Improved 2d Ordering of Output from Spreadsheet Analytical Functions," filed 6 Sep. 2022.

Family Variant Implementations-Nesting

All of our families of repeat functions support nesting of the vertical and horizontal field headings implementations as exampled in FIG. 43 through FIG. 49B. Those examples have two vertical heading fields and two horizontal heading fields but each of the different headings could have more or less nested fields.

Family Variant Implementations—Totals and/or Subtotals

All of our families of repeat functions support the generation of totals and/or subtotals as shown in the two nested heading examples in FIG. 44, FIG. 45, FIG. 48, FIG. 49A, and FIG. 49B. All of our families of repeat functions support the generation of totals and/or subtotals over non-nested heading evaluations as exampled in FIG. 85 through FIG. 90 in our U.S. application Ser. No. 17/903,934 titled "Method and System for Improved 2d Ordering of Output from Spreadsheet Analytical Functions," filed 6 Sep. 2022. Where this non-nesting subtotals works for any defined increments, e.g., hours, days, months, years, numeric increments (e.g., by 10s or by 100s), or by letter of the alphabet.

Family Variant Implementations—More Complexity

All of our families of repeat functions support more calculation or two-dimensional field arguments as exampled in FIG. 43 and FIG. 45 through FIG. 47B where three repeat calcs are populated in our range or array repeat prebuilt table generator function. The three calcs could have easily been three non-range or non-array algebraic calcs or three two-dimensional fields. And our implementations support more than three repeat calcs or two-dimensional fields.

Our implementations support more complicated calculations involving more range or array functions, fields and algebraic operators in our range or array repeat functions as exampled in the 'calc1' 'SUM(donation)-SUM(fee)' in FIG. 43 through FIG. 49B. Recognizing that our range or array function family technology supports repeat calcs with many more range or array functions, fields, and algebraic operators. Implementations also support more complicated repeat calculations in our non-range or non-array repeat functions as exampled by the 'calc2' '(donation-fcc)/donation' in formula 1934 in FIG. 19 having more than two fields and more than one algebraic operator. Recognizing that our non-range or non-array function family technology supports repeat calcs with many more fields, and algebraic operators as well as the inclusion of non-range or non-array functions (e.g., SQRT, SIN, LOG, and COS).

Family Variant Implementations—Titles

All of our families of repeat functions support the automatic default or user specified addition of titles for any or all of the vertical heading values, horizontal heading values, and the calc or two-dimensional field heading values as exampled in FIG. 4 through FIG. 7, FIG. 19 through FIG. 22, and FIG. 30 through FIG. 34. Those titles can be field names or variants of field names such as the field name initial capitalized and followed by a colon (e.g., "Year:' or "Donor' 462 in FIG. 4). The titles can be user specified or a fully application created values such as 'Calc:' (452 in FIG. 4) for the calc title. They can also be user specified custom headings like those exampled in FIG. 21 ('$s net' and '% net').

All of our families of repeat functions support the automatic default or user specified creation of calc headings as exampled in FIG. 4 through FIG. 7, and FIG. 52, FIG. 19 through FIG. 22, or two-dimensional field headings as exampled in FIG. 56, FIG. 30 through FIG. 34. Those headings can be one per row or column of calcs or two-dimensional fields or merged for like heading values. Those headings are on the axis for which the calcs or two-dimensional fields are repeated. Those headings can be the some automatically generated version of the calc formula, some automatically version of the two-dimensional field name, some other automatically generated values, or user specified values. Those calc or two-dimensional field headings can be positioned differently relative to the related vertical or horizontal field headings as exampled by FIG. 33 and FIG. 34 where the two-dimensional field headings are below the horizontal heading field values and FIG. 30 and FIG. 31 where the two-dimensional field headings are above the horizontal heading field values Family Variant Implementations—Spread/Collapse Our non-array or non-range function and our non-calculation function families support spreading and collapsing implementations as exampled in FIG. 52, FIG. 19, FIG. 21, FIG. 56, and FIG. 30 for spreading and as exampled in FIG. 20, FIG. 22, FIG. 31, FIG. 33, and FIG. 34 for collapsing. The spreading is done on one of the two axes (horizontal or vertical) and is typically (but not always) done on the axis which is not repeated. The spreading results in one row or column per calculation or one row or column per two-dimensional field value per row of data as exampled by the twenty rows of calculations 5274 and 5276 in FIG. 52 matching the twenty rows of data in the source data in FIG. 1A through FIG. 2B and the twenty rows of two-dimensional field values 5674 and 5676 in FIG. 56 matching the twenty rows of data in the source data in FIG. 1A through FIG. 2B. The collapsing fills the empty spaces of what otherwise would be the spread axis to arrive at the minimum number of spread axis heading values to display all the calcs or all the two-dimensional field values. For example, turning the spread axis twenty rows of headings and calc values 2445 in FIG. 24 into the collapsed ten rows of headings and calc values 2485 in FIG. 24. Similarly exampled in turning the spread axis twenty rows of headings and two-dimensional field values 3645 in FIG. 36 into the collapsed ten rows of headings and two-dimensional field values 3685 in FIG. 36. Implementations of our technology also ensure the spread row or column symmetry of the collapsed values across the different repetitions so that related values (values from the same row of source data) retain those spatial comparison relationships as exampled in FIG. 24 for our non-range or non-array function family and exampled in FIG. 36 for our no calculation function family.

Family Variant Implementations—Filling

All of our repeat family functions support a data filling implementation filling missing progression values within one or more vertical or horizontal field values as exampled in our U.S. application Ser. No. 17/903,934 titled "Method and System for Improved 2d Ordering of Output from Spreadsheet Analytical Functions," filed 6 Sep. 2022 in FIG. 28 through FIG. 31 and FIG. 100. Our implementations support many types of progressions, for example times, by the hour or the minute, dates by the day, month or year, integers by progressions of 1, 10 or 100, and text by the letters of the alphabet. So, for example, if a heading has values of 1, 2, 3, 4, 7, 8, and 10 and the user wants filling from 1 to 10 inclusive by progression of 1 our technology would fill in 5, 6, and 9. Similarly our technology could automatically fill integers between the lowest and highest heading values.

Family Variant Implementations—Limit/Constraints

All of our repeat family functions support a vertical and/or horizontal results output limitation implementation as exampled in our U.S. application Ser. No. 17/903,934 titled "Method and System for Improved 2d Ordering of Output from Spreadsheet Analytical Functions," filed 6 Sep. 2022 in FIG. 93, FIG. 37 through FIG. 43, and FIG. 66 through FIG. 69. So that if a user is concerned that there will be too many results output from any of our repeat functions, they can limit it to a number of rows (e.g., '50' or 'LIMIT_V[50]') or columns (e.g., '50' or 'LIMIT_H[50]').

All of our repeat family functions support day of week results output limitation implementation as exampled in our U.S. application Ser. No. 17/903,934 titled "Method and System for Improved 2d Ordering of Output from Spreadsheet Analytical Functions," filed 6 Sep. 2022 in FIG. 32 and FIG. 33. So that if a user wants to limit outputs to only certain days of the week (e.g., only weekdays, weekends, Mondays, or Mondays and Fridays) our implementations can do so.

All of our repeat family functions support limiting/filtering the calculated or two-dimensional field results output in implementations as exampled in our U.S. application Ser. No. 17/903,934 titled "Method and System for Improved 2d Ordering of Output from Spreadsheet Analytical Functions," filed 6 Sep. 2022 in FIG. 97, FIG. 98 through FIG. 109. So that if a user wants to limit calculated results and their accompanying headings to certain values, e.g., >500 or <100, they can do so. And if a user wants to limit two-dimensional field values and their accompanying headings to certain values, e.g., >"h" (text values after h) or '1/1/15'. . . '12/31/19' (dates between 1/1/5 and 12/31/19 inclusive), they can do so.

All of repeat family functions support constraining/filtering the data used within the prebuilt function formula as exampled in FIG. 7 and listed in the syntax/argument structures in numerous examples as 'constraint1', 'constraint', '[constraint_field]', and '[constraint_value]'. These user specified fields and values constrains/filters the data values as exampled in FIG. 16 1645 removing the data not passing through the filter or constraint.

Family Variant Implementations—Other Implementations

All of our families of repeat functions support other implementations including a non-transitory computer readable storage medium storing instructions executable by a processor to perform any of the methods described above. Yet other implementations may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following clauses and claims.

Clauses

Further to the Particular Implementations, the technology disclosed is exampled in the following clauses.

Range or Array Function Family

1. A method of evaluating data in a spreadsheet using a table generator prebuilt function that applies user specified formulas to user specified data fields to generate a table with two-dimensional headings with related multiple range or array calculation results, including:
   accessing from the spreadsheet the table generator prebuilt function entered in a first spreadsheet cell, wherein the table generator prebuilt function accepts as arguments at least two user specified formulas that include a range or array function to generate a table of rows and columns with headings and respective results of the first and second user specified range or array function formulas;
   receiving as arguments in a structured argument list of the table generator prebuilt function, which structured arguments list has a predetermined ordering of arguments or argument groups separated by delimiters,
   at least one first, one second, one third and one fourth user specified data field including user specified formulaic data description terms for accessing a non-cell source or a data cell range, wherein the first and second user specified data fields are different,
   using the first and the second user specified data fields to create loop equivalents over distinct combinations of values of the first and the second user specified data fields, wherein a loop equivalent groups the arguments based on two or more records or cell ranges that have matching values in the first and second user specified data fields;
   evaluating data in the third data field for each loop equivalent by applying the user specified first range or array function to generate loop equivalent range or array function calculation one results;
   evaluating data in the fourth data field for each loop equivalent by applying the user specified second range or array function to generate loop equivalent range or array function calculation two results; and
   outputting from the table generator prebuilt function adjoining two-dimensional tables of the loop equivalent calculation one results and calculation two results sharing either the headings for rows or columns of the first user specified data fields and replicating the second user specified field headings for complementary columns or rows of the calculation one and calculation two results.

Non-Range or Non-Array Algebraic Function Family

2. A method of evaluating data in a spreadsheet using a table generator prebuilt function that applies user specified algebraic formulas to user specified data fields to generate a table with two-dimensional headings with related multiple algebraic results, including:
   accessing from the spreadsheet the table generator prebuilt function entered in a first spreadsheet cell, wherein the table generator prebuilt function accepts as arguments at least two user specified algebraic formulas to generate a table of rows and columns with headings and respective results of the first and second user specified algebraic formulas;
   receiving as arguments in a structured argument list of the table generator prebuilt function, which structured arguments list has a predetermined ordering of arguments or argument groups separated by delimiters, at least one first, one second, two third and two fourth user specified data fields including user specified formulaic data description terms for accessing a non-cell source or a data cell range, wherein the first and second user specified data fields are different;

using the first and the second user specified data fields to sort rows and columns of the results of applying the first and second user specified algebraic formulas to the third and fourth user specified data fields, respectively, to produce adjoining two-dimensional tables of respective results; and outputting from the table generator prebuilt function the adjoining two-dimensional tables of respective results in a table sharing either the headings for rows or columns of the first user specified data fields and replicating the second user specified field headings for complementary columns or rows.

No Calculation Function Family

3. A method of evaluating data in a spreadsheet using a table generator prebuilt function that orders data from at least two user specified data fields to generate a table with two-dimensional headings and adjoining two-dimensional tables from respective data fields, including:

accessing from the spreadsheet the table generator prebuilt function entered in a first spreadsheet cell, wherein the table generator prebuilt function accepts as arguments at least four user specified data fields to generate a table of rows and columns with headings and respective ordered values from the first and second user specified data fields;

receiving as arguments in a structured argument list of the table generator prebuilt function, which structured arguments list has a predetermined ordering of arguments or argument groups separated by delimiters, at least one first and one second user specified data fields and third and fourth user specified data fields, including user specified formulaic data description terms for accessing a non-cell source or a data cell range, wherein the first and second user specified data fields are different;

using the first and the second user specified data fields to sort rows and columns of the values from the third and fourth user specified data fields, respectively, to produce adjoining two-dimensional tables of respective values from the third and four user specified data fields; and outputting from the table generator prebuilt function the adjoining two-dimensional tables of respective values in a table sharing either the headings for rows or columns of the first user specified data fields and replicating the second user specified field headings for complementary columns or rows.

Syntax/Argument Variants

4. The method of clause 1, wherein the formulaic data fields and range or array functions are specified as separate arguments.

5. The method of clause 1, wherein range or array function or functions and formulaic data field or data fields combine in one argument defining each calculation.

6. The method of clause 2, wherein the formulaic data fields and the algebraic operators are specified as separate arguments.

7. The method of clause 2, wherein the formulaic data fields and the algebraic operators combine in one argument defining each calculation.

8. The method of clauses 1, 2, and 3, wherein the structured list of arguments contains application specified required and optional arguments.

9. The method of clauses 1, 2, and 3, wherein the structured list of arguments contains only single specifiers.

10. The method of clauses 1, 2, and 3, wherein the structured arguments list has a predetermined ordering of argument groups separated by second delimiters and which arguments are grouped within argument groups separated by first delimiters that are different than the second delimiter.

11. The method of clause 10, wherein one or more argument group is optional and one or more argument group has optional arguments.

Horizontal and Vertical Repetitions

12. The method of clauses 1 and 2, wherein the adjoining two-dimensional tables of results are displayed horizontally sharing the row headings and replicating the column headings.

13. The method of clauses 3, wherein the adjoining two-dimensional tables of values are displayed horizontally sharing the row headings and replicating the column headings.

14. The method of clauses 1 and 2, wherein the adjoining two-dimensional tables of results are displayed vertically sharing the column headings and replicating the row headings.

15. The method of clauses 3, wherein the adjoining two-dimensional tables of values are displayed vertically sharing the column headings and replicating the row headings.

Group and Series Repetitions

16. The method of clauses 1 and 2, wherein the different calculations are ordered in groups of the like calculations nesting/repeating the unshared headings in groups together.

17. The method of clause 3, wherein the different two-dimensional fields are ordered in groups of the like two-dimensional fields nesting/repeating the unshared headings in groups together.

18. The method of clauses 1 and 2, wherein the different calculations are nested as a series within the replicated headings.

19. The method of clause 3, wherein the different two-dimensional fields are nested as a series within the replicated headings.

Sorting

20. The method of clause 1, further including primarily ordering the loop equivalent multiple calculation results by a default sorting of ascending or descending row and column headings maintaining the same ordering for the replicated row or column headings.

21. The method of clause 2, further including primarily ordering the multiple calculation results by a default sorting of ascending or descending row and column headings maintaining the same ordering for the replicated row or column headings.

22. The method of clause 3, further including primarily ordering the two-dimensional field results by a default sorting of ascending or descending row and column headings maintaining the same ordering for the replicated row or column headings.

23. The method of clause 1, further including primarily ordering the loop equivalent multiple calculation results vertically and/or horizontally by a user selected sort order.
24. The method of clause 2, further including primarily ordering the multiple calculation results vertically and/or horizontally by a user selected sort order.
25. The method of clause 3, further including primarily ordering the two-dimensional field results vertically and/or horizontally by a user selected sort order.
26. The method of clauses 1 and 2, further including primarily ordering the row or column calculation results and their corresponding headings by ordering values of one or more calculation row calculation values for ordering columns or column calculation values for ordering rows.
27. The method of clause 26, wherein one or more of the row calculation values for ordering columns also orders the repeated columns or column calculation values for ordering rows also orders the repeated rows.
28. The method of clause 3, further including primarily ordering the row or column two-dimensional field results and their corresponding headings by ordering values of one or more two-dimensional field values for ordering columns or column two-dimensional field values for ordering rows.
29. The method of clause 28, wherein one or more of the row two-dimensional field values for ordering columns also orders the repeated columns or column two-dimensional field values for ordering rows also orders the repeated rows.
30. The method of clauses 1 and 2, further including primarily ordering the calculation results by ordering by total or subtotal range or array functional evaluation of the horizontal and/or vertical calculation results.
31. The method of clause 3, further including primarily ordering the two-dimensional field results by ordering by total or subtotal range or array functional evaluation of the horizontal and/or vertical two-dimensional field results.
32. The method of clauses 30 and 31, wherein one or more of the row total or subtotal calculation values for ordering columns also orders the repeated columns or column total or subtotal calculation values for ordering rows also orders the repeated rows.
33. The method of clauses 30 and 31, wherein the range or array functional evaluation of the horizontal and/or vertical values of the loop equivalent calculated range or array function results totals or subtotals SUMs, MINs, or MAXs the values for ordering.

Nesting

34. The method of clause 1, further including receiving two first user specified data fields and using a second of the two first user specified data fields to create nested loop equivalents within the loop equivalents created responsive to the a first of the two first user specified data fields.
35. The method of clause 1, further including receiving two second user specified data fields and using a second of the two second user specified data fields to create nested loop equivalents within the loop equivalents created responsive to the a first of the two second user specified data fields.
36. The method of clauses 2 and 3, further including receiving two first user specified data fields and using a second of the two first user specified data fields to create nested sorts within sorted results or value created responsive to the a first of the two first user specified data fields.
37. The method of clauses 2 and 3, further including receiving two second user specified data fields and using a second of the two second user specified data fields to create nested sorts within sorted results or value created responsive to the a first of the two second user specified data fields.

Totals and/or Subtotals

38. The method of clauses 1 and 2, further including outputting from the table generator prebuilt function total and/or subtotal formula calculations vertically and/or horizontally over the calculated results.
39. The method of clause 3, further including outputting from the table generator prebuilt function total and/or subtotal formula calculations vertically and/or horizontally over the two-dimensional field values.
40. The method of clauses 1 and 2, further including outputting from the table generator function non-nested subtotal formula calculations vertically and/or horizontally over calculation results.
41. The method of clause 3, further including outputting from the table generator function non-nested subtotal formula calculations vertically and/or horizontally over the two-dimensional field values.

More Complexity

42. The method of clauses 1 and 2, further including three or more calculation repetitions.
43. The method of clause 3, further including three or more two-dimensional adjoining tables displaying the values from additional user specified data fields.
44. The method of clause 1, wherein one or more of the user specified loop equivalent calculations employs more than one range or array function.
45. The method of clause 2, wherein one or more of the user specified calculations employs more than one algebraic operator and more than two calculation fields.

Heading Titles

46. The method of clauses 1, 2 and 3, further including the generation of vertical and/or horizontal heading titles.
47. The method of clause 46, wherein the heading titles are field names, field name variants, application defaults, or user specified values.
48. The method of clauses 1 and 2, further including the table generation prebuilt function generation of calculation headings that are all or part of the calculation formula or user specified values.
49. The method of clause 3, further including the table generation prebuilt function generation of two-dimensional field headings that are the two-dimensional field name or user specified values.

Spread/Collapse

50. The method of clauses 2 and 3, further including displaying data so that a row or column of data across each of the adjoining two-dimensional tables the has one value per table.
51. The method of clauses 2 and 3, further including displaying data to minimize a number of rows or columns of data required in the adjoining two-dimensional tables.
52. The method of clause 51, wherein the displaying data to minimize a number of rows or columns of data required retains positional symmetry across the adjoining two-dimensional tables.

Filling

53. The method of clauses 1, 2 and 3, further including adding in missing date or integer headings with empty row or columns of results or values within a progression.

54. The method of clause 53, wherein the user specifies a range of the progression to be filled in with the headings.

Limit/Constraint

55. The method of clauses 1, 2 and 3, further including limiting output of calculation results or two-dimensional field values and their related headings vertically and/or horizontally responsive to a user selected count of items to output.

56. The method of clauses 1, 2, and 3, further including limiting or filtering output of calculation results or two-dimensional field values and their related headings vertically and/or horizontally responsive to a user selected day(s) of week limitation to output.

57. The method of clauses 1, 2, and 3, further including limiting or filtering output of calculation results or two-dimensional field values and their related headings vertically and/or horizontally responsive to a user specified filter.

58. The method of clauses 1, 2, and 3, further including applying constraints to the user specified data fields to filter data evaluated by the user specified table generator prebuilt function.

59. The method of clause 58, wherein the constraints are applied by one or more user specified data field specifying one or more filter value.

Other Implementations

58. A non-transitory computer readable memory, the memory impressed with computer instructions that, when executed on hardware, cause the hardware to carry out the method of any of clauses 1 through 57.

59. A system including processing hardware coupled to memory, the memory impressed with computer instructions that, when executed, cause the hardware to carry out the method of any of clauses 1 through 57.

We claim as follows:

1. A method of evaluating data in a spreadsheet using a table generator prebuilt function that applies user specified algebraic formulas to user specified data fields to generate a table with two-dimensional headings with related multiple algebraic results, including:

accessing from the spreadsheet the table generator prebuilt function entered in a first spreadsheet cell, wherein the table generator prebuilt function accepts as arguments at least two user specified algebraic formulas to generate a table of rows and columns with headings and respective results of the first and second user specified algebraic formulas;

receiving as arguments in a structured argument list of the table generator prebuilt function, which structured arguments list has a predetermined ordering of arguments or argument groups separated by delimiters, at least one first, one second, two third and two fourth user specified data fields including user specified formulaic data description terms for accessing a non-cell source or a data cell range, wherein the first and second user specified data fields are different;

using the first and the second user specified data fields to sort rows and columns of the results of applying the first and second user specified algebraic formulas to the third and fourth user specified data fields, respectively, to produce adjoining two-dimensional tables of respective results; and outputting from the table generator prebuilt function the adjoining two-dimensional tables of respective results in a table sharing either the headings for rows or columns of the first user specified data fields and replicating the second user specified field headings for complementary columns or rows.

2. The method of claim 1, wherein the formulaic data fields and algebraic operators are specified as separate arguments.

3. The method of claim 1, wherein the formulaic data fields and algebraic operators combine in one argument defining each algebraic formula calculation.

4. The method of claim 1, wherein the structured list of arguments contains application specified required and optional arguments.

5. The method of claim 1, wherein the structured list of arguments contains only single specifiers.

6. The method of claim 1, wherein the structured arguments list has a predetermined ordering of argument groups separated by second delimiters and which arguments are grouped within argument groups separated by first delimiters that are different than the second delimiter.

7. The method of claim 6, wherein one or more argument group is optional and one or more argument group has optional arguments.

8. The method of claim 1, wherein the adjoining two-dimensional tables of results are displayed horizontally sharing the row headings and replicating the column headings.

9. The method of claim 1, wherein the adjoining two-dimensional tables of results are displayed vertically sharing the column headings and replicating the row headings.

10. The method of claim 1, wherein the different algebraic formula calculations are ordered in groups of the like algebraic formula calculations nesting/repeating the unshared headings in groups together.

11. The method of claim 1, wherein the different algebraic formula calculations are nested as a series within the replicated headings.

12. The method of claim 1, further including primarily ordering the multiple algebraic formula calculation results by a default sorting of ascending or descending row and column headings maintaining the same ordering for the replicated row or column headings.

13. The method of claim 1, further including primarily ordering the multiple algebraic formula calculation results vertically and/or horizontally by a user selected sort order.

14. The method of claim 1, further including primarily ordering the row or column algebraic formula calculation results and their corresponding headings by ordering values of one or more algebraic formula calculation row calculation values for ordering columns or column calculation values for ordering rows.

15. The method of claim 14, wherein one or more of the row algebraic formula calculation values for ordering columns also orders repeated columns or column algebraic formula calculation values for ordering rows also orders repeated rows.

16. The method of claim 1, further including receiving two first user specified data fields and using a second of the two first user specified data fields to create nested sorts within sorted results or value created responsive to the a first of the two first user specified data fields.

17. The method of claim 1, further including receiving two second user specified data fields and using a second of the two second user specified data fields to create nested sorts within sorted results or value created responsive to the a first of the two second user specified data fields.

18. The method of claim 1, further including three or more algebraic formula calculation repetitions.

19. The method of claim 1, wherein one or more of user specified algebraic formula employs more than one algebraic operator and more than two calculation fields.

20. The method of claim 1, further including the generation of vertical and/or horizontal heading titles.

21. The method of claim 20, wherein the heading titles are field names, field name variants, application defaults, or user specified values.

22. The method of claim 1, further including the generation of algebraic formula calculation headings that are at least part of the algebraic formula or user specified values.

23. The method of claim 1, further including displaying data so that a row or column of data across each of the adjoining two-dimensional tables has one value per table.

24. The method of claim 1, further including displaying data to minimize a number of rows or columns of data required in the adjoining two-dimensional tables.

25. The method of claim 24, wherein the displaying data to minimize a number of rows or columns of data required retains positional symmetry across the adjoining two-dimensional tables.

26. A non-transitory computer readable media loaded with computer instructions that, when executed on hardware, cause the hardware to carry out actions of evaluating data in a spreadsheet using a table generator prebuilt function that applies user specified algebraic formulas to user specified data fields to generate a table with two-dimensional headings with related multiple algebraic results, including:

accessing from the spreadsheet the table generator prebuilt function entered in a first spreadsheet cell, wherein the table generator prebuilt function accepts as arguments at least two user specified algebraic formulas to generate a table of rows and columns with headings and respective results of the first and second user specified algebraic formulas;

receiving as arguments in a structured argument list of the table generator prebuilt function, which structured arguments list has a predetermined ordering of arguments or argument groups separated by delimiters, at least one first, one second, two third and two fourth user specified data fields including user specified formulaic data description terms for accessing a non-cell source or a data cell range, wherein the first and second user specified data fields are different;

using the first and the second user specified data fields to sort rows and columns of the results of applying the first and second user specified algebraic formulas to the third and fourth user specified data fields, respectively, to produce adjoining two-dimensional tables of respective results; and outputting from the table generator prebuilt function the adjoining two-dimensional tables of respective results in a table sharing either the headings for rows or columns of the first user specified data fields and replicating the second user specified field headings for complementary columns or rows.

27. A computer-implemented system including a processor and non-transitory computer readable media loaded with computer instructions that, when executed on the processor, cause the system to carry out actions of evaluating data in a spreadsheet using a table generator prebuilt function that applies user specified algebraic formulas to user specified data fields to generate a table with two-dimensional headings with related multiple algebraic results, including:

accessing from the spreadsheet the table generator prebuilt function entered in a first spreadsheet cell, wherein the table generator prebuilt function accepts as arguments at least two user specified algebraic formulas to generate a table of rows and columns with headings and respective results of the first and second user specified algebraic formulas;

receiving as arguments in a structured argument list of the table generator prebuilt function, which structured arguments list has a predetermined ordering of arguments or argument groups separated by delimiters, at least one first, one second, two third and two fourth user specified data fields including user specified formulaic data description terms for accessing a non-cell source or a data cell range, wherein the first and second user specified data fields are different;

using the first and the second user specified data fields to sort rows and columns of the results of applying the first and second user specified algebraic formulas to the third and fourth user specified data fields, respectively, to produce adjoining two-dimensional tables of respective results; and outputting from the table generator prebuilt function the adjoining two-dimensional tables of respective results in a table sharing either the headings for rows or columns of the first user specified data fields and replicating the second user specified field headings for complementary columns or rows.

* * * * *